United States Patent
Lee

(10) Patent No.: US 9,509,158 B2
(45) Date of Patent: *Nov. 29, 2016

(54) POWER SUPPLY CONFIGURATION SYSTEM AND METHOD

(71) Applicant: LITE-ON, INC., Milpitas, CA (US)

(72) Inventor: Victor K. J. Lee, Dallas, TX (US)

(73) Assignee: LITE-ON, INC., Milpita, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/565,754

(22) Filed: Dec. 10, 2014

(65) Prior Publication Data

US 2015/0188349 A1 Jul. 2, 2015

Related U.S. Application Data

(63) Continuation-in-part of application No. 14/509,454, filed on Oct. 8, 2014, now Pat. No. 9,047,075, which is a continuation of application No. 14/461,110, filed on Aug. 15, 2014, now Pat. No. 9,047,076.

(60) Provisional application No. 61/922,311, filed on Dec. 31, 2013.

(51) Int. Cl.
*H02J 7/00* (2006.01)
*G06F 1/30* (2006.01)
(Continued)

(52) U.S. Cl.
CPC .............. *H02J 7/0068* (2013.01); *G06F 1/30* (2013.01); *H02J 9/06* (2013.01); *H02J 9/061* (2013.01); *H02M 7/44* (2013.01)

(58) Field of Classification Search
None
See application file for complete search history.

(56) References Cited

U.S. PATENT DOCUMENTS 9,047,075 B1 6/2015 Lee
9,047,076 B1 6/2015 Lee
(Continued)

FOREIGN PATENT DOCUMENTS

DE        3031981 A1    4/1982
DE  10 2008 024 22 A1  2/2009
(Continued)

OTHER PUBLICATIONS

EPO, European Search Report for EP1419244 dated Jul. 10, 2015.
(Continued)

*Primary Examiner* — Kim Huynh
*Assistant Examiner* — Vincent Chang
(74) *Attorney, Agent, or Firm* — David W. Carstens; Kevin M. Klughart; Carstens & Cahoon, LLP

(57) ABSTRACT

A power supply configuration system/method providing a digitally controlled uninterruptable power supply (UPS) to protected load devices (PLD) configured as power supply units (PSU) serviced by one or more power supply sources (PSS) is disclosed. The system generally includes a number of power supply sources (PSS) that are monitored by power condition sensing (PCS) circuitry that determines individual power source states within the PSS. This physical state information is used by a digitally controlled switching network (DSN) that reconfigures the electrical connections between the PSS and the individual PLD elements to properly route power from the PSS to the PLD in the event of individual PSS failures. The DSN receives phase/voltage state information from the PSS to ensure that current between the PSS and PLD is transferred in a synchronized manner and that PSS resources are properly protected during the switching transition.

90 Claims, 48 Drawing Sheets

(51) Int. Cl.
*H02J 9/06* (2006.01)
*H02M 7/44* (2006.01)

(56) References Cited

U.S. PATENT DOCUMENTS

| | | |
|---|---|---|
| 2004/0164618 A1 | 8/2004 | Bryde |
| 2006/0050465 A1 | 3/2006 | Cho et al. |
| 2010/0180139 A1 | 7/2010 | Denney et al. |
| 2011/0266866 A1* | 11/2011 | Wang ............... H01M 8/04888 307/17 |
| 2011/0291606 A1 | 12/2011 | Lee |
| 2012/0081078 A1 | 4/2012 | Matsumura et al. |
| 2012/0086269 A1 | 4/2012 | Nakano et al. |
| 2012/0181869 A1* | 7/2012 | Chapel ..................... H02J 9/06 307/64 |
| 2013/0020872 A1 | 1/2013 | Kinnard |
| 2013/0141828 A1 | 6/2013 | Yamaguchi et al. |
| 2013/0246815 A1 | 9/2013 | Uehara |

FOREIGN PATENT DOCUMENTS

| | | |
|---|---|---|
| EP | 2833504 A1 | 2/2015 |
| KR | 101322617 B1 | 10/2013 |

OTHER PUBLICATIONS

EPO, European Search Report for EP14199267 dated May 7, 2015.

European Application No. EP 14199244.6, Extended European Search Report.

\* cited by examiner

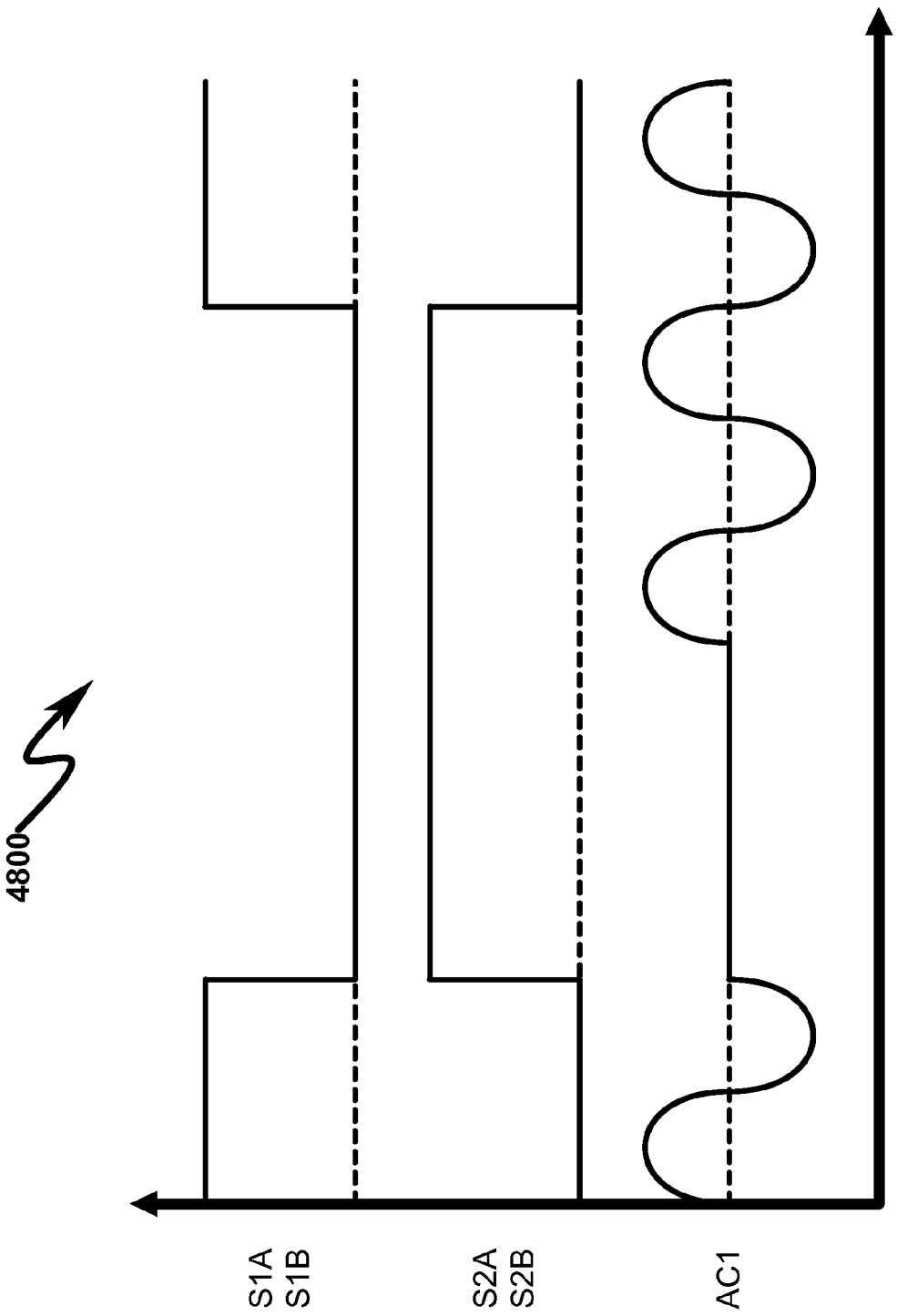

US 9,509,158 B2

POWER SUPPLY CONFIGURATION SYSTEM AND METHOD

CROSS REFERENCE TO RELATED APPLICATIONS

Continuation Patent Application (CPA)

This is a continuation-in-part (CIP) patent application of and incorporates by reference United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198.

Provisional Patent Application

This application claims benefit under 35 U.S.C. §119 and incorporates by reference United States Provisional patent application for UNINTERRUPTABLE POWER SUPPLY SYSTEM AND METHOD by inventor Victor K. J. Lee, filed electronically with the USPTO on Dec. 31, 2013, with Ser. No. 61/922,311, EFS ID 17788637, confirmation number 8260.

UTILITY PATENT APPLICATIONS

This application claims benefit under 35 U.S.C. §120 and incorporates by reference United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198.

This application claims benefit under 35 U.S.C. §120 and incorporates by reference United States Utility patent application for UNINTERRUPTABLE POWER SUPPLY SYSTEM AND METHOD by inventor Victor K. J. Lee, filed electronically with the USPTO on Oct. 8, 2014, with Ser. No. 14/509,454, EFSID 20358607, confirmation number 3152.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated with uninterruptable power supplies (UPS). Specifically, the present invention relates in some preferred embodiments to UPS power supply configuration systems/methods as applied to large computing data centers.

PRIOR ART AND BACKGROUND OF THE INVENTION

Within the context of modern data centers there is a need to provide for uninterrupted power to protected load devices that are serviced by power supply units (PSU). The PSU architecture described in United States patent applications incorporated by reference herein (Ser. No. 14/461,110 and Ser. No. 14/509,454) may be configured in a variety of ways to ensure that this requirement for uninterrupted protected load power supply is achieved. The present invention describes a variety of power supply configuration systems/methodologies to achieve this desired result.

BRIEF SUMMARY OF THE INVENTION

The present invention augments the AC+DC power supply configurations detailed in United States patent applications incorporated by reference herein (Ser. No. 14/461,110 and Ser. No. 14/509,454) by providing for a variety of systems and methods to ensure uninterrupted service to protected load devices via monitoring of power supply sources (PSS) and digitally controlled switching of these PSS to AC+DC power supplies that service the protected load devices.

BRIEF DESCRIPTION OF THE DRAWINGS

For a fuller understanding of the advantages provided by the invention, reference should be made to the following detailed description together with the accompanying drawings wherein:

FIG. 48 illustrates exemplary power condition sensing and control waveforms associated with the schematic of FIG. 47.

DESCRIPTION OF THE PRESENTLY PREFERRED EXEMPLARY EMBODIMENTS

Figure 1:
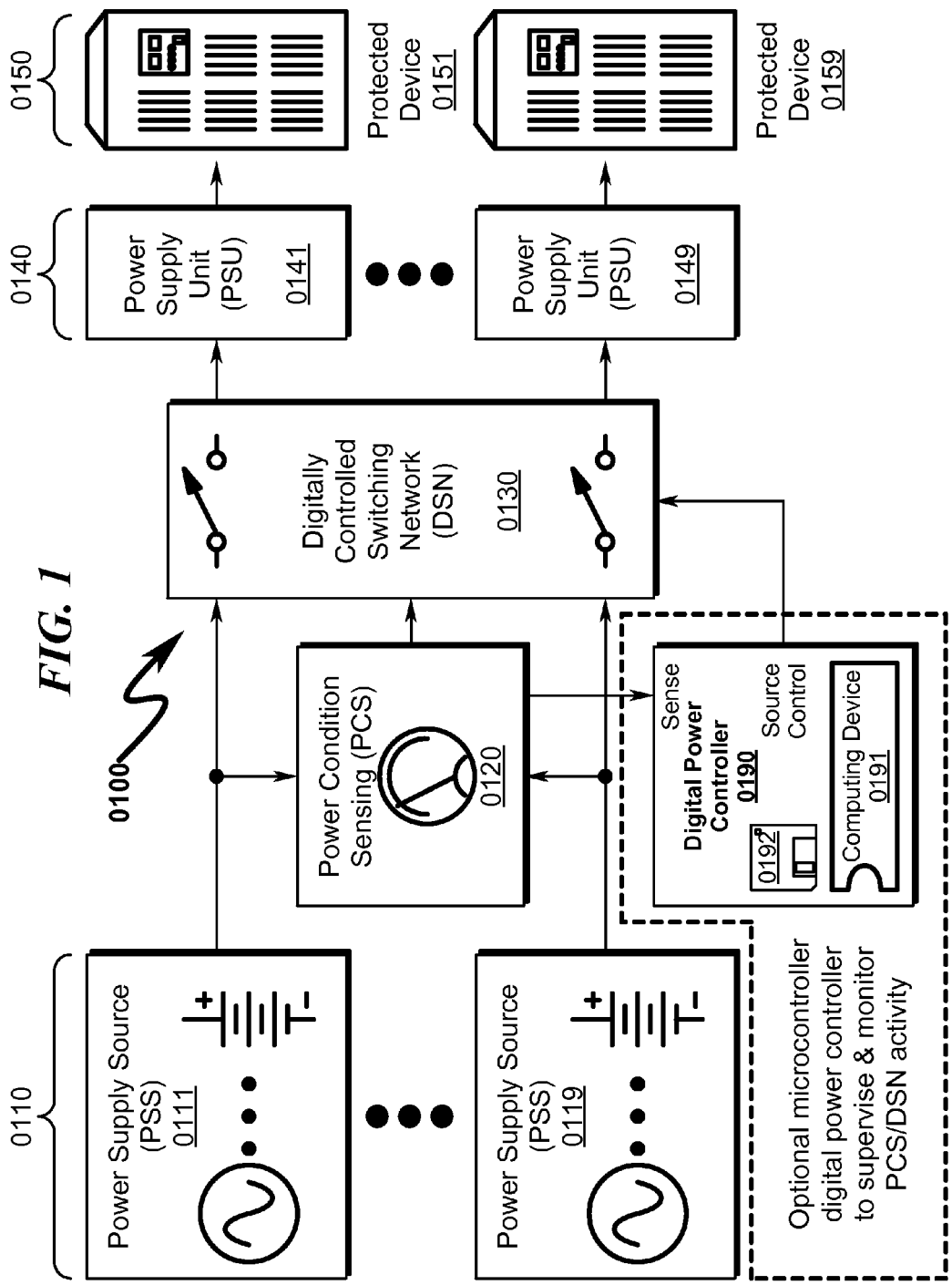
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a POWER SUPPLY CONFIGURATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Switch Methodology not Limitive

The present invention will be discussed in the context of a variety of boost converter topologies, some of which are preferred depending on application context. These converter topologies will be shown to incorporate MOSFET electrical switches, but the present invention is not limited in scope to the use of these devices and may incorporate any form of electrical switch, such as (but not limited to) bipolar transistors, MOSFETs, IGBTs, etc.

Control System not Limitive

The present invention may utilize a wide variety of constructs when implementing the power controller described herein. Many preferred invention embodiments may utilize a computerized control mechanism wherein the computer system executes machine instructions read from a tangible, non-transitory, computer readable medium.

PSU Limitive

The present invention describes controlled connections between power supply sources (PSS) and protected load devices (PLD). In this context the PLDs are limited in scope to power supply units (PSU) as described in United States Provisional patent application for UNINTERRUPTABLE POWER SUPPLY SYSTEM AND METHOD by inventor Victor K. J. Lee, filed electronically with the USPTO on Dec. 31, 2013, with Ser. No. 61/922,311, EFS ID 17788637, confirmation number 8260, and incorporated herein by reference. Thus, the system described herein is designed as a "front-end" to the uninterruptable power supply (UPS) systems described in this referenced patent application.

DSN Timing Limitive

The present invention describes controlled connections between power supply sources (PSS) and protected load devices (PLD) serviced by a power supply unit (PSU) via the use of a digitally controlled switching network (DSN) that utilizes input from power condition sensing (PCS) circuitry. The switch timing described herein is limited to situations in which switching connection reconfigurations between the PSS and PSU are accomplished within one to two AC phase cycles. This timing requirement for switchover is approximately 0.020-0.040 seconds for 50 Hz AC systems and approximately 0.017-0.035 seconds for 60 Hz AC systems. While this limitation may be accomplished utilizing the hardware and equivalents described herein, it is not possible to achieve this functionality using manual or human operations. As such, the present invention and associated claims are strictly limited to automated hardware mechanisms that can meet this switch timing requirement.

Switch Overview (0100)

A preferred exemplary system embodiment of the present invention is depicted in FIG. 1 (0100). In this application context, a number of power supply sources (PSS) (0110, 0111, 0119) (typically comprising a primary power source (PPS) and a secondary power source (SPS)) are used to service a number of power supply units (PSU) (0140, 0141, 0149) that supply power to one or more protected load devices (0150, 0151, 0159). Within this context the power supply sources (PSS) (0110, 0111, 0119) are monitored by power condition sensing (PCS) circuitry (0120) that provide input to a digitally controlled switching network (DSN) (0130) that interconnect the power supply sources (PSS) (0110, 0111, 0119) with the power supply units (PSU) (0140, 0141, 0149).

The power supply units (PSU) (0140, 0141, 0149) are AC+DC power supplies as described in United States Utility patent application for UNINTERRUPTABLE POWER SUPPLY SYSTEM AND METHOD by inventor Victor K. J. Lee, filed electronically with the USPTO on Aug. 15, 2014, Ser. No. 14/461,110 and United States Utility patent application for UNINTERRUPTABLE POWER SUPPLY SYSTEM AND METHOD by inventor Victor K. J. Lee, filed electronically with the USPTO on Oct. 8, 2014, Ser. No. 14/509,454, incorporated herein by reference. In this context, the present invention describes systems and methods of configuring the UPS power supply systems in these prior applications that provide for UPS service to protected devices via failover switching of PSS to PSU devices. This failover switching comprises power condition sensing circuitry (0120) that monitors the PSS and a digitally controlled switching network (0130) that interconnects the PSS with the PSU.

As described in incorporated United States patent applications (Ser. No. 14/461,110 and Ser. No. 14/509,454), the use of a power controller (0190) comprising a microcontroller digital computing device (0191) that executes machine instructions read from a computer readable medium (0192) may be used in conjunction with the power condition sensing (PCS) circuitry (0120) and the digitally controlled switching network (DSN) (0130) to configure power connections between the power supply sources (PSS) (0110, 0111, 0119) and the AC+DC power supply units (PSU) (0140, 0141, 0149) and the protected load devices (PLD) (0150, 0151, 0159) that the PSU (0140, 0141, 0149) services. The digital computing device (0191) may be used to incorporate or augment the PCS (0120) and the control interface to activate and configure the DSN (0130).

Method Overview (0200)

Figure 2:
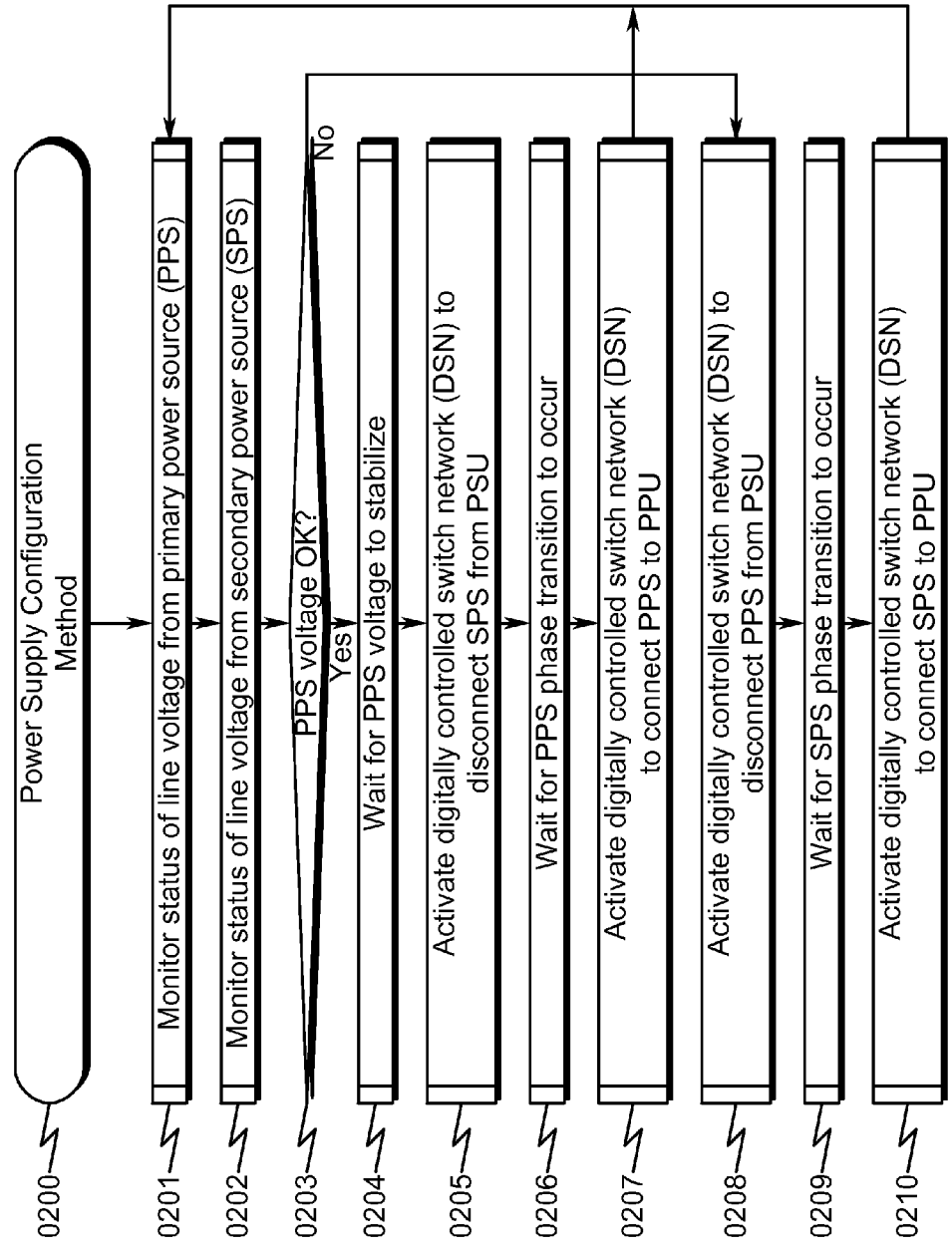
FIG. 2 illustrates a flowchart of a preferred exemplary method embodiment of the present invention.

The system context as depicted in FIG. 1 (0100) is typically associated with an overall methodology as depicted in FIG. 2 (0200) and involves the following steps:
  (1) With the PCS circuit, monitoring the status of line voltage from a primary power source (PPS) (0201);
  (2) With the PCS circuit, monitoring the status of line voltage from a secondary power source (SPS) (0202);
  (3) Determining if the PPS voltage is within predetermined limits, and if not, proceeding to step (8) (0203);
  (4) Waiting for the PPS voltage to stabilize (0204);
  (5) Activating the DSN to disconnect the SPS from the PSU (0205);
  (6) Waiting for a PSS phase transition to occur (0206);
  (7) Activating the DSN to connect the PPS to the PSU and proceeding to step (1) (0207);
  (8) Activating the DSN to disconnect the PPS from the PSU (0208);
  (9) Waiting for SPS phase transition to occur if the SPS is an AC source (0209); and

(10) Activating the DSN to connect the SPS to the PSU and proceeding to step (1) (0210).

One skilled in the art will recognize that these method steps may be augmented or rearranged without limiting the teachings of the present invention. This general method overview may be augmented by the various elements described herein to produce a wide variety of invention embodiments consistent with this overall design description.

Exemplary Power Condition Sensing (PCS) (0300)

As depicted generally in FIG. 1 (0100), the power condition sensing (PCS) (0120) operates to monitor the power condition of the power supply sources (PSS) (0110, 0111, 0119). In a typical configuration, the PCS (0120) is configured to monitor at least one primary power source (0111).

Figure 3:
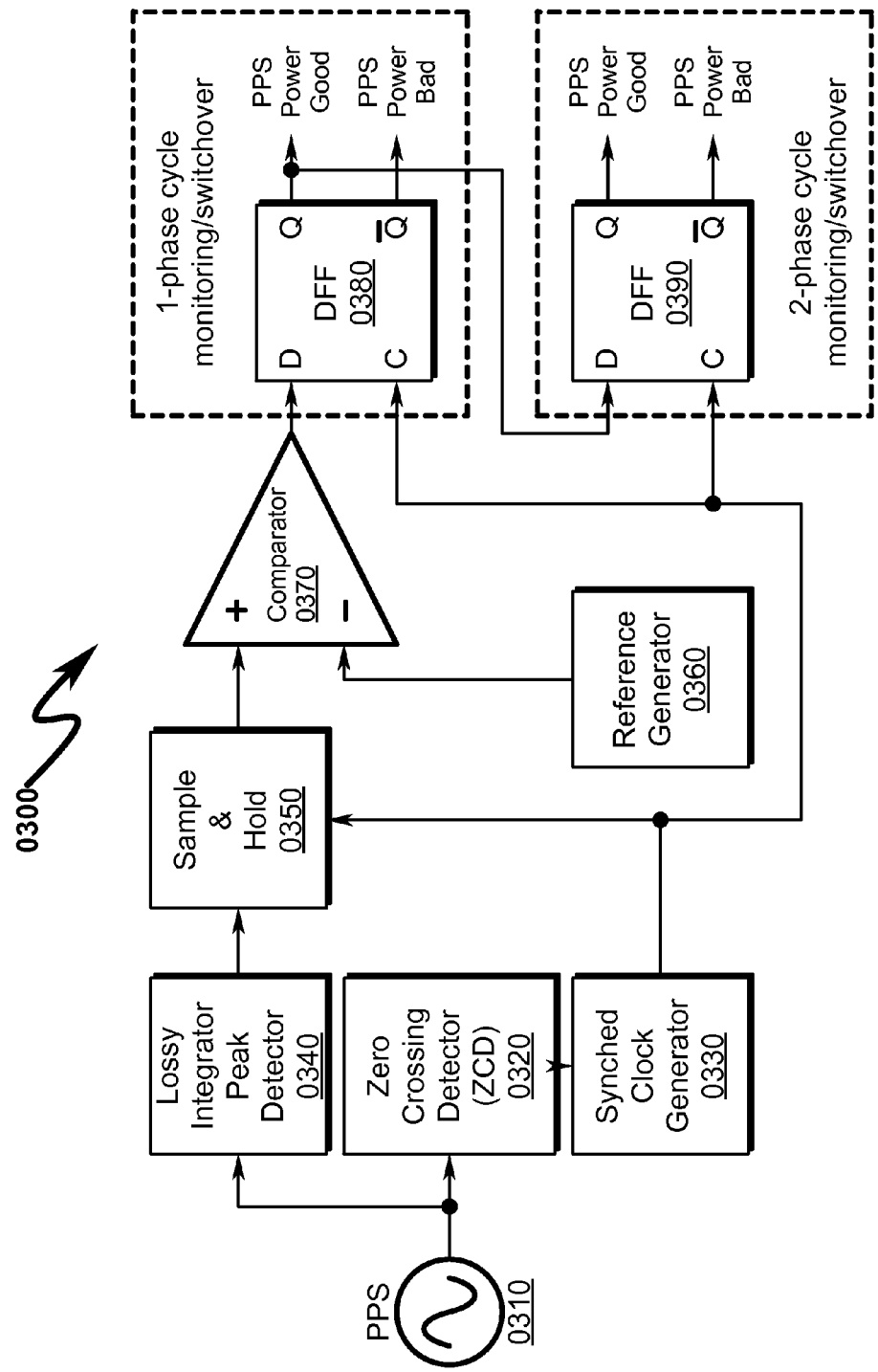
FIG. 3 illustrates a block diagram of a preferred exemplary system embodiment of the present invention detailing a power condition sensing (PCS) subsystem embodiment.

As depicted in FIG. 3 (0300), a typical PCS implementation monitors a PPS (0310) AC source in the following manner. The PPS (0310) output is processed by a zero crossing detector (ZCD) (0320) to determine positive and negative AC phase timing of the PPS (0310) AC signal. This phase information is then used to synchronize a clock generator (0330) that is used as a sampling clock for the output of a lossy integrator peak detector (0340). The clock generator (0330) is configured to operate at approximately a multiple of the line frequency of the PPS (0310) and so synchronizing it to the PPS (0310) source permits a sampling clock edge within the envelope of the PPS (0310) waveform to be reliably located. It is this sampling clock (0310) edge that determines when the PPS (0310) voltage is sampled for measurement.

The lossy integrator peak detector (0340) integrates a positive (or negative) portion of the AC waveform from the PPS (0310) output and holds this (with a sample and hold (0350) or equivalent circuit). This sampled positive or negative peak from the PPS (0310) output is then compared with the output of a reference generator (0360) with a digital comparator (0370). The digital output of this comparator (0370) is latched by a flip-flop (0380) to produce signals which indicate complementary PPS power good and PPS power bad.

Note that the configuration depicted will determine if a 1-phase cycle power good condition is achieved (0380). The system may also incorporate a second flip-flop (0390) to delay the activation of the DSN until at least one full PPS AC phase has been detected as being "good" before switching of the DSN is activated. This switchover delay may be modified to incorporate additional delay with additional flip-flop stages in some preferred invention embodiments. One skilled in the art will recognize that this delay may also incorporate some absolute time delay as well in addition to a detected phase count delay.

Exemplary Configuration Control Operation (0400)

Figure 4:
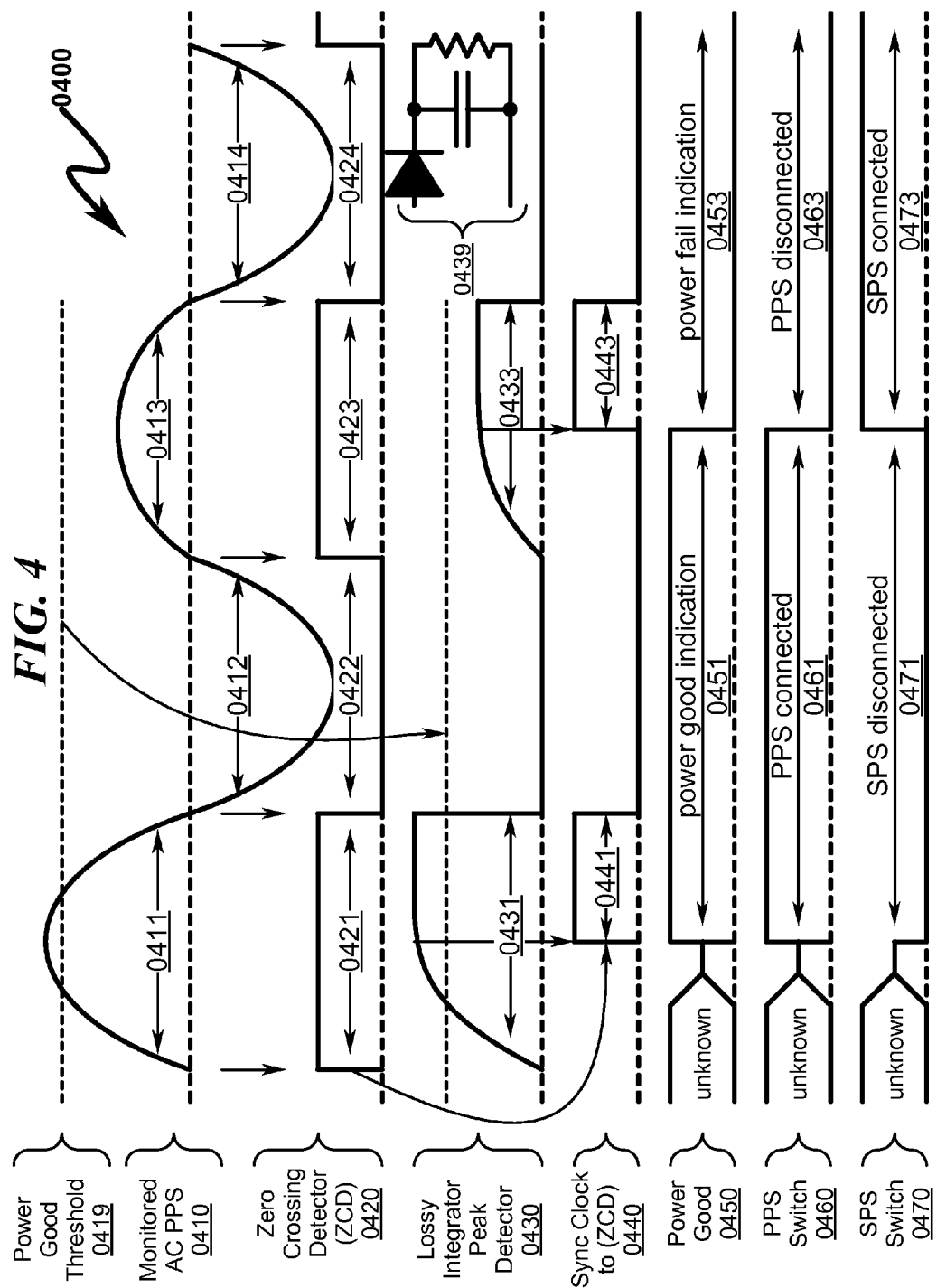
FIG. 4 illustrates typical waveforms and control signals associated with an exemplary PCS subsystem embodiment.

As depicted generally in FIG. 1 (0100), the power condition sensing (PCS) (0120) operates in conjunction with the digitally controlled switching network (DSN) (0130) to configure connections between the power supply sources (PSS) (0110, 0111, 0119) and the power supply units (0140, 0141, 0149) to service the protected device loads (0150, 0151, 0159). FIG. 4 (0400) depicts typical waveforms associated with monitored PSS in the context of a typical PPS and SPS.

In this example, a monitored AC PPS (0410) is associated with a power good threshold (0419) that defines the point in a positive transition phase where PPS voltage is considered acceptable. During the first positive phase (0411) the voltage meets the power good threshold (PGT) (0419) but during the second positive phase (0413) the voltage does not meet the power good threshold (PGT) requirement. For each AC phase polarity (0411, 0412, 0413, 0414) a zero crossing detector (ZCD) (0420) is configured to generate a digital signal corresponding to positive phase (0421, 0423) and negative phase (0422, 0424) states. The output of the ZCD (0420) is used to synchronize detection of voltage levels within the PPS.

A lossy integrator peak detector (0430) is configured to detect the voltage level of the PSP as depicted and may be configured in a variety of ways including the circuitry (0439) depicted in the figure. While only positive peak detection for two peaks (0431, 0433) is depicted, a similar circuit (0439) (not illustrated, but using a reversed diode) may be used to detect negative peak voltage levels for negative phase peaks.

A clock generator (0440) that is synchronously gated to the zero crossing detector (ZCD) (0430) is configured to edge clock (0441, 0443) within the internal region of the lossy integrator peak detector (0430) waveform envelopes (0431, 0433) to capture the state of the positive phase waveform voltages (0411, 0413). This captured voltage state is then latched for a phase cycle as a power good signal (PGS) (0450) which may indicate a power good condition (0451) or a power fail condition (0453).

Once the PPS power condition has been determined, the DSN activates the appropriate PPS switch (0460) to activate the PPS connection (when the PPS power is good) (0461) and deactivate the PPS connection (when the PPS power is bad) (0463). The DSN in a complementary fashion also activates the appropriate SPS switch (0470) to activate the SPS connection (when the PPS power is bad) (0473) and deactivate the SPS connection (when the PPS power is good) (0471).

Exemplary. Zero Crossing Detector (ZCD) (0500)

Figure 5:
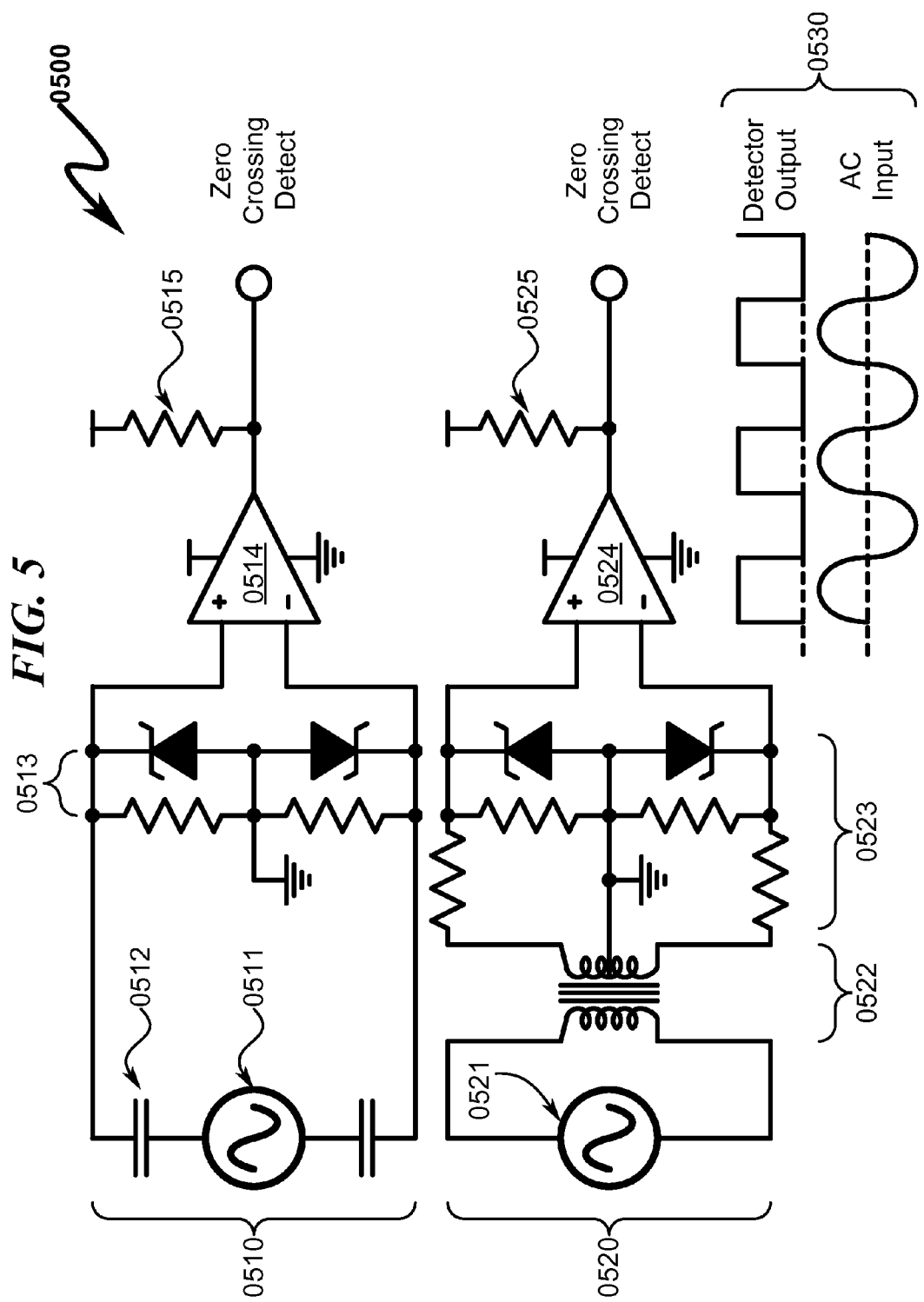
FIG. 5 illustrates a schematic of a preferred exemplary system embodiment of the present invention detailing a power condition sensing (PCS) zero crossing detector embodiment.

While many implementations of a zero crossing detector (ZCD) are possible with respect to the generalized system block diagram of FIG. 3 (0300), two possible implementations are depicted in FIG. 5 (0500). One depicted embodiment (0510) implements detection of the PSS (0511) using capacitive coupling (0512) to a clipping network (0513) that is input to a digital comparator (0514). Another depicted embodiment (0520) implements detection of the PSS (0521) using inductive coupling (0522) to a clipping network (0523) that is input to a digital comparator (0524). Pullup resistors (0515, 0525) condition the comparator (0514, 0524) output to digital levels. Exemplary input and detection waveforms (0530) are illustrated for reference purposes.

Exemplary Voltage Detector/Switch Control (06001

Figure 6:
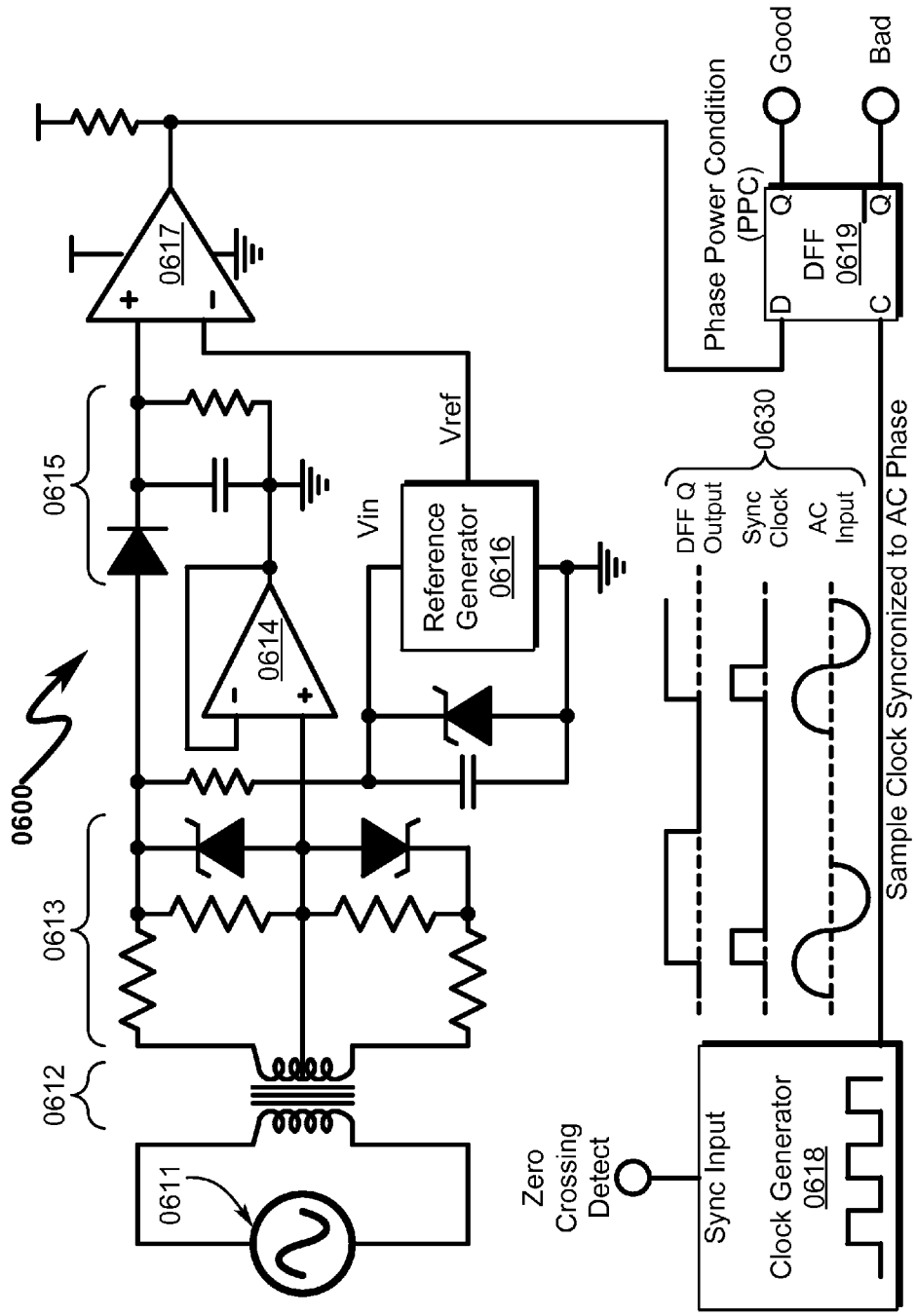
FIG. 6 illustrates a schematic of a preferred exemplary system embodiment of the present invention detailing a power condition sensing (PCS) threshold detector and power good/bad sampling detector embodiment.

Various elements of the system block diagram depicted in FIG. 3 (0300) that implement voltage sensing for the PPS are depicted in FIG. 6 (0600). In this exemplary voltage detection and switch control schematic, the power supply source (0611) is isolated from the detector inductively (0612) and processed through a clipping voltage divider network (0613). The output of this voltage divider network (0613) is used by an operational amplifier (0615) to form a virtual ground that is used by a lossy integrator peak detector (0615). The output of this lossy integrator peak detector (0615) is compared with a voltage reference generator (0616) reference output by a digital comparator (0617). The output of this digital comparator (0617) will vary based on the phase voltage timing of the PSS (0611) source.

To determine the proper timing to measure the PSS (0611) voltage a clock generator (0618) synchronized to the PSS (0611) generates a pulse train that clocks a flip flop (0619) during the mid-phase portion of the PSS (0611) AC waveform and latches the comparator (0617) output at this mid-phase time. The output of the flip-flop (0619) (interpreted as active high) produces phase power good/bad status that may be used by the digitally controlled switching network (DSN) to activate/deactivate connections between the PSS and downstream AC+DC power supply units (PSUs).

As illustrated by the exemplary timing waveforms (0630) in FIG. 6 (0600), the sample timing provided by the synchronized clock generator (0618) in conjunction with reference voltages produced by the reference generator (0616) ensure that the flip-flop (0619) outputs reflect a failure of the PSS (0611) within one phase cycle of the AC input. This permits rapid activation of the DSN to alternate power sources to ensure that the protected load devices are not subject to power disruptions.

Exemplary UPS System integration (0700)

Figure 7:
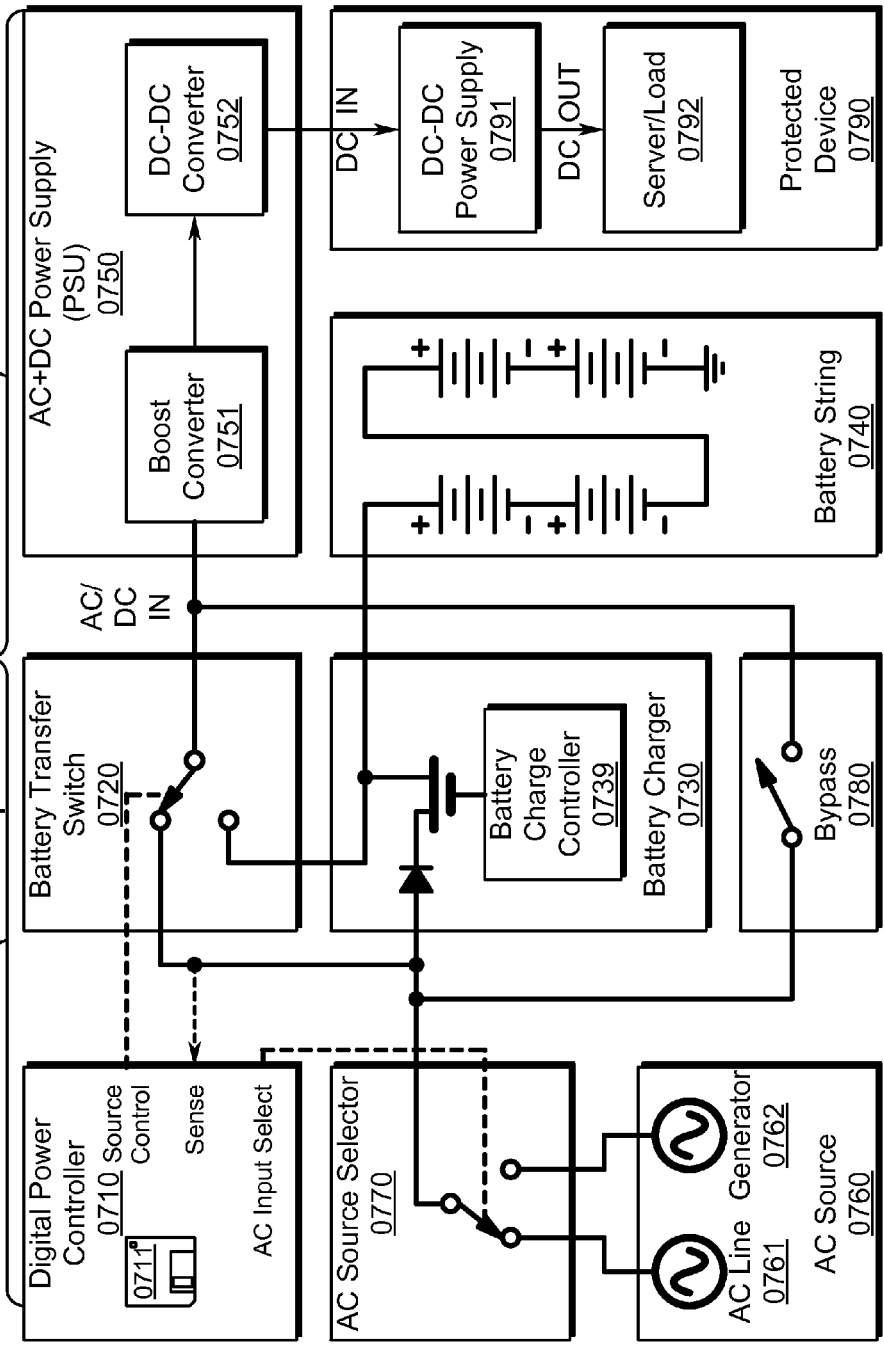
FIG. 7 illustrates a block diagram of a preferred exemplary system embodiment of the present invention as integrated within the UPS AC+DC power supply architecture described further in United States patent applications incorporated by reference herein (Ser. No. 14/461,110 and Ser. No. 14/509,454)

FIG. 7 (0700) illustrates integration of the power supply configuration system (as depicted from FIG. 1 (0100)) within the context of the UPS architecture described in incorporated U.S. patent application (Ser. No. 14/461,110 and Ser. No. 14/509,454). Here the power controller (0710), battery transfer switch (0720), battery charger (0730), AC+DC power supply (PSU) (0750), AC source selector (0770), and bypass (0780), are connected and controlled as described herein using PCS source sense and source control hardware to affect switching within the DSN. FIG. 7 (0700) illustrates only one back-end implementation of the UPS system supported by the present invention. Others described within the incorporated patent applications are also amenable to incorporation of the power supply configuration system as depicted in FIG. 7 (0700) and in other drawings within the present invention patent application.

Exemplary DSN Switch Implementations (0800)

Figure 8:
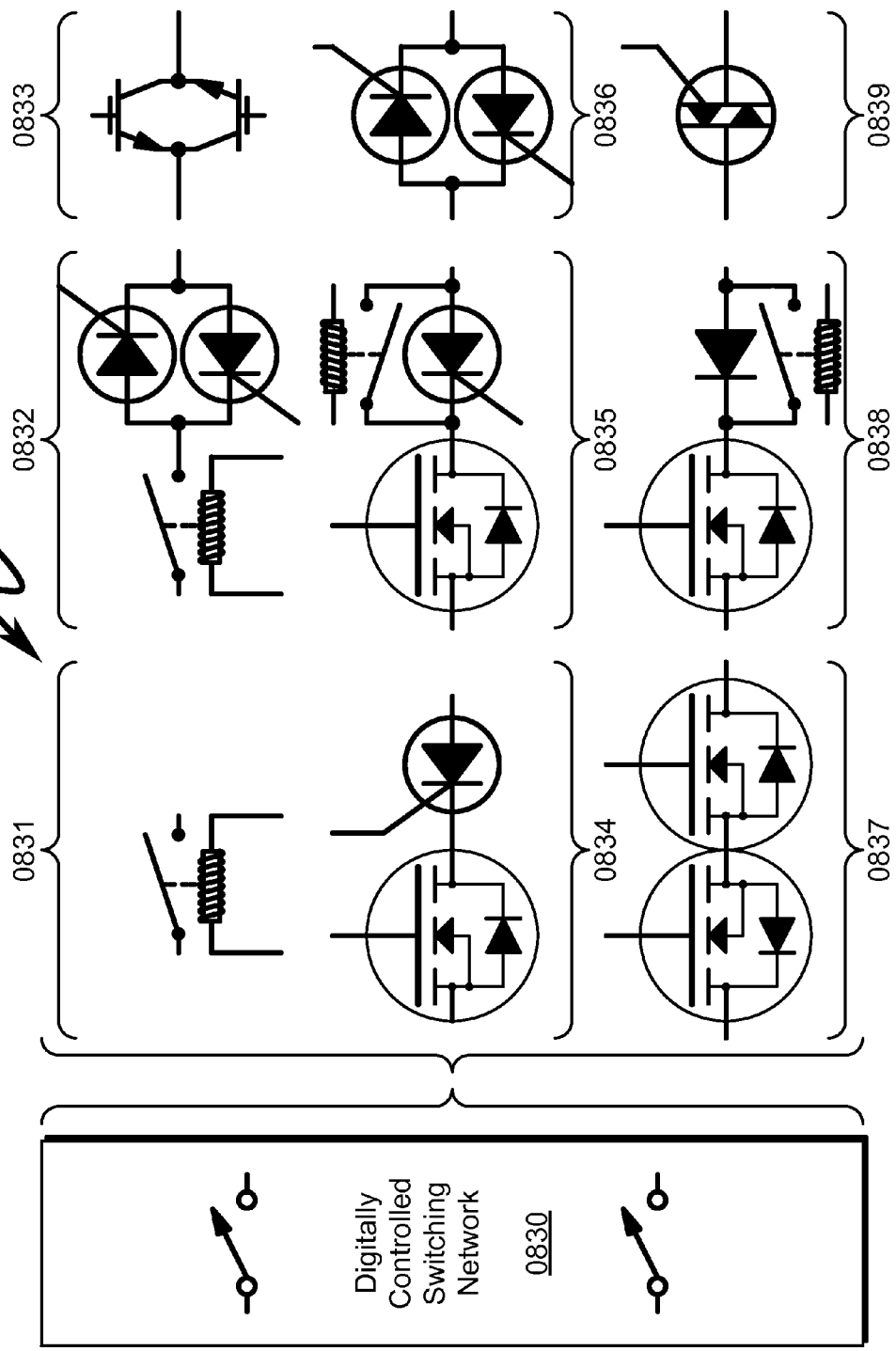
FIG. 8 illustrates exemplary implementations of switching elements utilized within the digitally controlled switching network.

The digitally controlled switching network (DSN) used to interconnect the PSS and the PSU may incorporate a wide variety of switching functions that may be implemented using a variety of components. Some exemplary switch implementations are depicted in FIG. 8 (0800) wherein the digitally controlled switching network (0830) is illustrated as incorporating one or more of the following circuit components:

- conventional relay or contactor (0831);
- conventional relay/contactor in series with complementary silicon controlled rectifiers (SCRs) (0832);
- complementary insulated gate bipolar transistors (IGBTs) (used singly or in complementary fashion as depicted) or complementary bipolar transistors (connected as per the illustrated IGBTs) (0833);
- MOSFET in series with a silicon controlled rectifier (SCR) (used singly as depicted or in complementary fashion as depicted in (0836)) (0834);
- MOSFET in series with a silicon controlled rectifier (SCR) (used singly as depicted or in complementary fashion as depicted in (0836)) with a switch shunting the SCR for the purposes of terminating SCR conduction (0835);
- complementary silicon controlled rectifiers (SCRs) (0836);
- series MOSFETs (configured using NCH/NCH (as depicted), PCH/PCH, or NCH/PCH device types) (0837);
- MOSFET in series with a diode that is shunted by a relay/contactor (0838); and/or
- TRIAC (0839).

One skilled in the art will recognize that this list of switching components is non-exhaustive and only illustrative of some preferred switching configurations.

Exemplary Embodiments (0900)-(4800)

Figure 9:
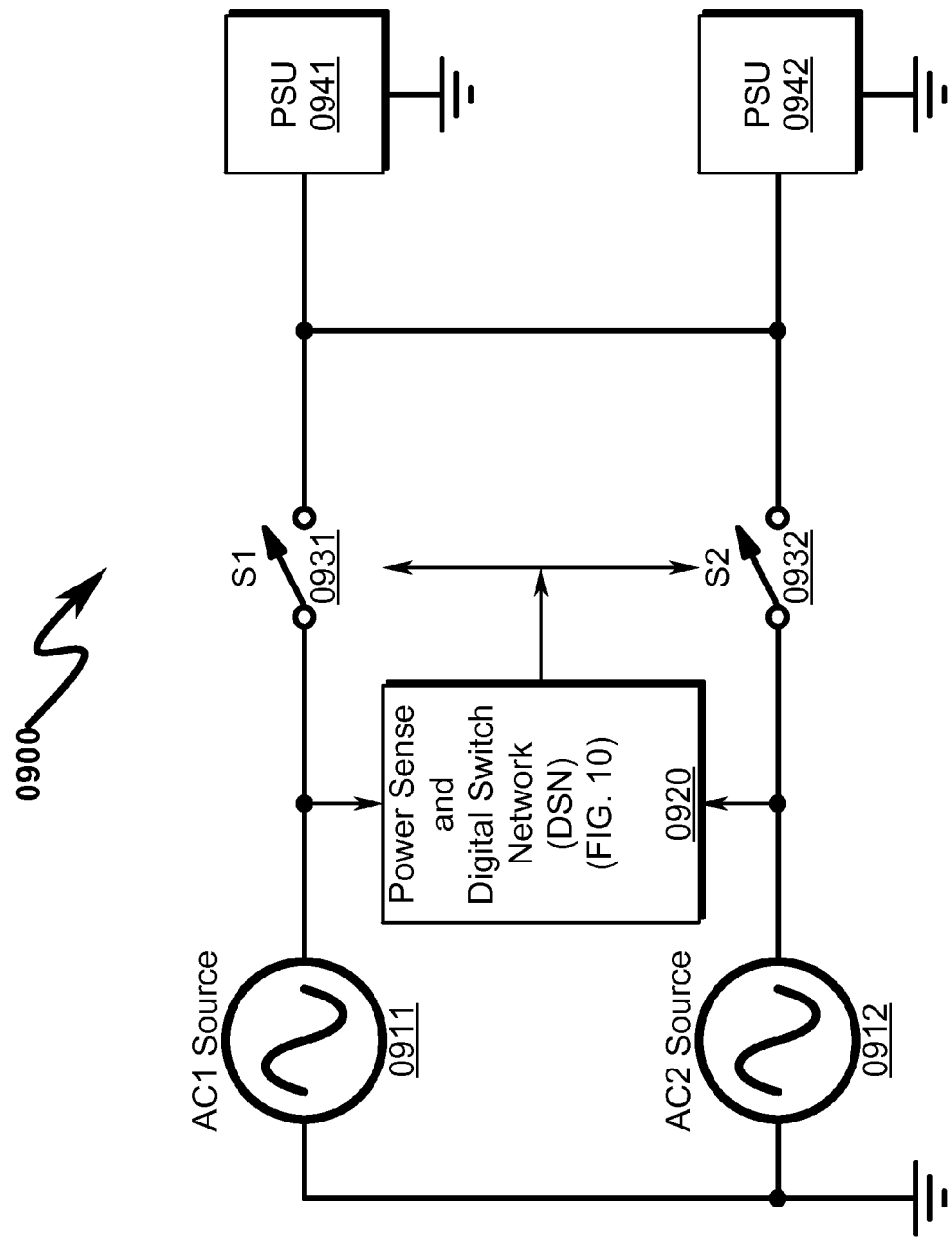
FIG. 9 illustrates an exemplary schematic diagram depicting a preferred system embodiment implementing a Dual AC Input System with Full Input Protection.

The general power supply configuration system/method depicted in FIG. 1 (0100)-FIG. 7 (0700) may be implemented in a wide variety of specific and preferred configurations. FIG. 9 (0900)-FIG. 48 (4800) depict a variety of preferred exemplary invention system/method embodiments and serve as a general guideline in implementing the features of the present invention in a variety of application contexts.

Dual AC Input System—Full Input Protection (0900)-(1000)

Figure 10:
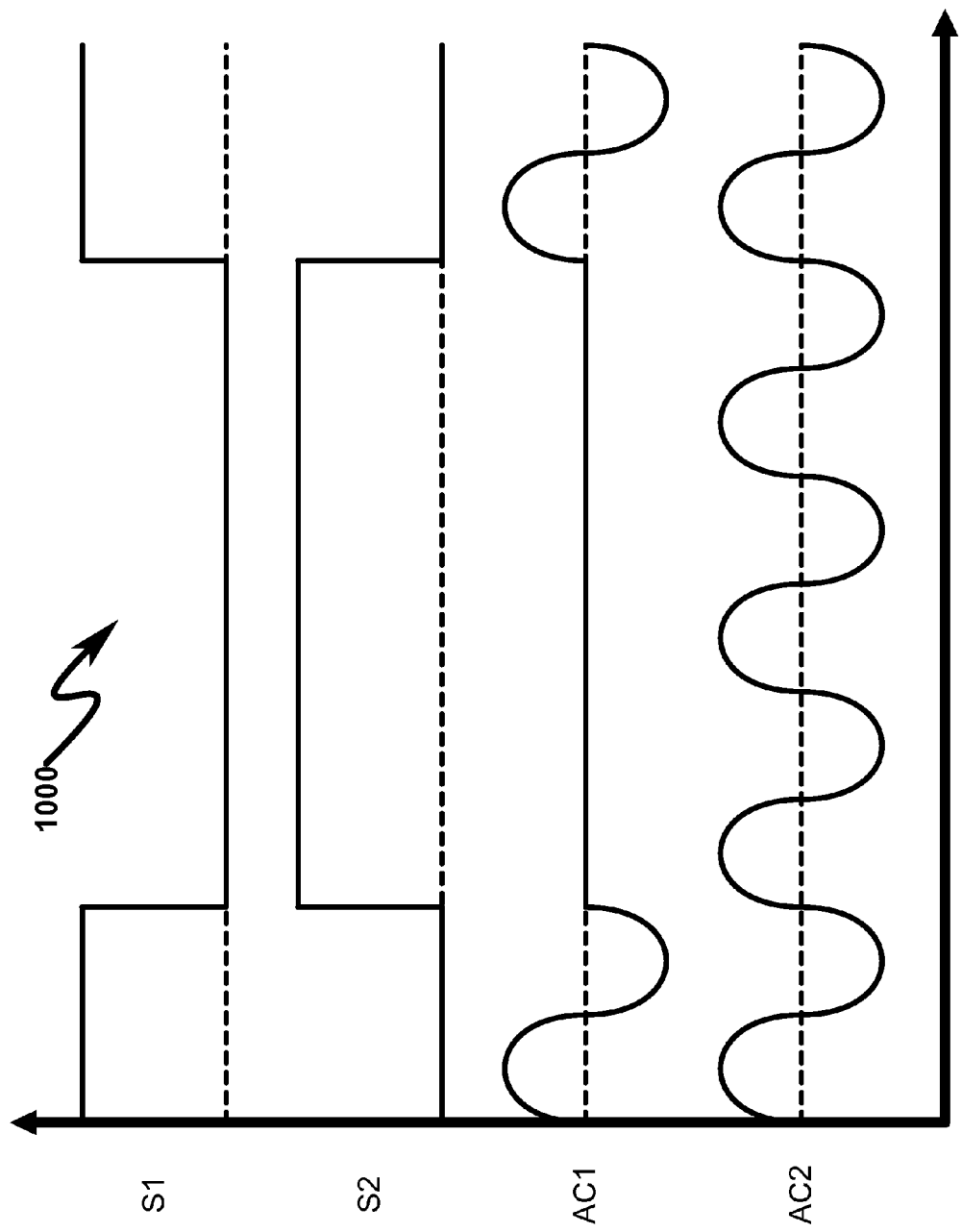
FIG. 10 illustrates exemplary power condition sensing and control waveforms associated with the schematic of FIG. 9.

FIG. 9 (0900)-FIG. 10 (1000) depict a power supply configuration backup mechanism with two AC sources (0911, 0912) that supply power to two PSUs (0941, 0942) with full source protection. The power condition sense and digital switch network (DSN) (0920) functionality is depicted in FIG. 10 (1000) and ensures that all PSUs (0941, 0942) are source protected and that selection of the AC source (0911, 0912) is realized through on/off control of complementary switches S1 (0931) and S2 (0932).

Dual AC Input System—Partial Input Protection (1100)-(1200)

Figure 11:
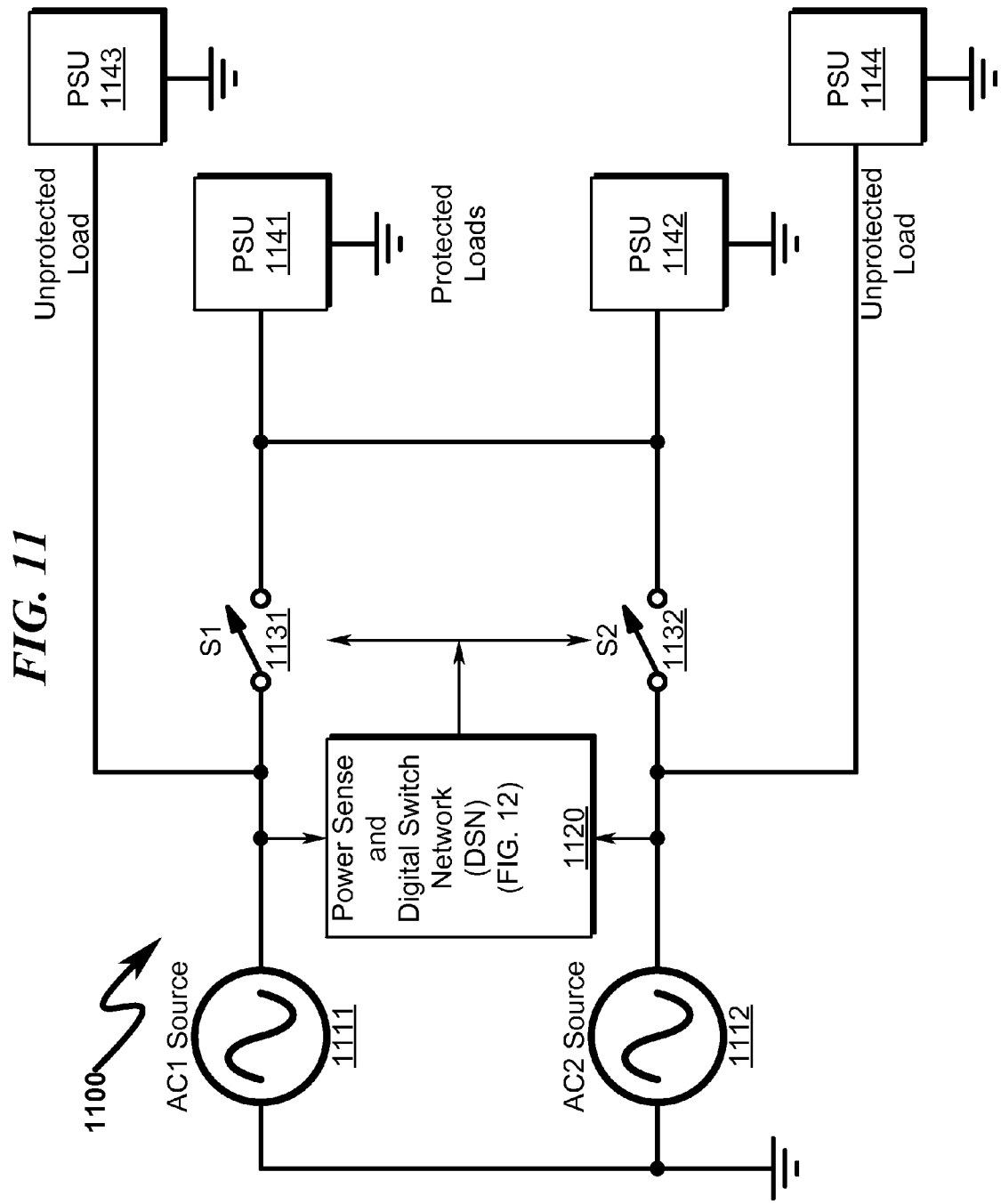
FIG. 11 illustrates an exemplary schematic diagram depicting a preferred system embodiment implementing a Dual AC Input System with Partial Input Protection.
Figure 12:
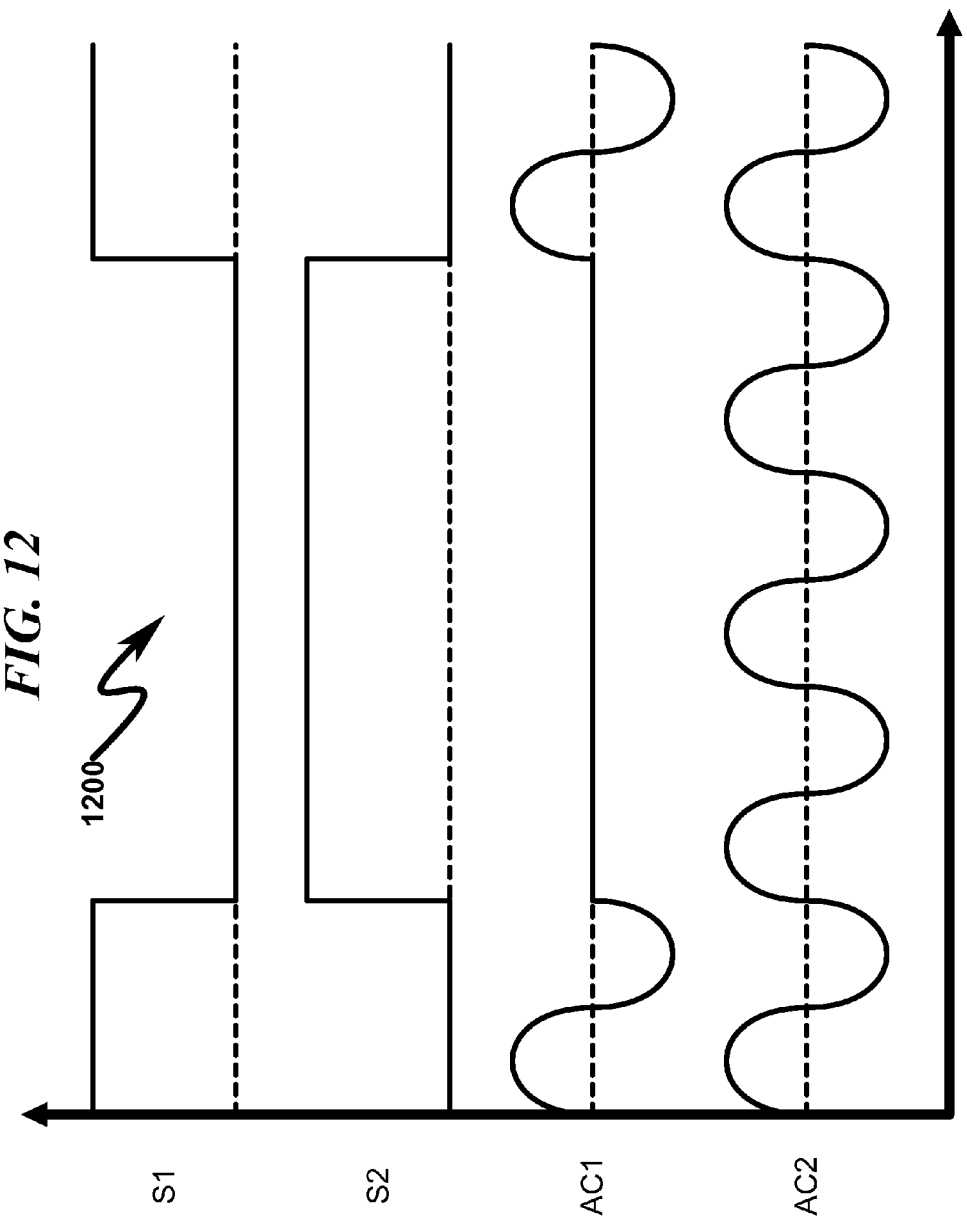
FIG. 12 illustrates exemplary power condition sensing and control waveforms associated with the schematic of FIG. 11.

FIG. 11 (1100)-FIG. 12 (1200) depict a power supply configuration backup mechanism with two AC sources (1111, 1112) that supply power to four PSUs (1141, 1142, 1143, 1144) with full source protection to two PSUs (1141, 1142) and no source protection for the remaining two PSUs (1143, 1144). The power condition sense and digital switch network (DSN) (1120) functionality is depicted in FIG. 12 (1200) and ensures that some PSUs (1141, 1142) are source protected and other PSUs (1143, 1144) are not protected and that selection of the AC source (1111, 1112) is realized through on/off control of complementary switches S1 (1131) and S2 (1132).

Dual AC Input System—Manual Bypass (1300)-(1400)

Figure 13:
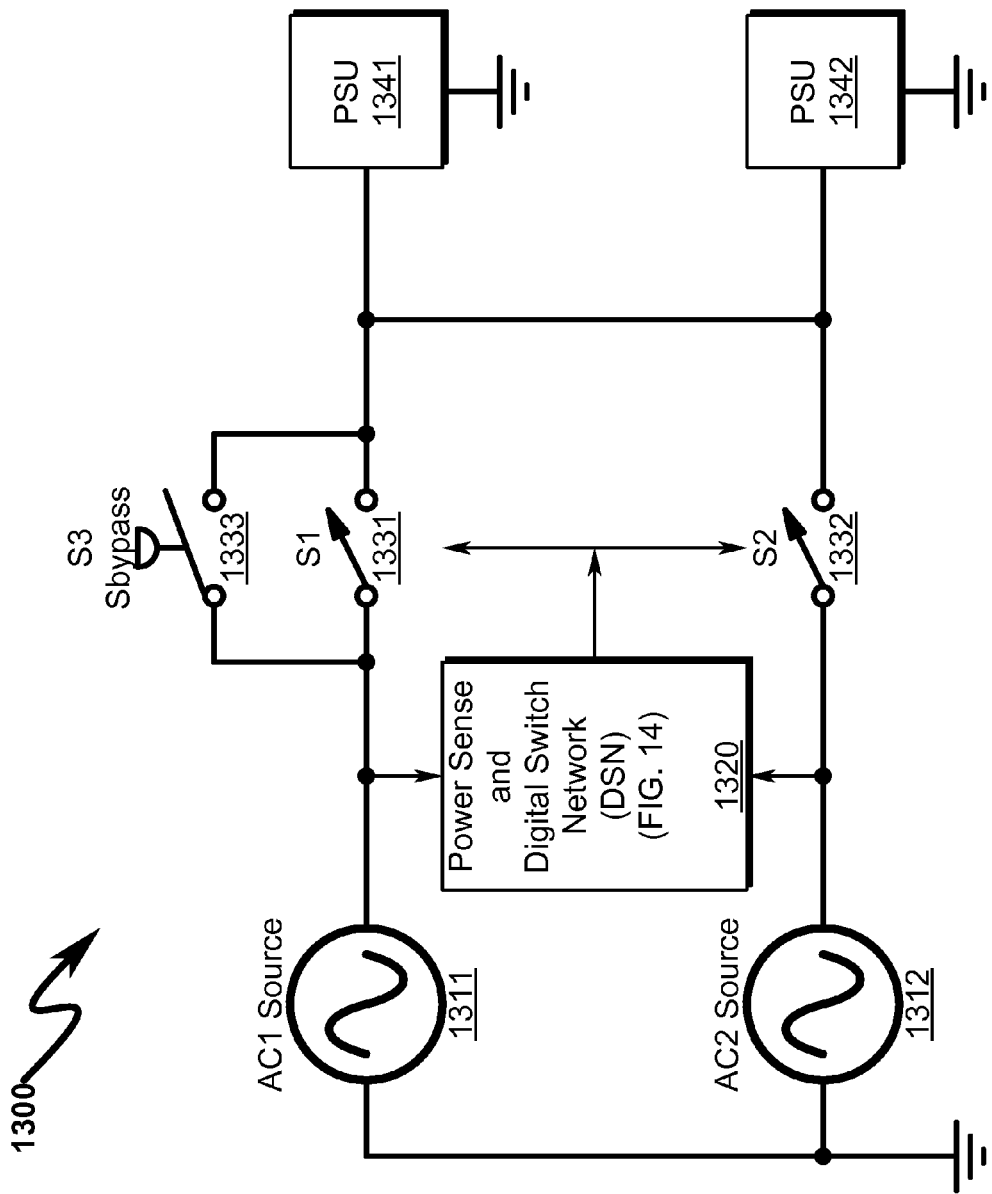
FIG. 13 illustrates an exemplary schematic diagram depicting a preferred system embodiment implementing a Dual AC Input System with Manual Bypass.
Figure 14:
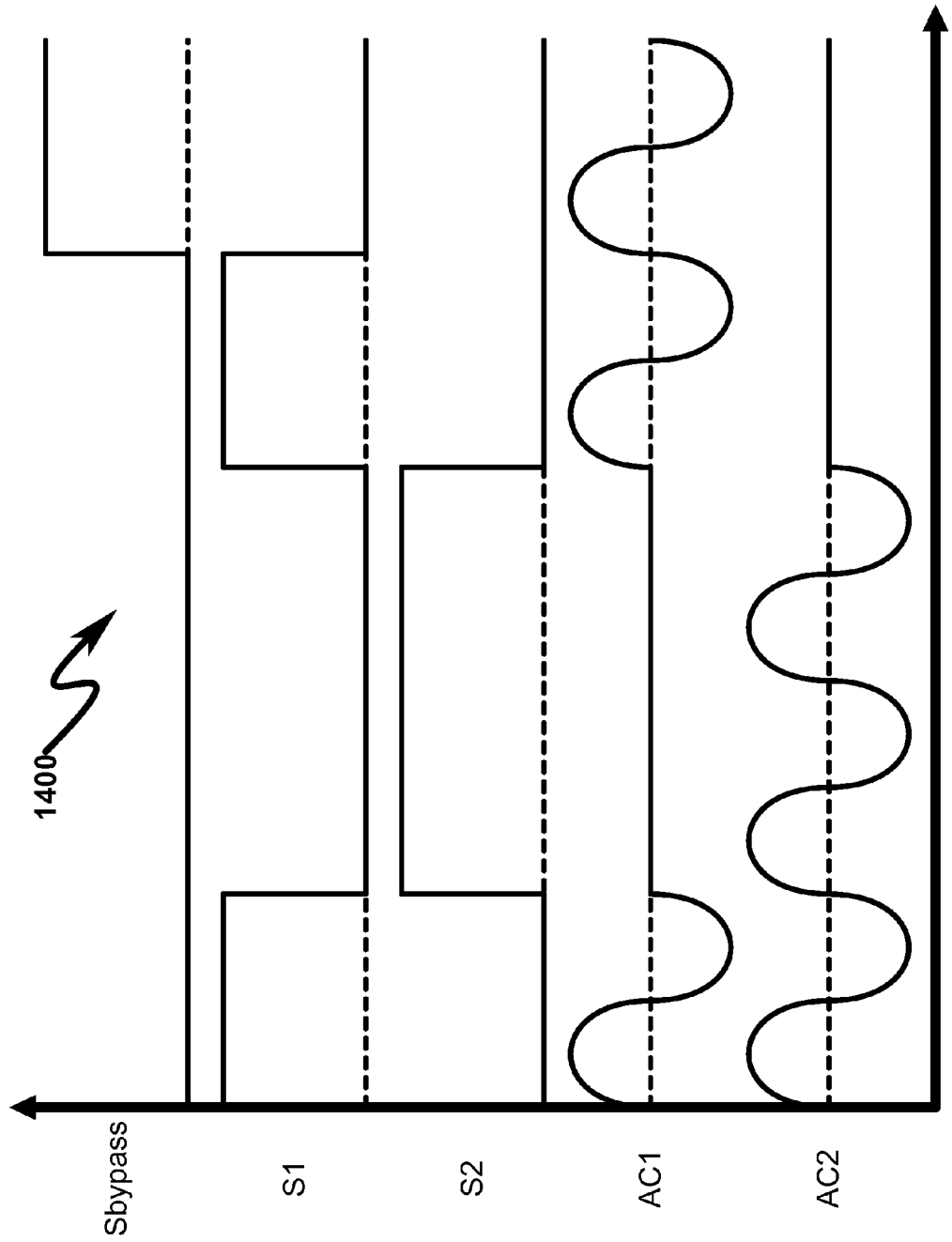
FIG. 14 illustrates exemplary power condition sensing and control waveforms associated with the schematic of FIG. 13.

FIG. 13 (1300)-FIG. 14 (1400) depict a power supply configuration backup mechanism with two AC sources (1311, 1312) that supply power to two PSUs (1341, 1342) with full source protection and include the addition of a manual bypass switch (1333). The power condition sense and digital switch network (DSN) (1320) functionality is depicted in FIG. 14 (1400) and ensures that all PSUs (1341, 1342) are source protected and that selection of the AC source (1311, 1312) is realized through on/off control of complementary switches S1 (1331) and S2 (1332). Manual bypass switch (1333) allows maintenance functions to be engaged for the complementary switches S1 (1331) and S2

(1332) by manual selection of AC1 source (1311) without loss of power to the PSUs (1311, 1312). Equivalent configurations (not shown) may utilize AC2 source (1312) as the PSS during the bypass operation.

Dual AC Input System—Automatic Bypass (1500)-(1600)

Figure 15:
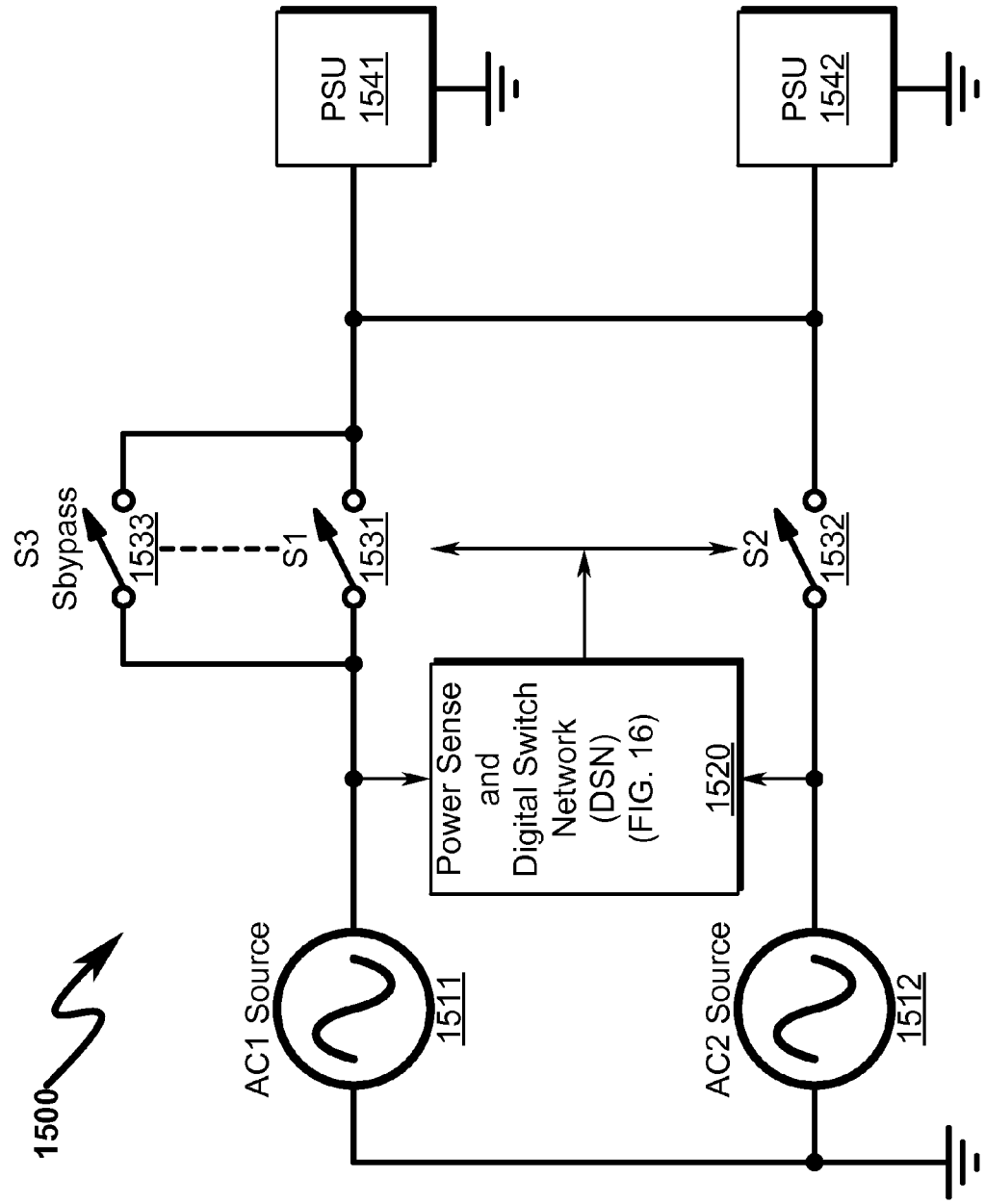
FIG. 15 illustrates an exemplary schematic diagram depicting a preferred system embodiment implementing a Dual AC Input System with Automatic Bypass.
Figure 16:
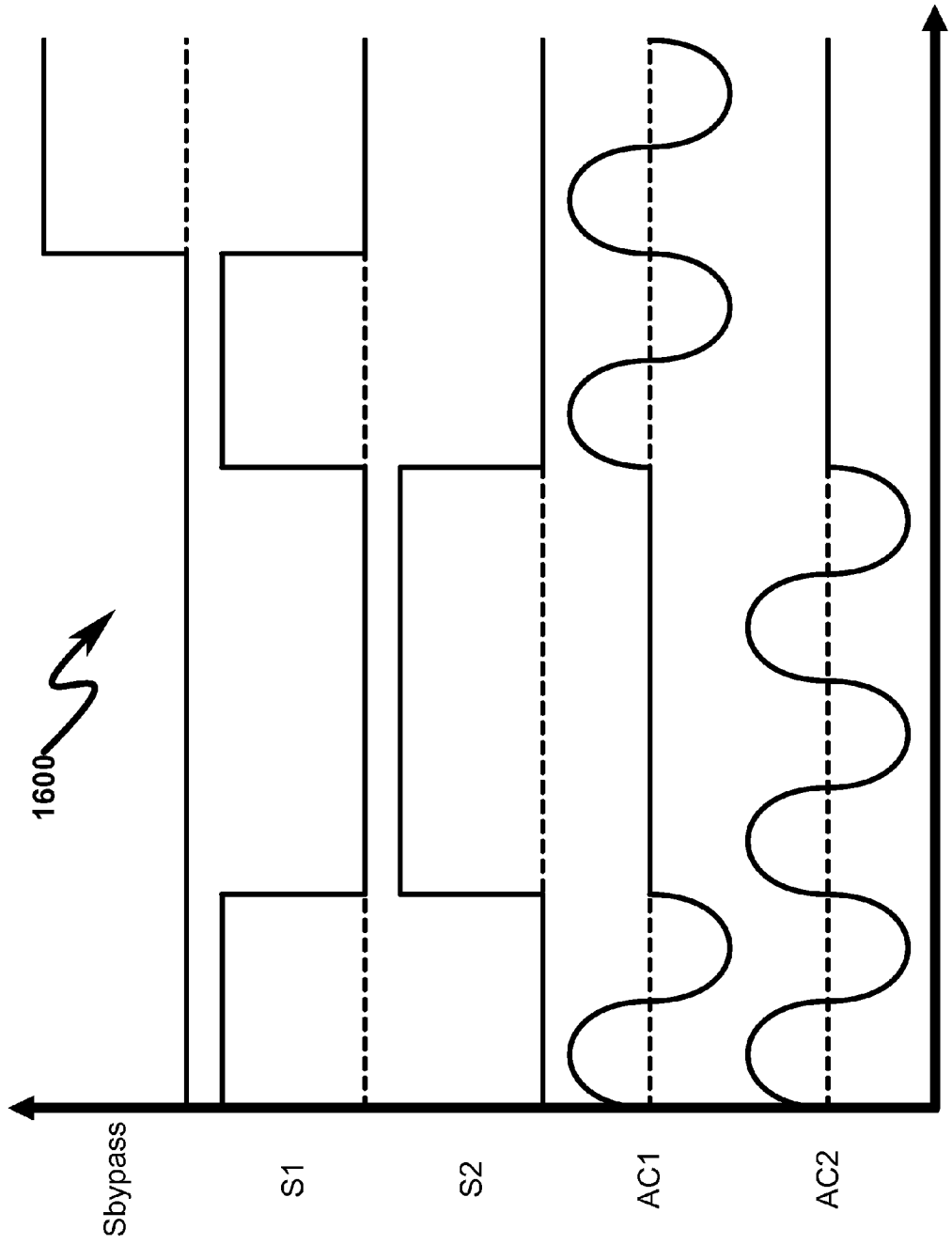
FIG. 16 illustrates exemplary power condition sensing and control waveforms associated with the schematic of FIG. 15.

FIG. 15 (1500)-FIG. 16 (1600) depict a power supply configuration backup mechanism with two AC sources (1511, 1512) that supply power to two PSUs (1541, 1542) with full source protection and include the addition of an automatic bypass switch (1533). The power condition sense and digital switch network (DSN) (1520) functionality is depicted in FIG. 16 (1600) and ensures that all PSUs (1541, 1542) are source protected and that selection of the AC source (1511, 1512) is realized through on/off control of complementary switches S1 (1531) and S2 (1532). Auto bypass switch (1533) allows maintenance functions to be engaged for the complementary switches S1 (1531) and S2 (1532) by automatic selection of AC1 source (1511) without loss of power to the PSUs (1511, 1512). Equivalent configurations (not shown) may utilize AC2 source (1512) as the PSS during the bypass operation.

Dual AC Input System—Switch Redundancy (1700)-(1800)

Figure 17:
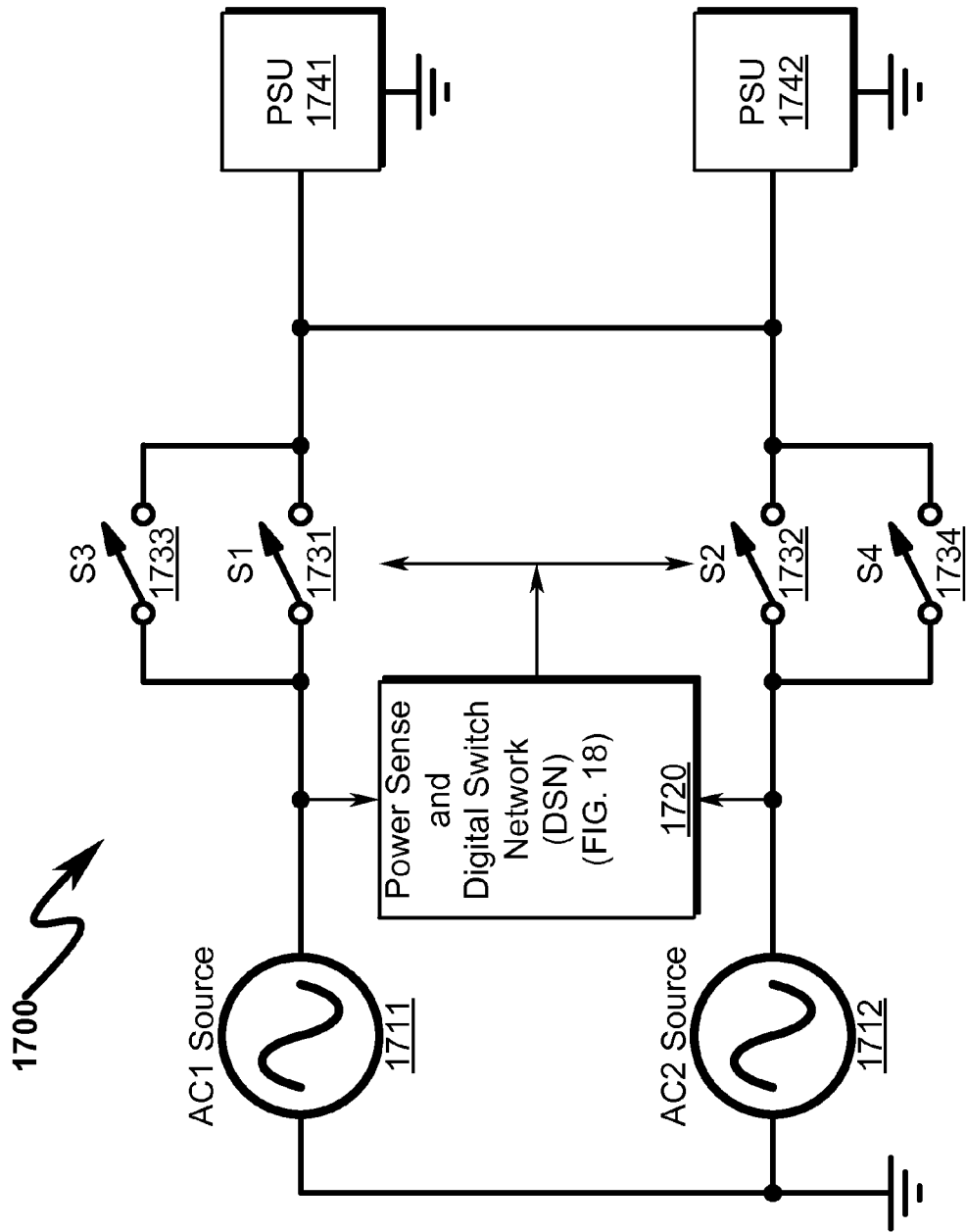
FIG. 17 illustrates an exemplary schematic diagram depicting a preferred system embodiment implementing a Dual AC Input System with Switch Redundancy.
Figure 18:
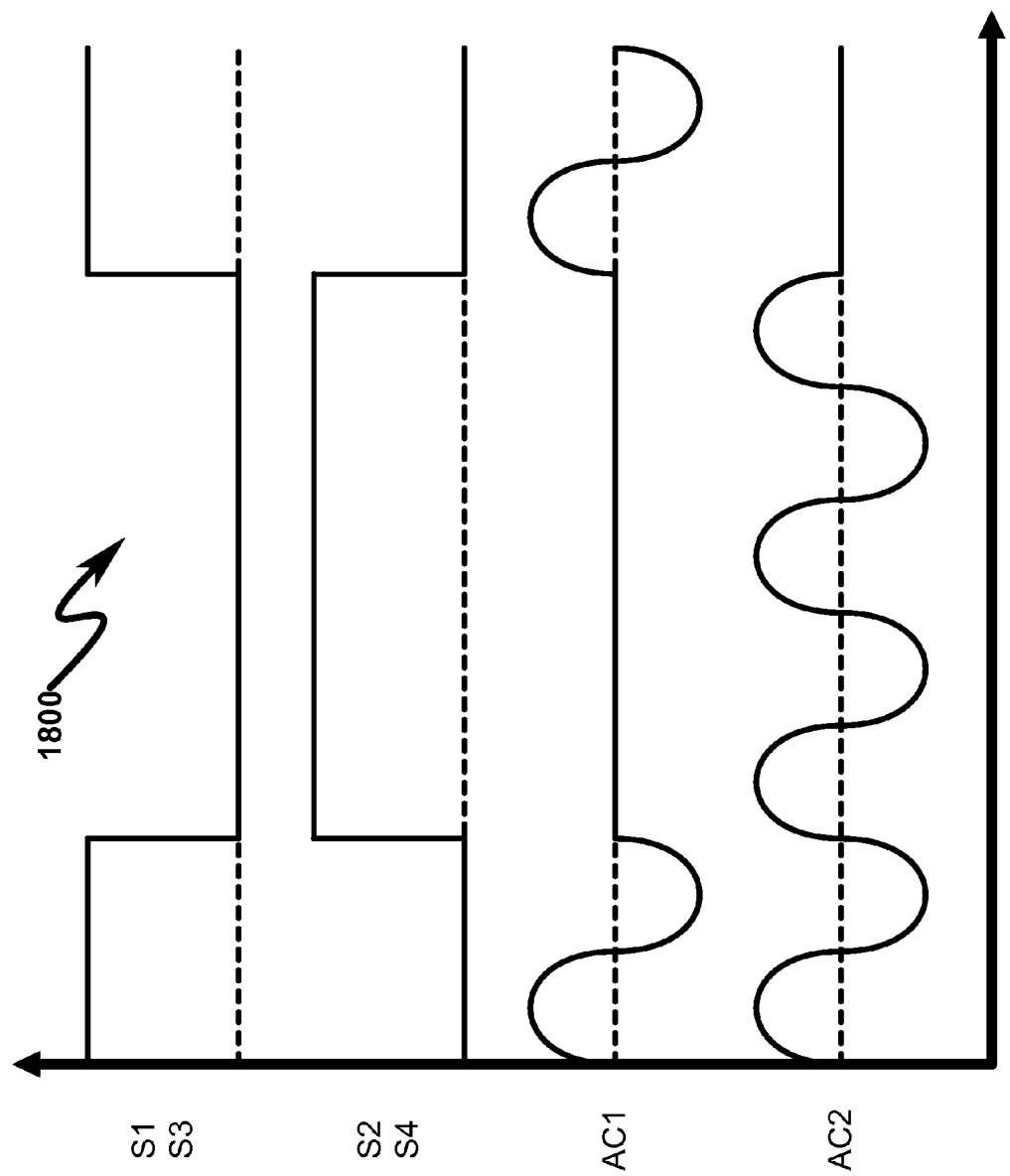
FIG. 18 illustrates exemplary power condition sensing and control waveforms associated with the schematic of FIG. 17.

FIG. 17 (1700)-FIG. 18 (1800) depict a power supply configuration backup mechanism with two AC sources (1711, 1712) that supply power to two PSUs (1741, 1742) with full source protection and include redundant bypass switches (1733, 1734). The power condition sense and digital switch network (DSN) (1720) functionality is depicted in FIG. 18 (1800) and ensures that all PSUs (1741, 1742) are source protected and that selection of the AC source (1711, 1712) is realized through on/off control of complementary switches S1/S3 (1731, 1733) and S2/S4 (1732, 1734). The addition of redundant complementary switches S3 (1733) and S4 (1734) provides for higher reliability of the switching matrix controlled by the (DSN) (1720).

Dual Input System—DC Backup (1900)-(2000)

Figure 19:
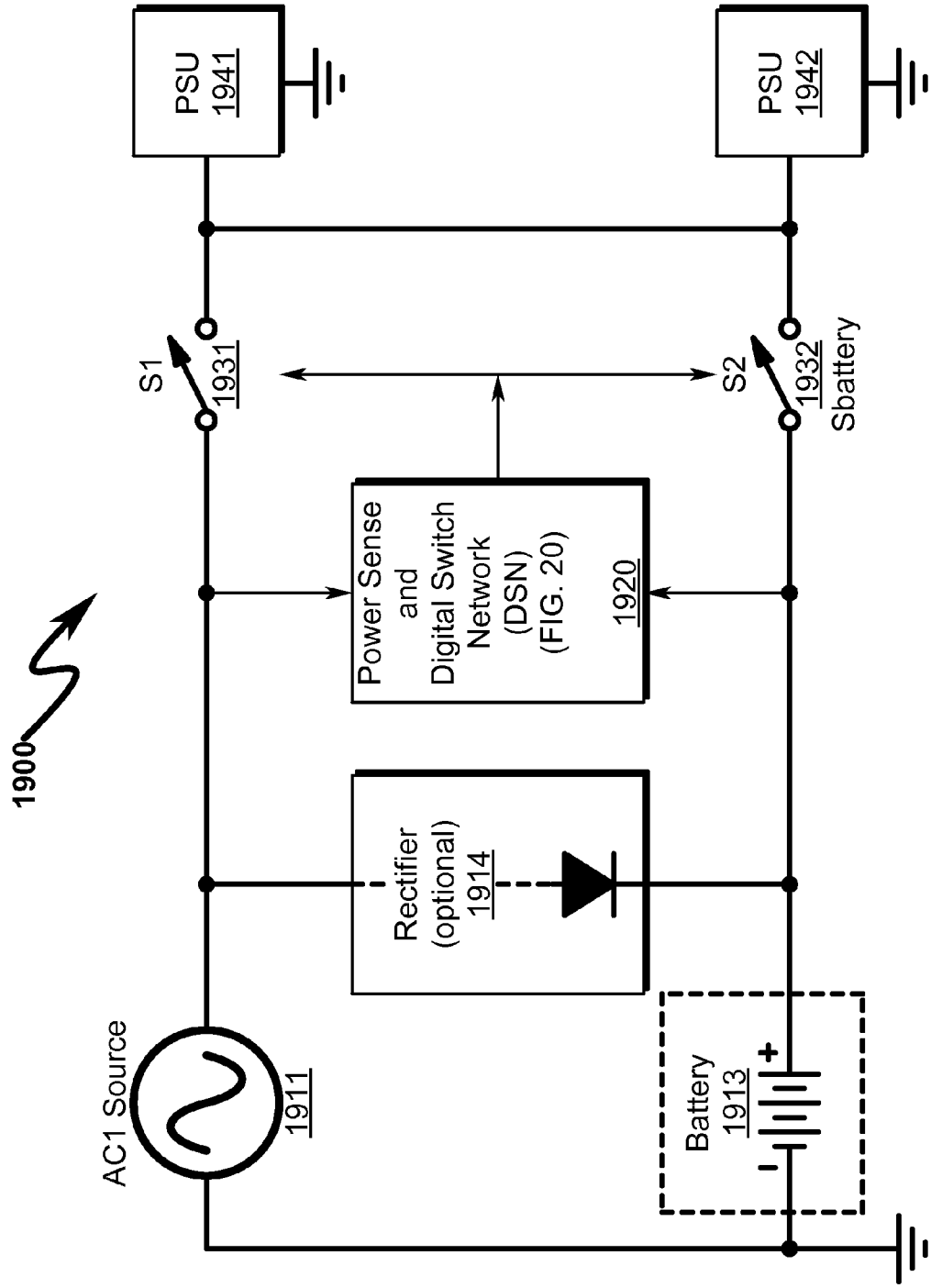
FIG. 19 illustrates an exemplary schematic diagram depicting a preferred system embodiment implementing a Dual Input System with DC Backup.
Figure 20:
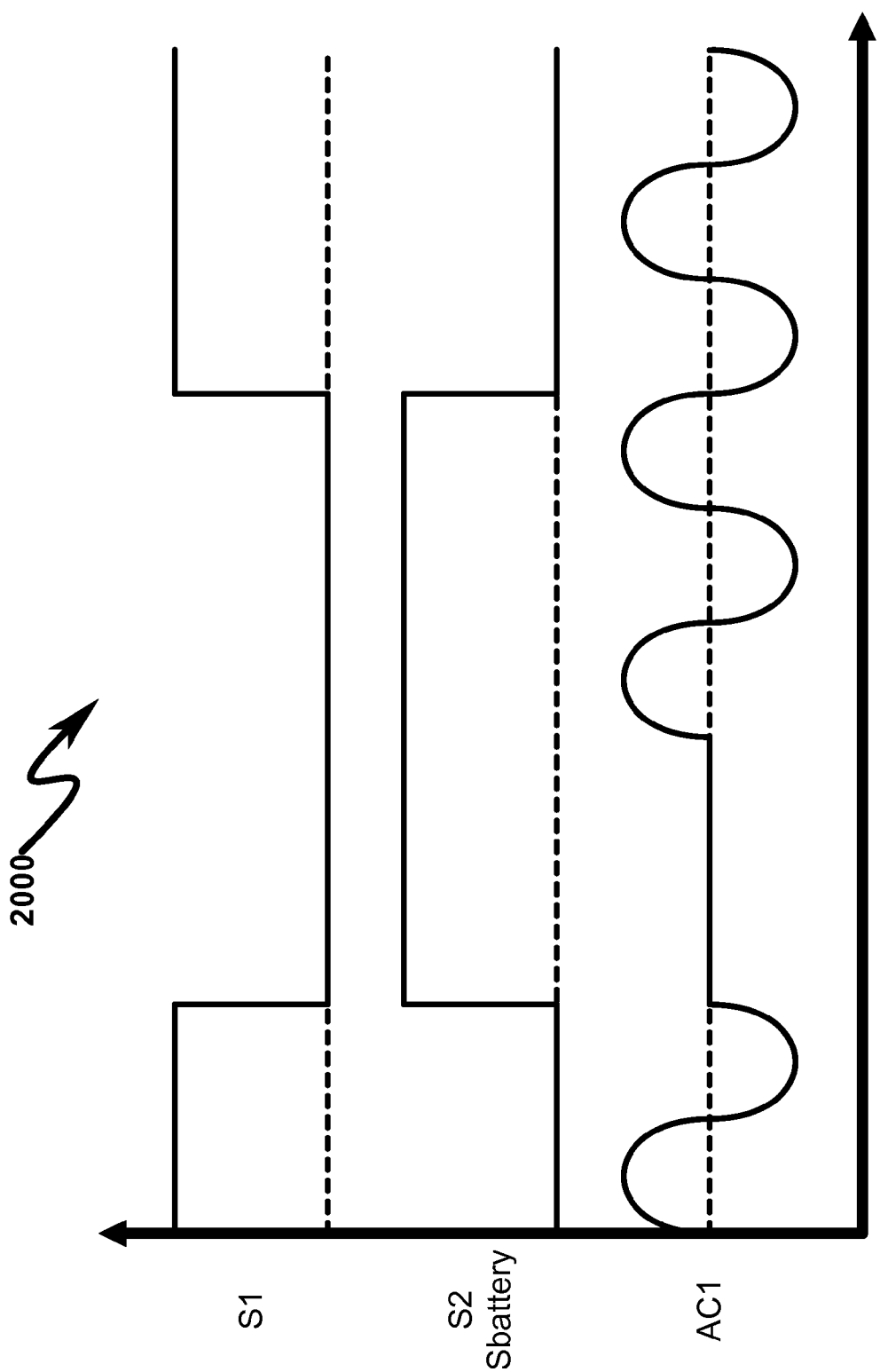
FIG. 20 illustrates exemplary power condition sensing and control waveforms associated with the schematic of FIG. 19.

FIG. 19 (1900)-FIG. 20 (2000) depict a power supply configuration backup mechanism with one AC source (1911) and one DC battery source (1913) that supply power to two PSUs (1941, 1942) with full source protection and includes AC rectification (1914) to charge the DC battery source (1913). The power condition sense and digital switch network (DSN) (1920) functionality is depicted in FIG. 20 (2000) and ensures that all PSUs (1941, 1942) are source protected and that selection of the AC source (1911) or DC source (1913) is realized through on/off control of complementary switches S1 (1931) and S2 (1932).

The switching configuration of complementary switches S1 (1931) and S2 (1932) is configured to connect AC source (1911) to the PSUs (1941, 1942) unless the AC source (1911) fails, in which case the DC battery source (1913) provides power to the PSUs (1941, 1942). The PSUs (1941, 1942) depicted may operate in this context because of their AC+DC power supply configuration that provides for universal power input.

The AC rectification (1914) used to charge the DC battery source (1913) may in some implementations be eliminated if the DC battery source (1913) is standalone or configured to be maintained by an alternate charging mechanism. As depicted in FIG. 20 (2000), the power condition sense and digital switch network (DSN) (1920) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (1920) functions described herein.

Dual AC Input System with DC Backup (2100)-(2200)

Figure 21:
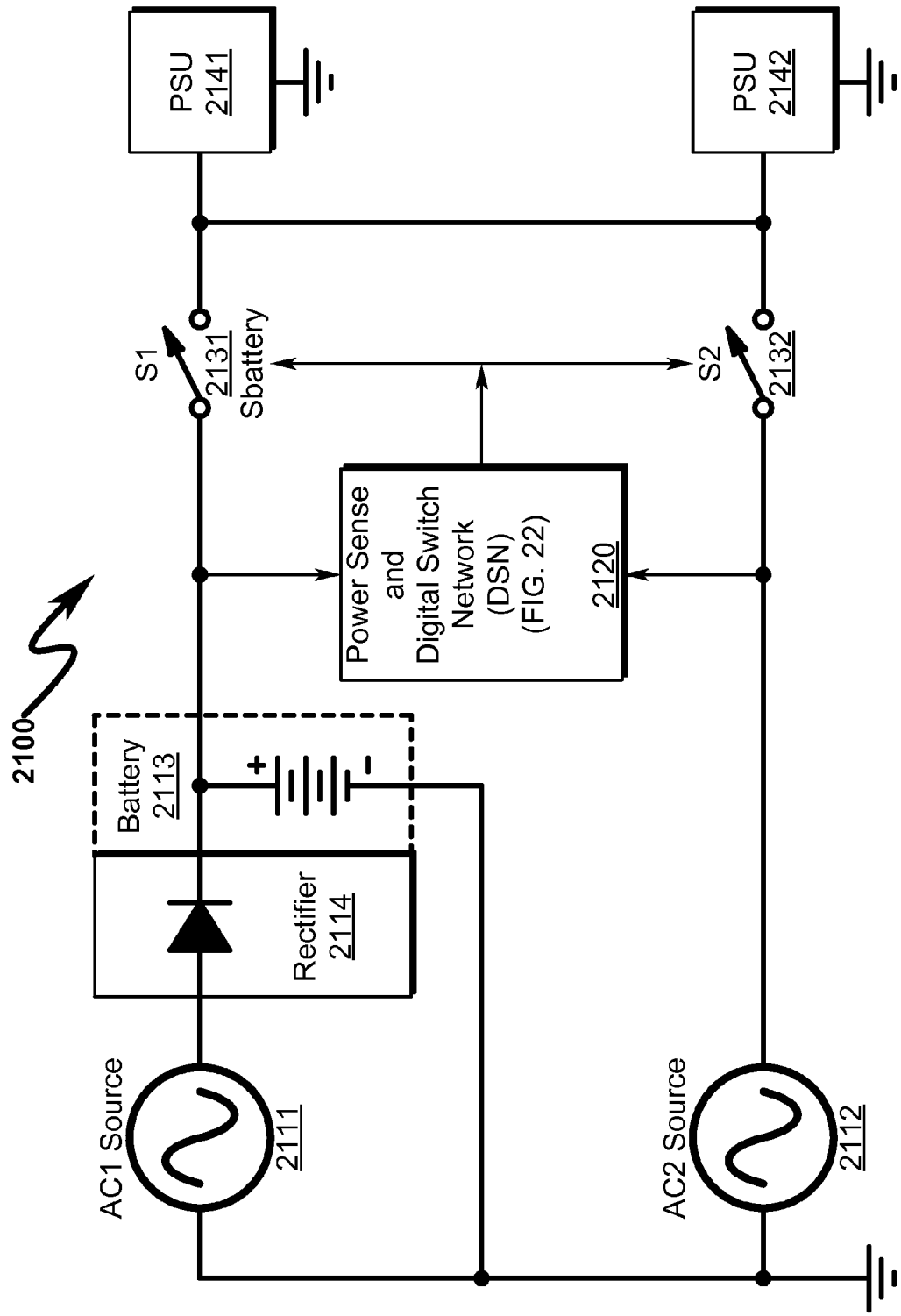
FIG. 21 illustrates an exemplary schematic diagram depicting a preferred system embodiment implementing a Dual AC Input System with DC Backup.
Figure 22:
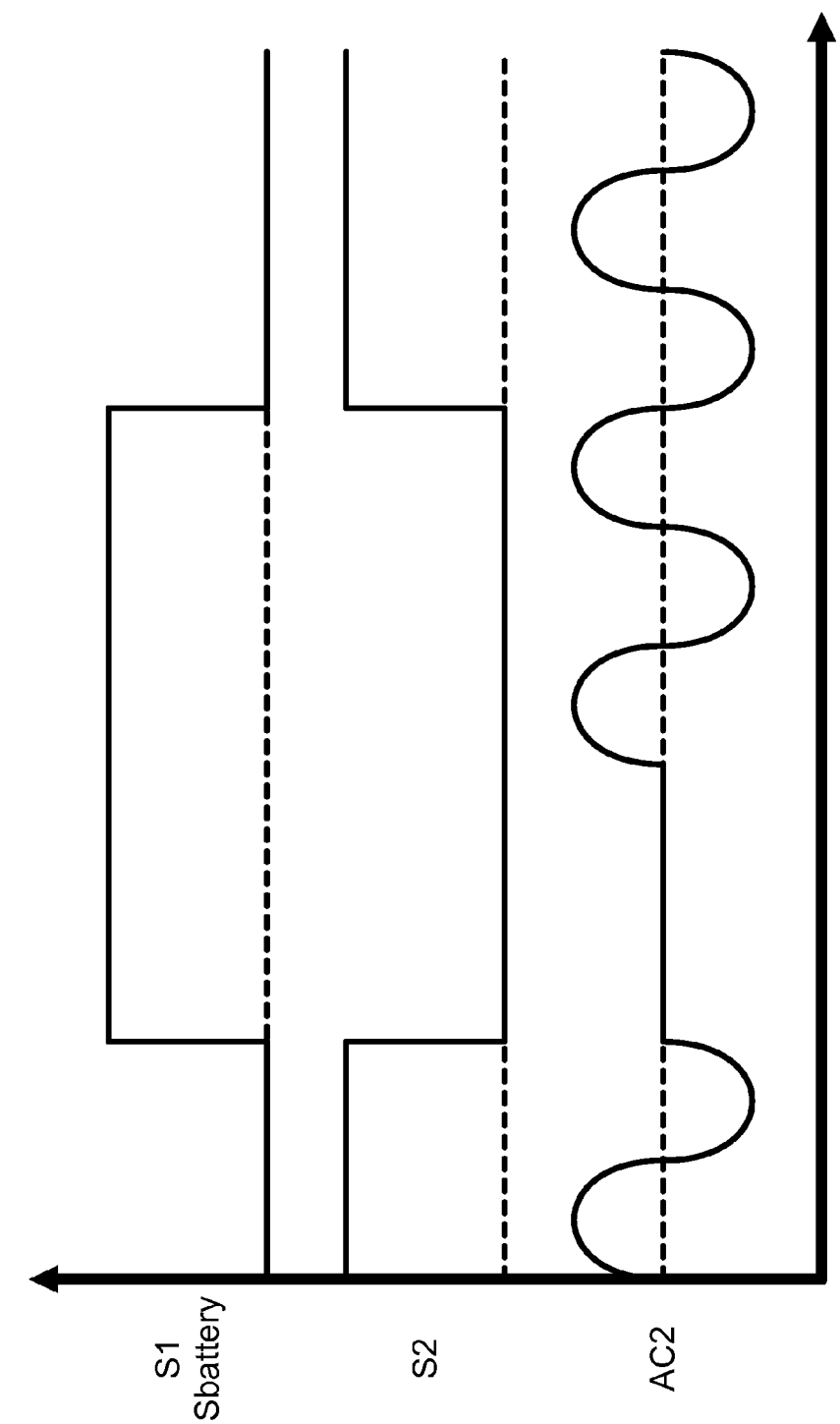
FIG. 22 illustrates exemplary power condition sensing and control waveforms associated with the schematic of FIG. 21.

FIG. 21 (2100)-FIG. 22 (2200) depict a power supply configuration backup mechanism with two AC sources (2111, 2112) and one DC battery source (2113) that supply power to two PSUs (2141, 2142) with full source protection and includes AC rectification (2114) to charge the DC battery source (2113). The power condition sense and digital switch network (DSN) (2120) functionality is depicted in FIG. 22 (2200) and ensures that all PSUs (2141, 2142) are source protected and that selection of the AC source (2112) or DC source (2113) is realized through on/off control of complementary switches S1 (2131) and S2 (2132).

The switching configuration of complementary switches S1 (2131) and S2 (2132) is configured to connect AC source (2112) to the PSUs (2141, 2142) unless the AC source (2112) fails, in which case the DC battery (2113) provides power to the PSUs (2141, 2142) using AC source (2111) as a charging source. The PSUs (2141, 2142) depicted may operate in this context because of their AC+DC power supply configuration that provides for universal power input.

The AC rectification (2114) used to charge the DC battery source (2113) may in some implementations be eliminated if the DC battery source (2113) is standalone or configured to be maintained by an alternate charging mechanism. As depicted in FIG. 22 (2200), the power condition sense and digital switch network (DSN) (2120) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (2120) functions described herein.

Dual AC Input System with DC Backup—4 PSU (2300)-(2400)

Figure 23:
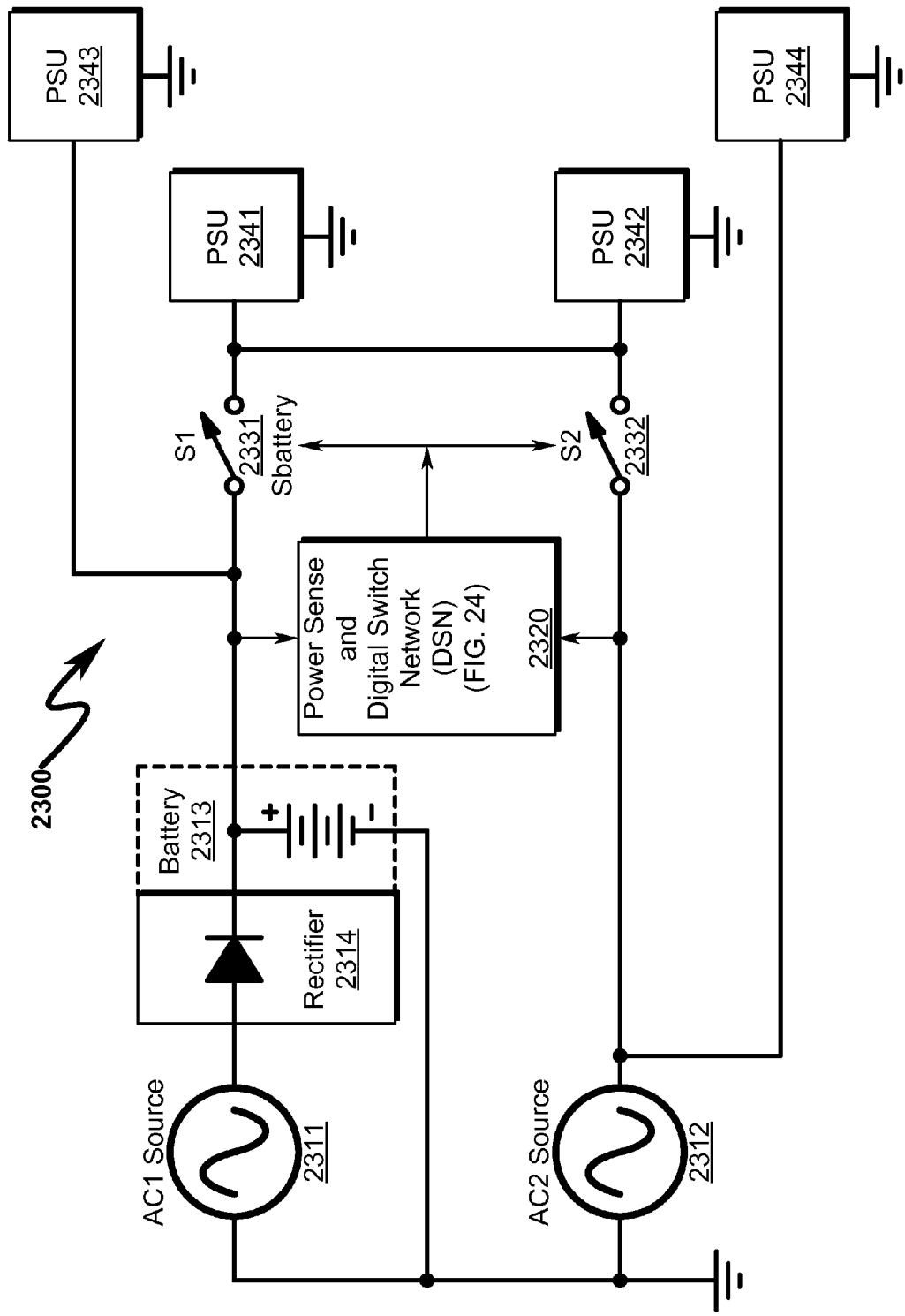
FIG. 23 illustrates an exemplary schematic diagram depicting a preferred system embodiment implementing a Dual AC Input System with DC Backup and 4 PSU.
Figure 24:
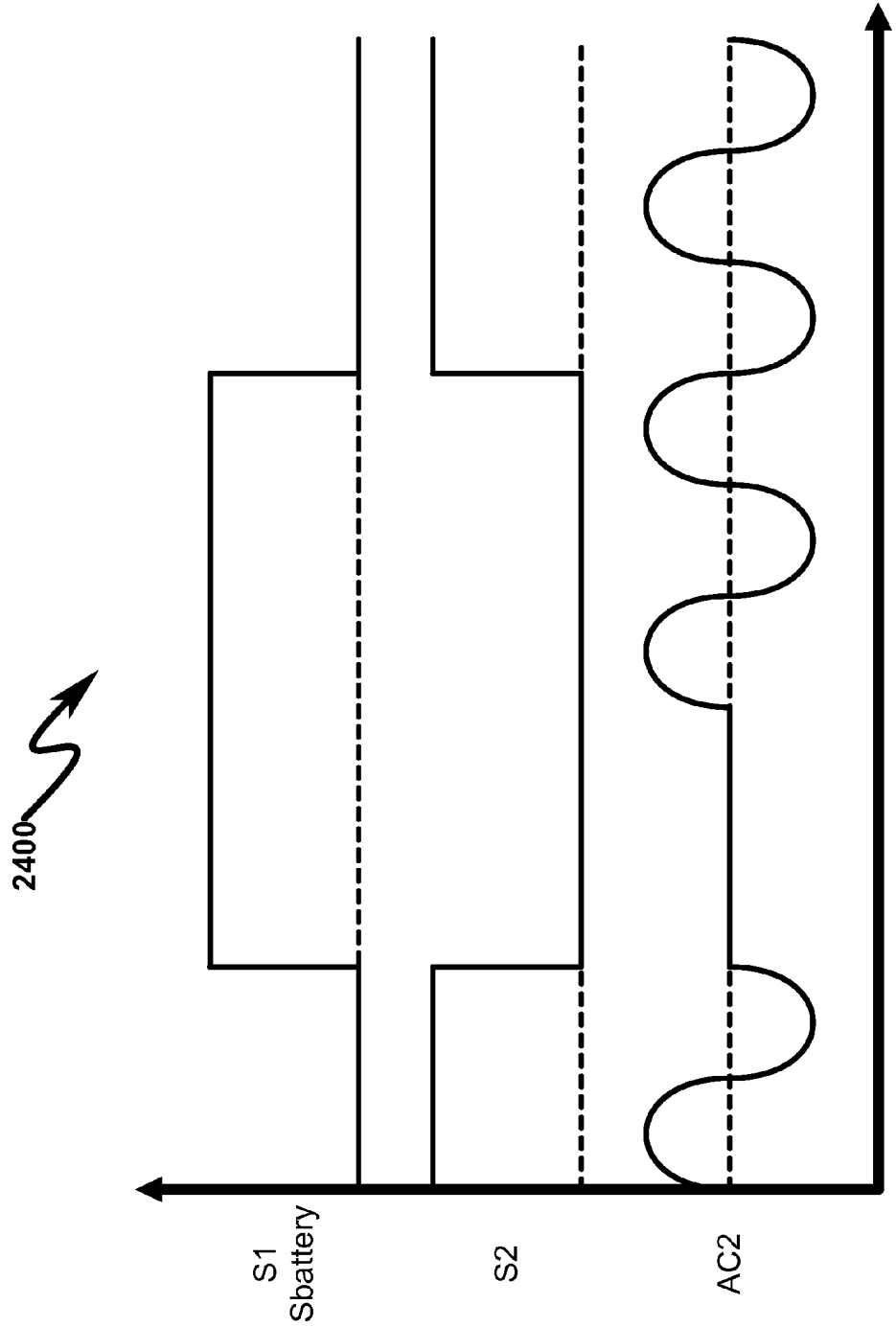
FIG. 24 illustrates exemplary power condition sensing and control waveforms associated with the schematic of FIG. 23.

FIG. 23 (2300)-FIG. 24 (2400) depict a power supply configuration backup mechanism with two AC sources (2311, 2312) and one DC battery source (2313) that supply power to four PSUs (2341, 2342, 2343, 2344) with full source protection for two PSUs (2341, 2342) and no input protection for the remaining two PSUs (2343, 2344) and includes AC rectifications (2314) to charge the DC battery source (2313). The power condition sense and digital switch network (DSN) (2320) functionality is depicted in FIG. 24 (2400) and ensures that two PSUs (2341, 2342) are fully source protected and that selection of the AC source (2312) or DC source (2313) is realized through on/off control of complementary switches S1 (2331) and S2 (2332).

The switching configuration of complementary switches S1 (2331) and S2 (2332) is configured to connect AC source (2312) to the fully protected PSUs (2341, 2342) unless the AC source (2312) fails, in which case the DC battery (2313) provides power to the PSUs (2341, 2342) using AC source (2311) as a charging source. The PSUs (2341, 2342, 2343, 2344) depicted may operate in this context because of their AC+DC power supply configuration that provides for universal power input.

The AC rectification (2314) used to charge the DC battery source (2313) may in some implementations be eliminated if the DC battery source (2313) is standalone or configured to be maintained by an alternate charging mechanism. As depicted in FIG. 24 (2400), the power condition sense and digital switch network (DSN) (2320) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (2320) functions described herein.

Dual AC Input System with Dc Backup—4 PSU (2500)-(2600)

Figure 25:
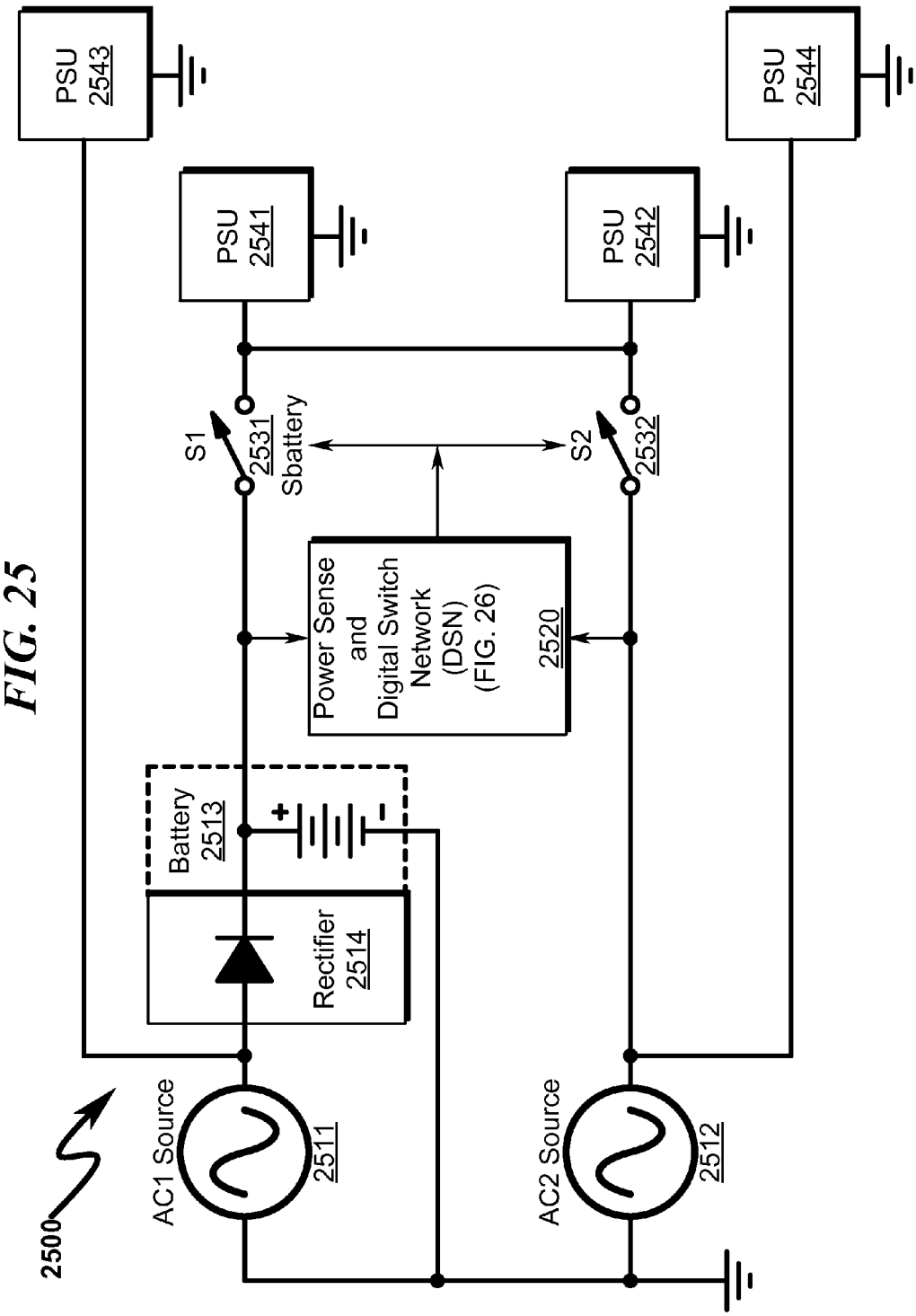
FIG. 25 illustrates an exemplary schematic diagram depicting a preferred system embodiment implementing a Dual AC Input System with DC Backup and 4 PSU.
Figure 26:
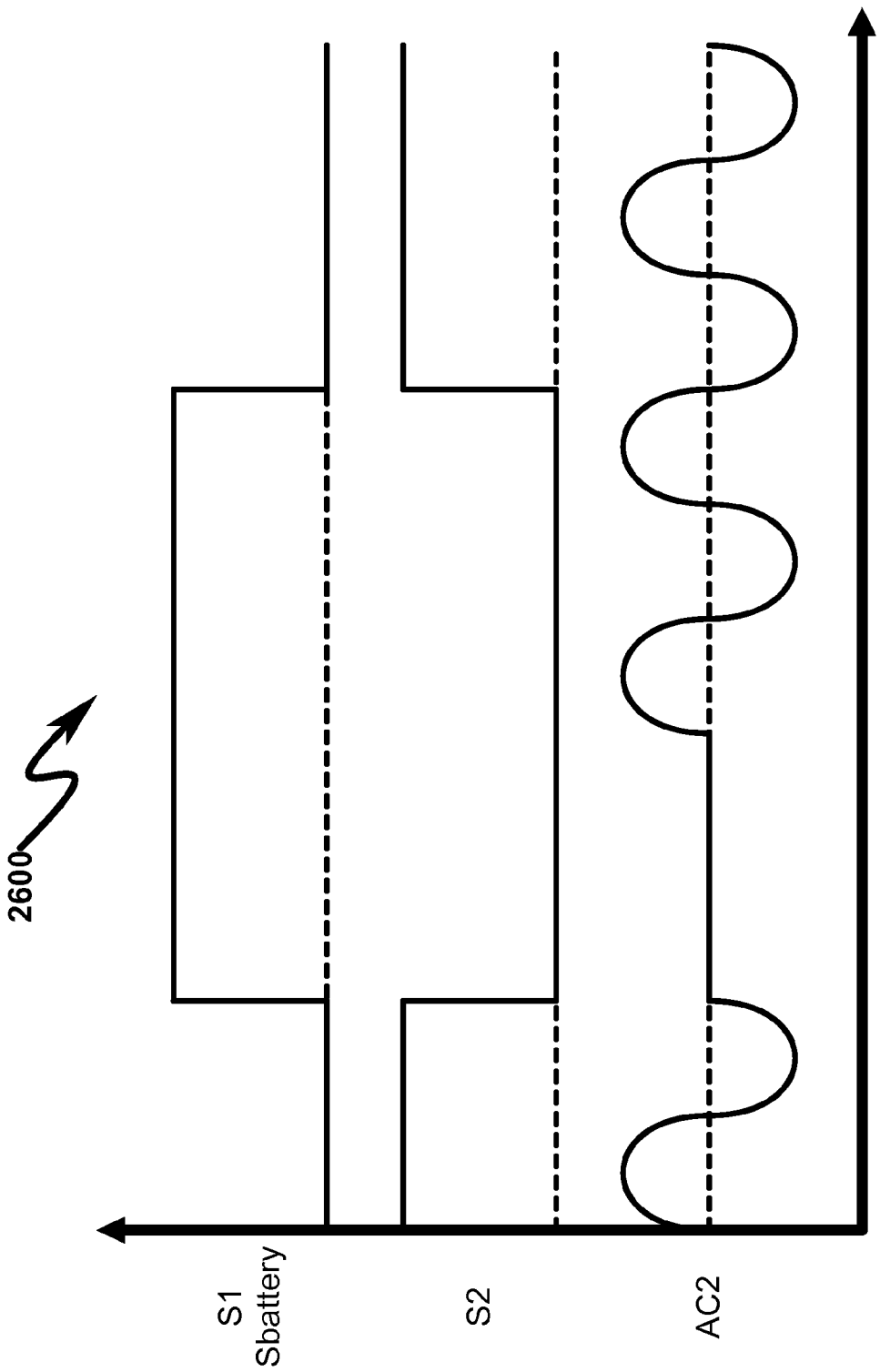
FIG. 26 illustrates exemplary power condition sensing and control waveforms associated with the schematic of FIG. 25.

FIG. 25 (2500)-FIG. 26 (2600) depict a power supply configuration backup mechanism with two AC sources (2511, 2512) and one DC battery source (2513) that supply power to four PSUs (2541, 2542, 2543, 2544) with full source protection for two PSUs (2541, 2542) and no input protection for the remaining two PSUs (2543, 2544) and includes AC rectifications (2514) to charge the DC battery source (2513). The power condition sense and digital switch network (DSN) (2520) functionality is depicted in FIG. 26 (2600) and ensures that two PSUs (2541, 2542) are fully source protected and that selection of the AC source (2512) or DC source (2513) is realized through on/off control of complementary switches S1 (2531) and S2 (2532).

This configuration and functionality is identical to that of FIG. 23 (2300) with the exception that all unprotected PSUs (2543, 2544) are powered directly from the AC sources (2511, 2512). Note that the PSUs (2541, 2542, 2543, 2544) depicted may operate in this context because of their AC+DC power supply configuration that provides for universal power input.

Dual AC+DC Input System (2700)-(2800)

Figure 27:
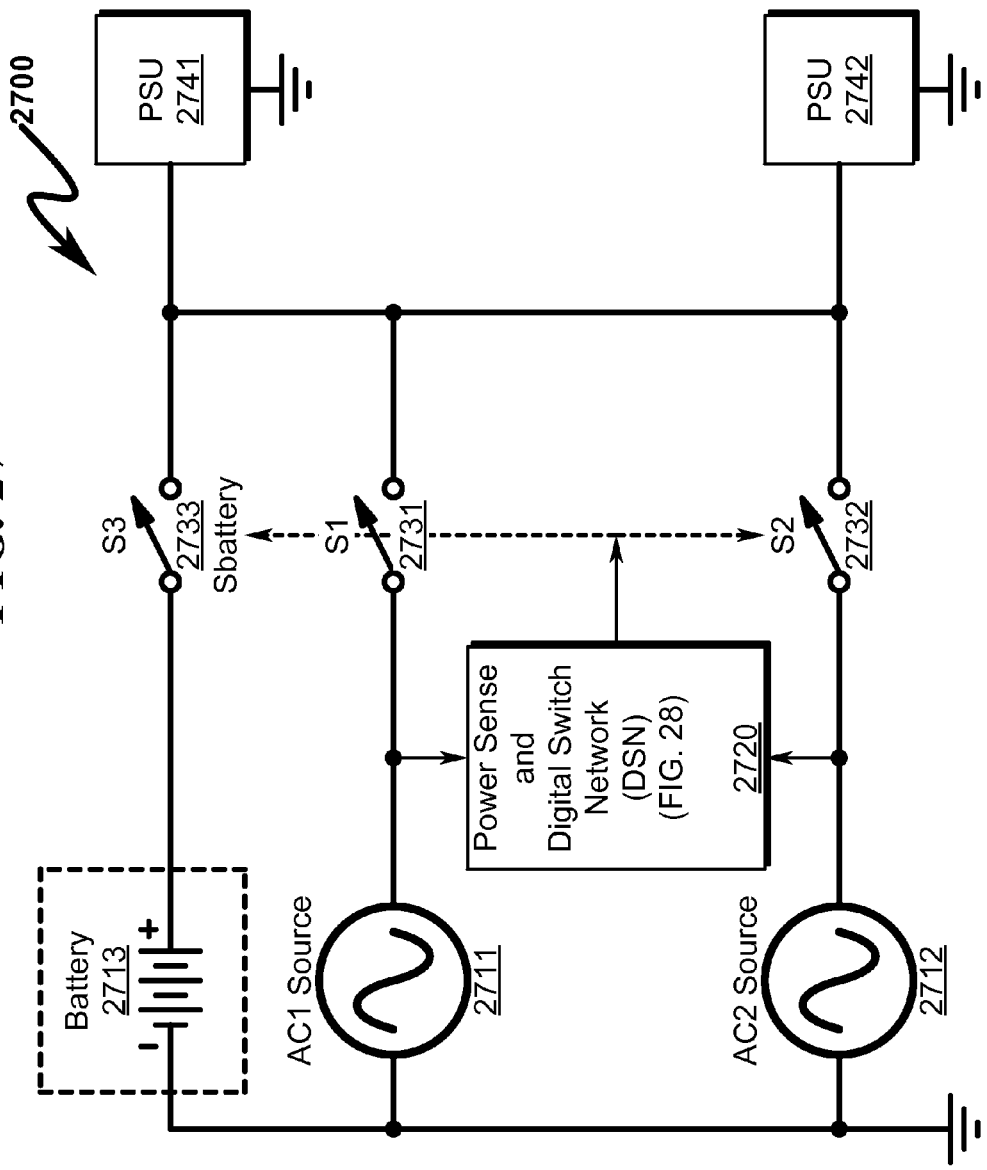
FIG. 27 illustrates an exemplary schematic diagram depicting a preferred system embodiment implementing a Dual AC+DC Input System.
Figure 28:
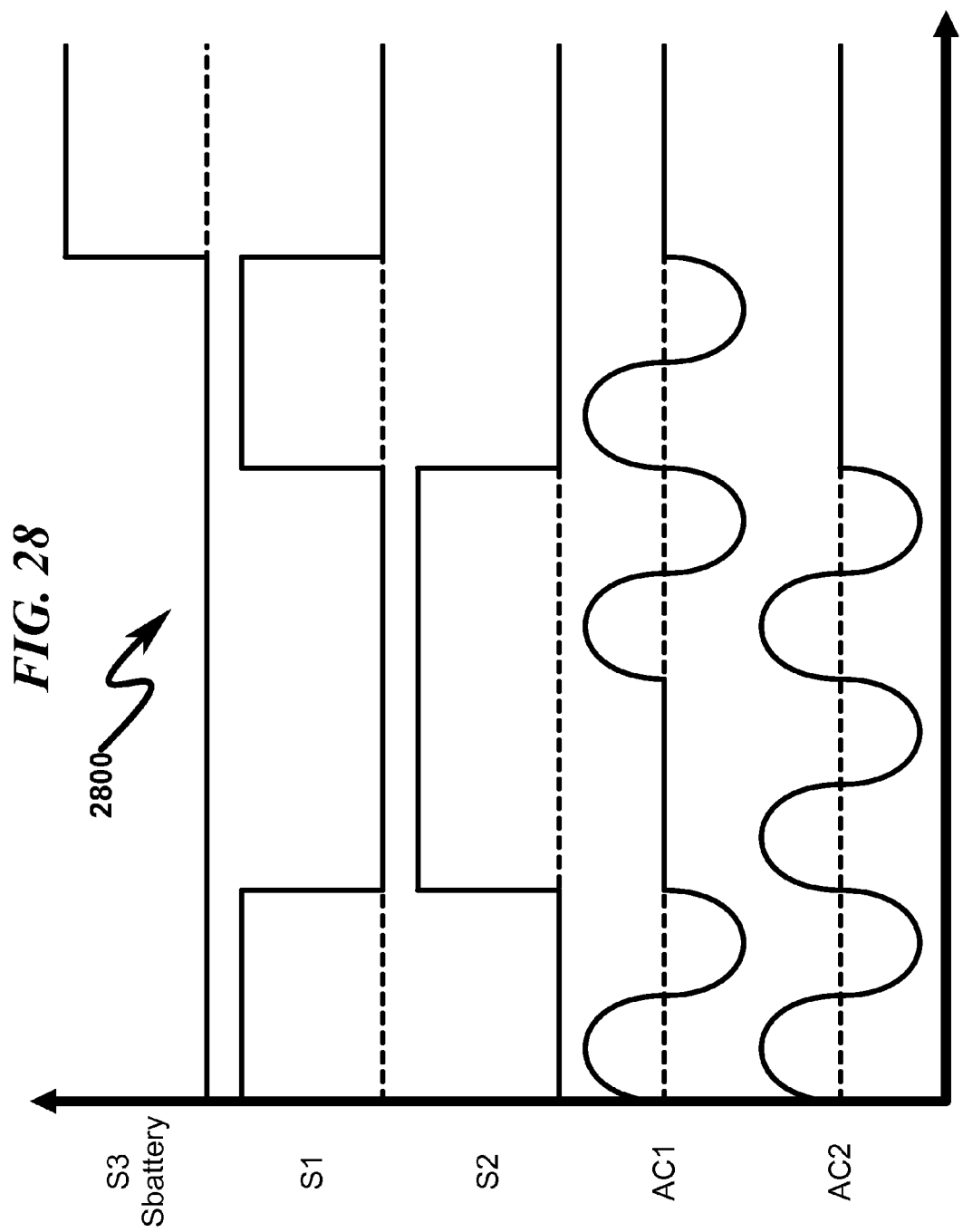
FIG. 28 illustrates exemplary power condition sensing and control waveforms associated with the schematic of FIG. 27.

FIG. 27 (2700)-FIG. 28 (2800) depict a power supply configuration backup mechanism with two AC sources (2711, 2712) and one DC battery source (2713) that supply power to two PSUs (2741, 2742) with full source protection for the PSUs (2741, 2742) and includes a secondary DC battery source (2713). The power condition sense and digital switch network (DSN) (2720) functionality is depicted in FIG. 28 (2800) and ensures that two PSUs (2741, 2742) are fully source protected and that selection of the AC sources (2711, 2712) or DC battery source (2713) is realized through on/off control of complementary switches S1 (2731), S2 (2732), and S3 (2733).

This configuration permits mixing of AC sources (2711, 2712) and DC battery sources (2713) within the same backup switching configuration. Note that the PSUs (2741, 2742) depicted may operate in this context because of their AC+DC power supply configuration that provides for universal power input.

Dual AC+DC Input System—4 PSU (2900)-(3000)

Figure 29:
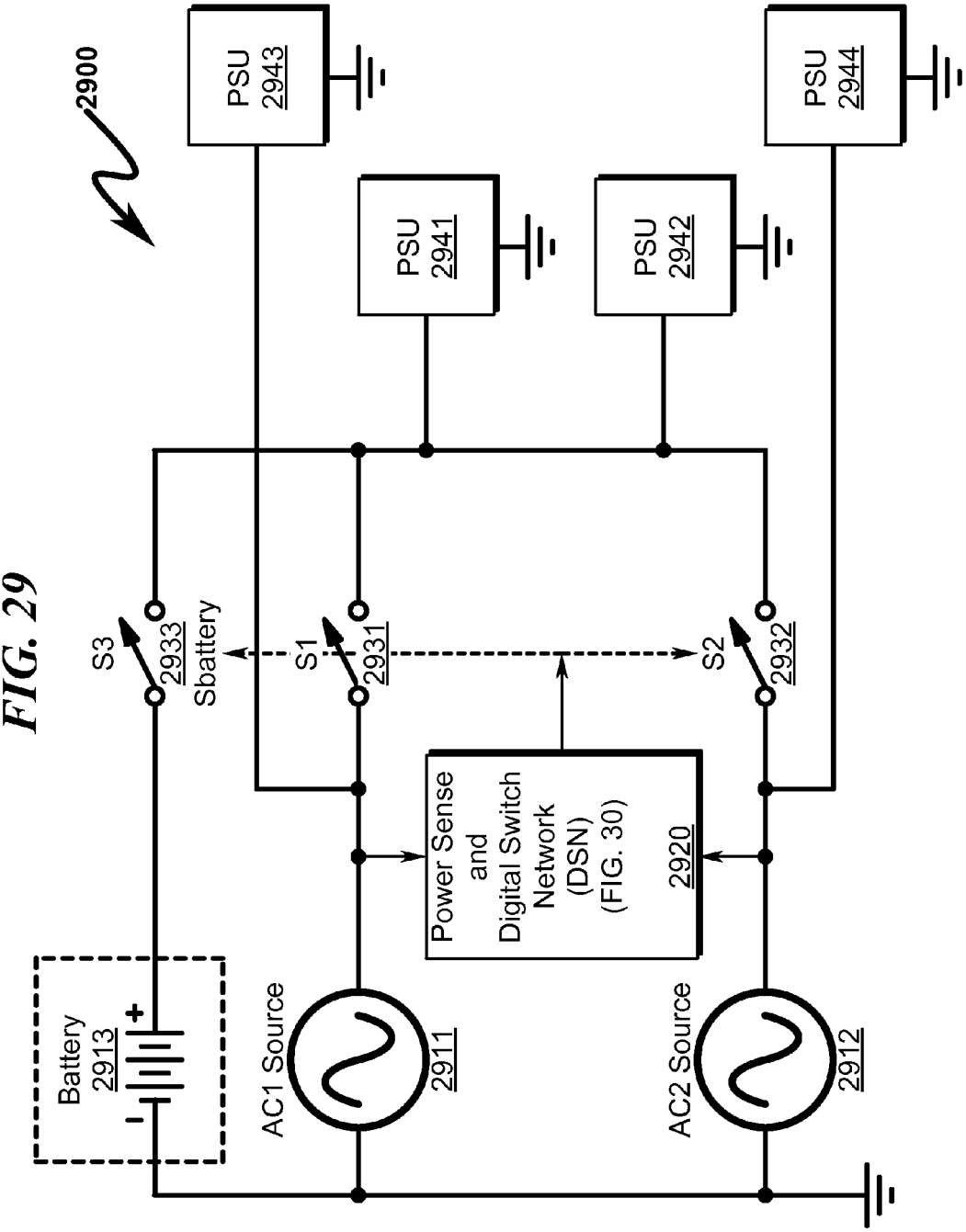
FIG. 29 illustrates an exemplary schematic diagram depicting a preferred system embodiment implementing a Dual AC+DC Input System and 4 PSU.
Figure 30:
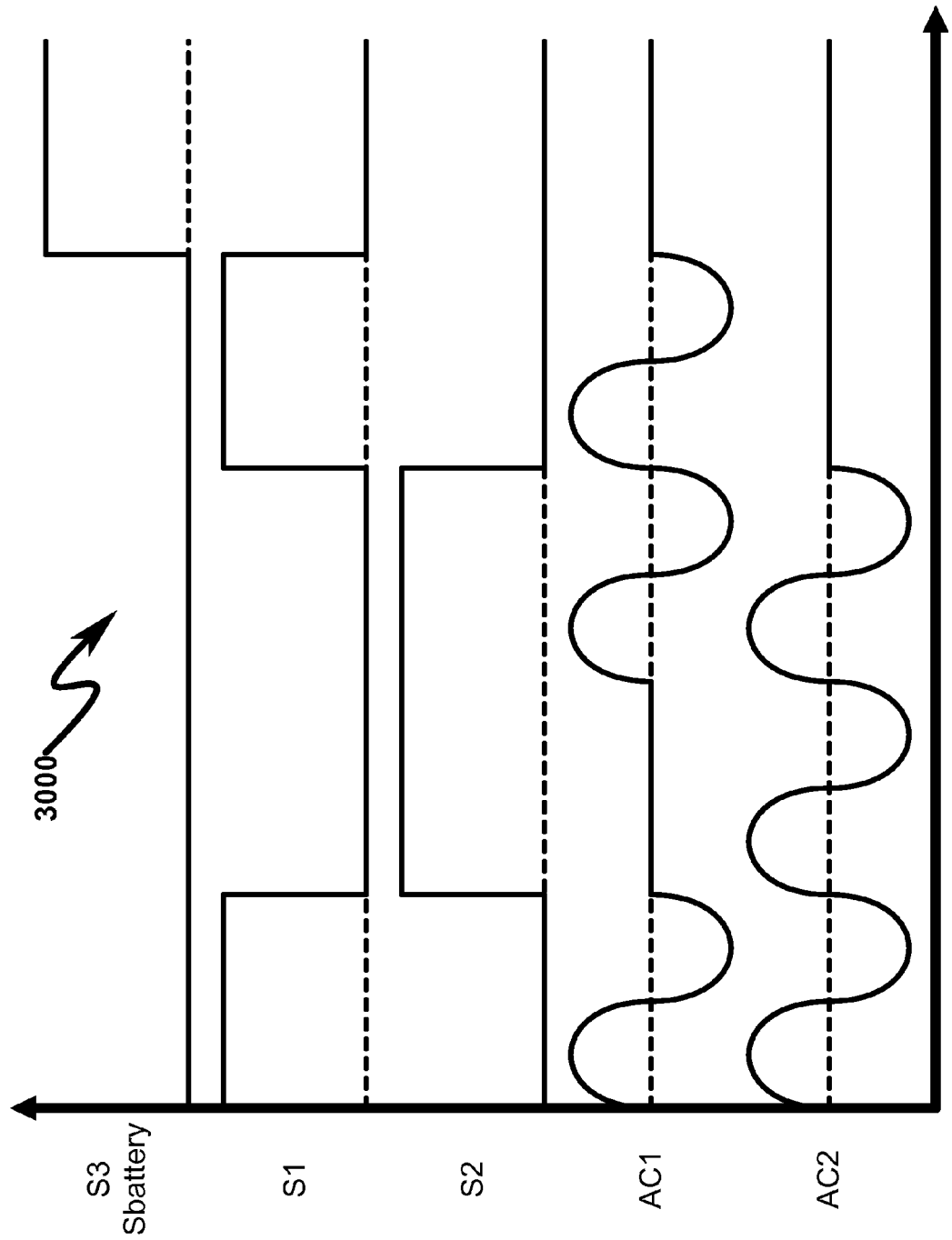
FIG. 30 illustrates exemplary power condition sensing and control waveforms associated with the schematic of FIG. 29.

FIG. 29 (2900)-FIG. 30 (3000) depict a power supply configuration backup mechanism with two AC sources (2911, 2912) and one DC battery source (2913) that supply power to four PSUs (2941, 2942, 2943, 2944) with full source protection for two PSUs (2941, 2942) and no input protection for the two remaining PSUs (2943, 2944) and includes a secondary DC battery source (2913). The power condition sense and digital switch network (DSN) (2920) functionality is depicted in FIG. 30 (3000) and ensures that two PSUs (2941, 2942) are fully source protected with the remaining two PSUs (2943, 2944) source unprotected and that selection of the AC sources (2911, 2912) or DC battery source (2913) is realized through on/off control of complementary switches S1 (2931), S2 (2932), and S3 (2933).

This configuration permits mixing of AC sources (2911, 2912) and DC battery sources (2913) within the same backup switching configuration. This configuration and functionality is identical to that of FIG. 27 (2700) with the exception that all unprotected PSUs (2943, 2944) are powered directly from the AC sources (2911, 2912). Note that the PSUs (2941, 2942, 2943, 2944) depicted may operate in this context because of their AC+DC power supply configuration that provides for universal power input.

Dual AC+DC+Alternate Energy Input System (3100))-(3200)

Figure 31:
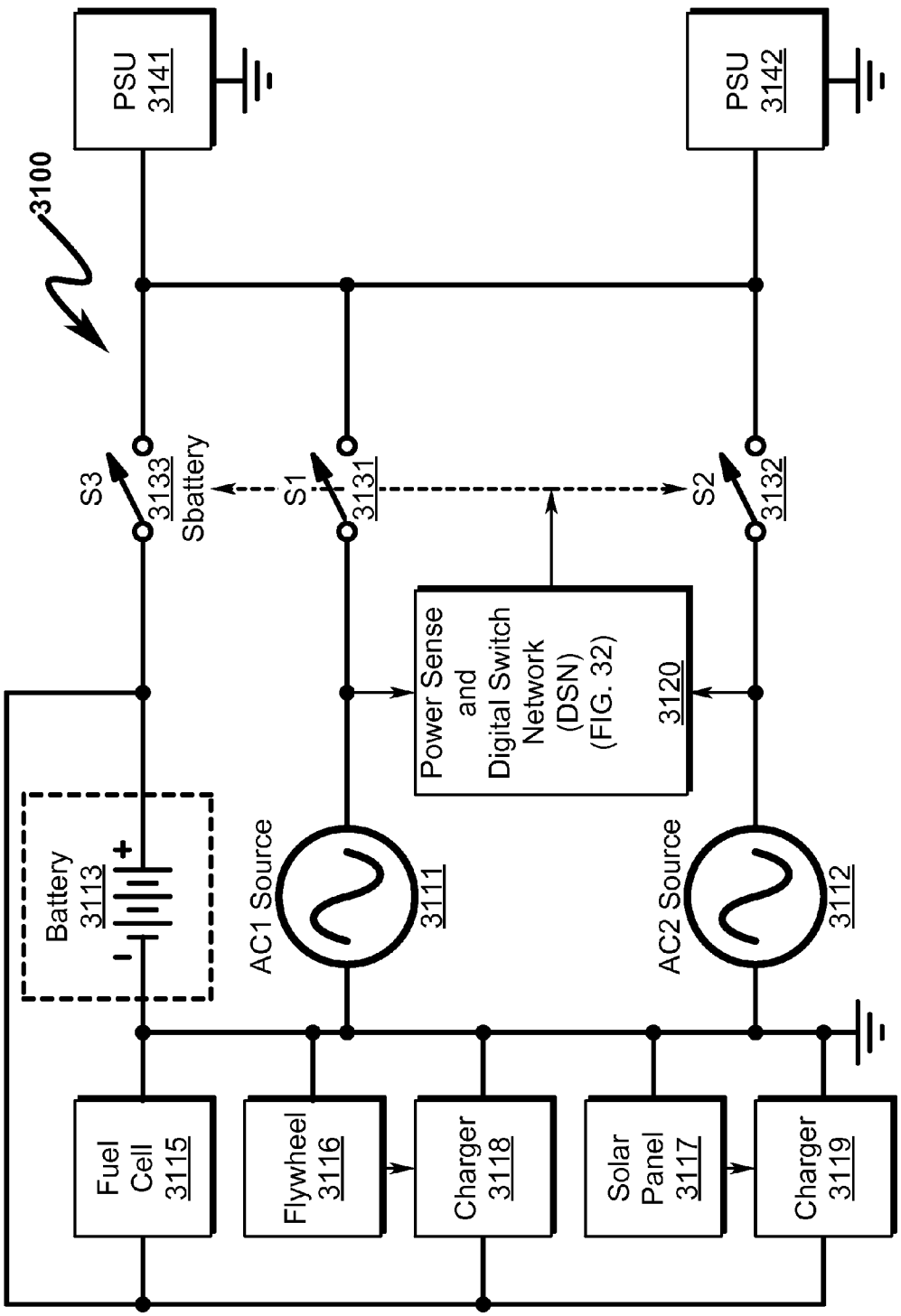
FIG. 31 illustrates an exemplary schematic diagram depicting a preferred system embodiment implementing a Dual AC+DC+Alternate Energy Input System.
Figure 32:
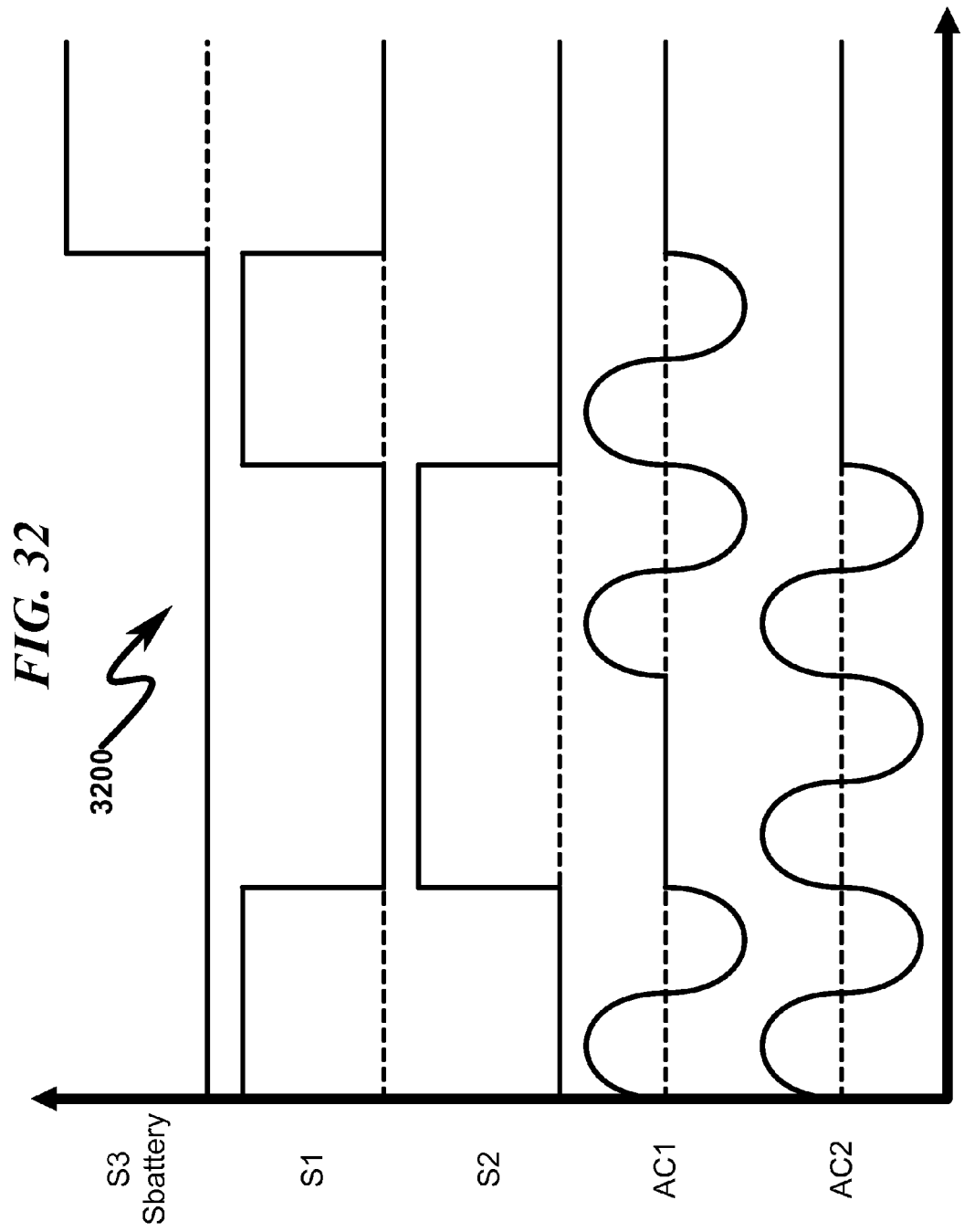
FIG. 32 illustrates exemplary power condition sensing and control waveforms associated with the schematic of FIG. 31.

FIG. 31 (3100)-FIG. 32 (3200) depict a power supply configuration backup mechanism with two AC sources (3111, 3112) and one DC battery source (3113) that supply power to four PSUs (3141, 3142, 3143, 3144) with full source protection for two PSUs (3141, 3142) and no input protection for the two remaining PSUs (3143, 3144) and includes a secondary DC battery source (3113). The power condition sense and digital switch network (DSN) (3120) functionality is depicted in FIG. 32 (3200) and ensures that two PSUs (3141, 3142) are fully source protected with the remaining two PSUs (3143, 3144) source unprotected and that selection of the AC sources (3111, 3112) or DC battery source (3113) is realized through on/off control of complementary switches S1 (3131), S2 (3132), and S3 (3133).

This configuration permits mixing of AC sources (3111, 3112) and DC battery sources (3113) within the same backup switching configuration. This configuration and functionality is identical to that of FIG. 29 (2900) with the exception that alternate energy sources (3115, 3116, 3117) depicted (operating in conjunction with chargers (3118, 3119)) may operate to supply charging current to the DC battery source (3113). Note that the PSUs (3141, 3142, 3143, 3144) depicted may operate in this context because of their AC+DC power supply configuration that provides for universal power input.

Dual AC Input System with DC Backup/Bypass (3300)-(3400)

Figure 33:
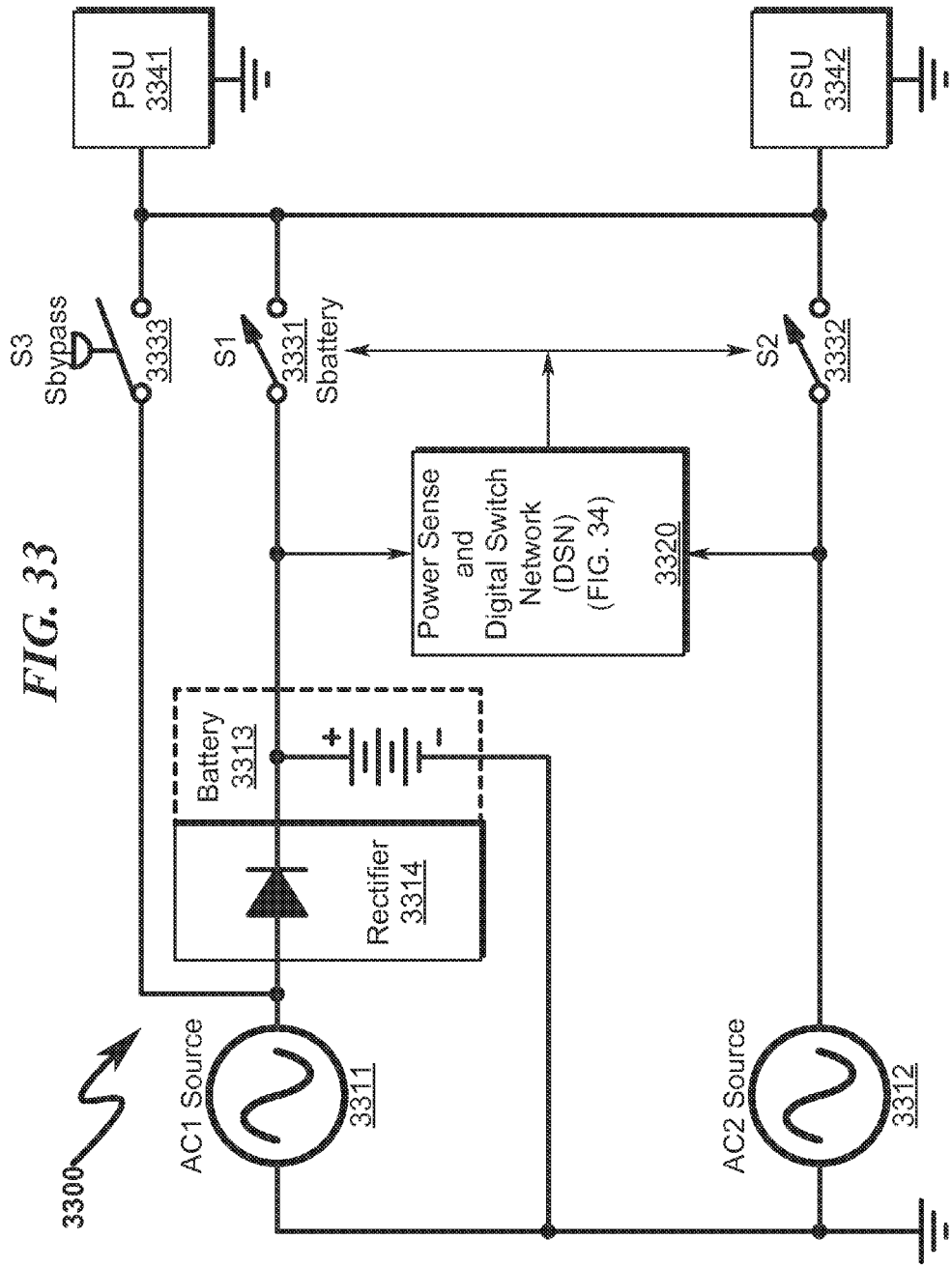
FIG. 33 illustrates an exemplary schematic diagram depicting a preferred system embodiment implementing a Dual AC Input System with DC Backup/Bypass.
Figure 34:
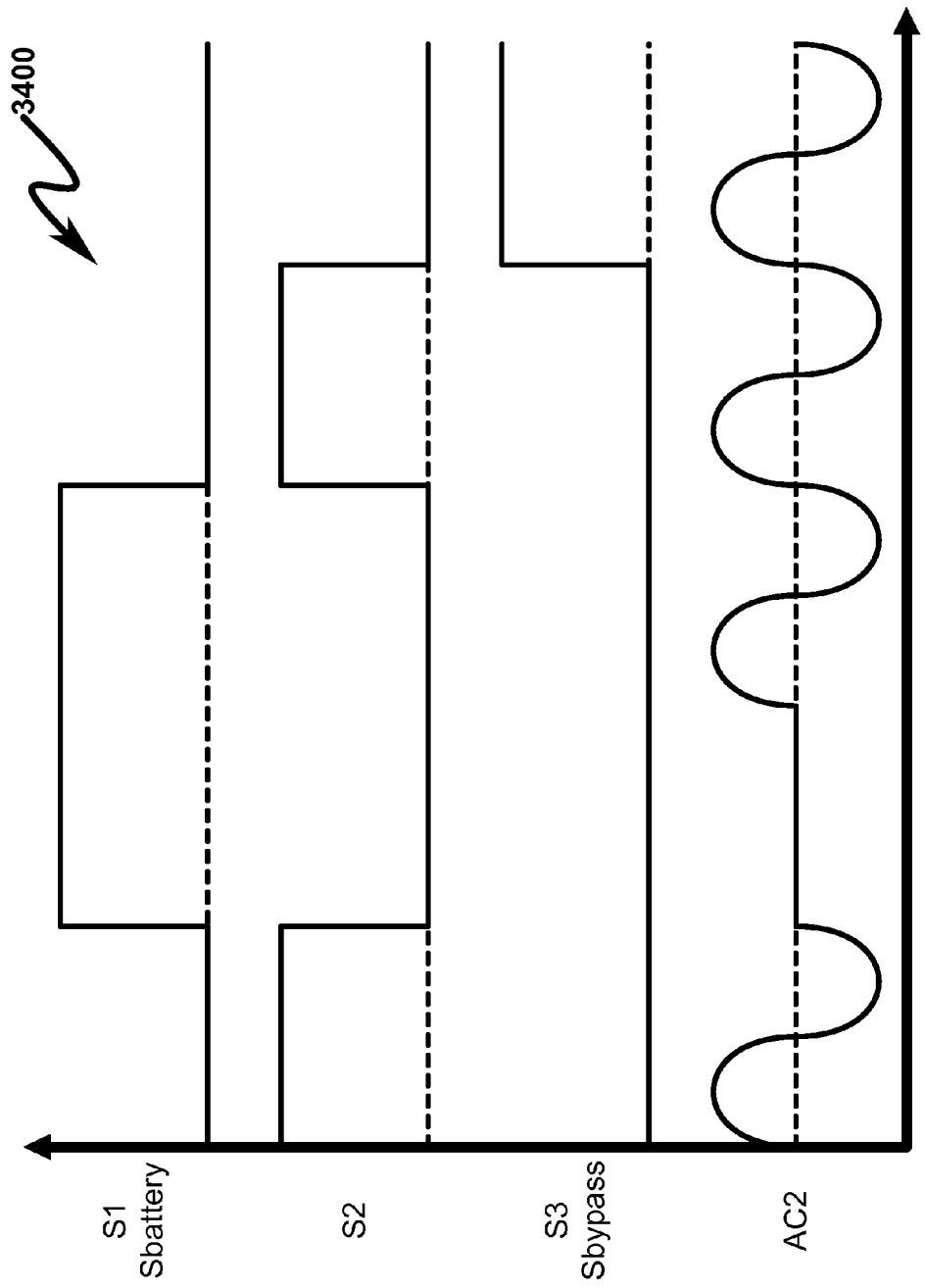
FIG. 34 illustrates exemplary power condition sensing and control waveforms associated with the schematic of FIG. 33.

FIG. 33 (3300)-FIG. 34 (3400) depict a power supply configuration backup mechanism with two AC sources (3311, 3312) and one DC battery source (3313) that supply power to two PSUs (3341, 3342) with full source protection and includes AC rectification (3314) to charge the DC battery source (3313). The power condition sense and digital switch network (DSN) (3320) functionality is depicted in FIG. 34 (3400) and ensures that all PSUs (3341, 3342) are source protected and that selection of the AC source (3312) or DC source (3313) is realized through on/off control of complementary switches S1 (3331) and S2 (3332).

The switching configuration of complementary switches S1 (3331) and S2 (3332) is configured to connect AC source (3312) to the PSUs (3341, 3342) unless the AC source (3312) fails, in which case the DC battery (3313) provides power to the PSUs (3341, 3342) using AC source (3311) as a charging source. The PSUs (3341, 3342) depicted may operate in this context because of their AC+DC power supply configuration that provides for universal power input.

The AC rectification (3314) used to charge the DC battery source (3313) may in some implementations be eliminated if the DC battery source (3313) is standalone or configured to be maintained by an alternate charging mechanism. As depicted in FIG. 34 (3400), the power condition sense and digital switch network (DSN) (3320) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (3320) functions described herein.

This configuration incorporates an automatic bypass switch (3333) to allow for maintenance of the S1 (3331) and/or S2 (3332) switches without loss of power to the PSUs (3341, 3342).

Dual AC Input System with DC Backup—4 PSU (3500)-(3600)

Figure 35:
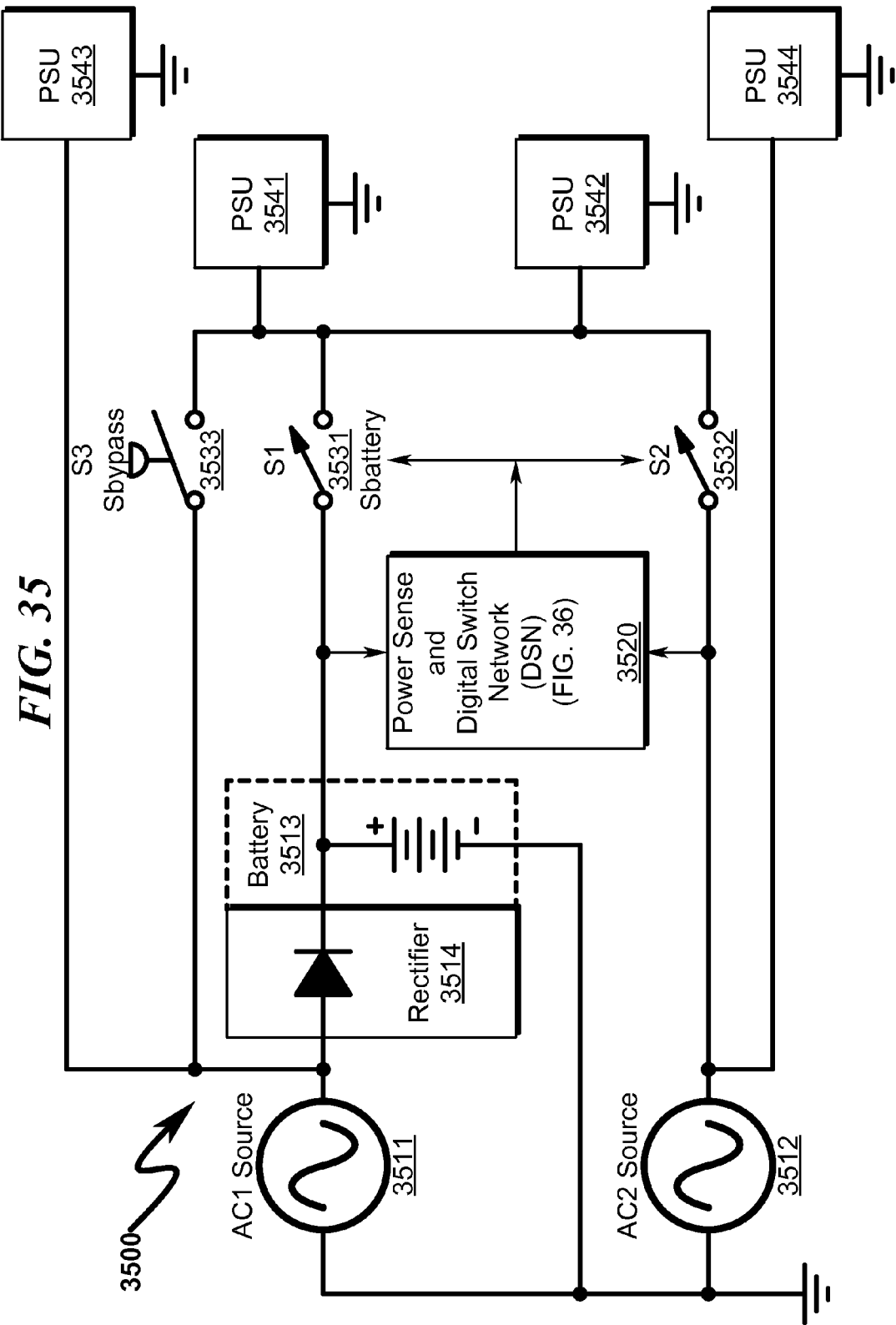
FIG. 35 illustrates an exemplary schematic diagram depicting a preferred system embodiment implementing a Dual AC Input System with DC Backup and 4 PSU.
Figure 36:
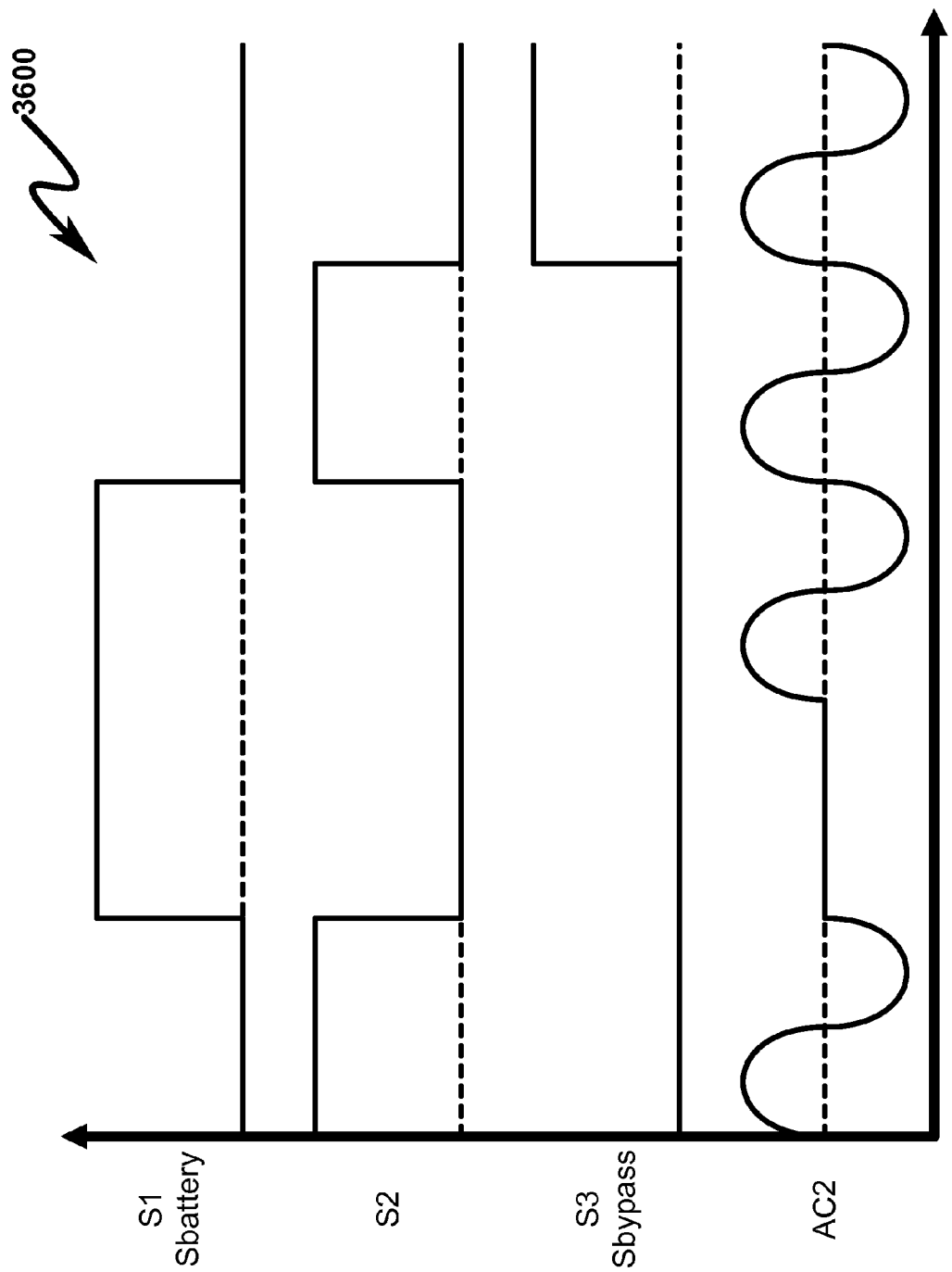
FIG. 36 illustrates exemplary power condition sensing and control waveforms associated with the schematic of FIG. 35.

FIG. 35 (3500)-FIG. 36 (3600) depict a power supply configuration backup mechanism with two AC sources (3511, 3512) and one DC battery source (3513) that supply power to four PSUs (3541, 3542, 3543, 3544) with full source protection for two PSUs (3541, 3542) and no input protection for the remaining two PSUs (3543, 3544) and includes AC rectifications (3514) to charge the DC battery source (3513). The power condition sense and digital switch network (DSN) (3520) functionality is depicted in FIG. 36 (3600) and ensures that two PSUs (3541, 3542) are fully source protected and that selection of the AC source (3512) or DC source (3513) is realized through on/off control of complementary switches S1 (3531) and S2 (3532).

This configuration and functionality is identical to that of FIG. 33 (3300) with the exception that all unprotected PSUs (3543, 3544) are powered directly from the AC sources (3511, 3512). Note that the PSUs (3541, 3542, 3543, 3544) depicted may operate in this context because of their AC+DC power supply configuration that provides for universal power input.

This configuration incorporates an automatic bypass switch (3533) to allow for maintenance of the S1 (3531) and/or S2 (3532) switches without loss of power to the PSUs (3541, 3542).

Dual 3-Phase AC Input System (3700)-(3800)

Figure 37:
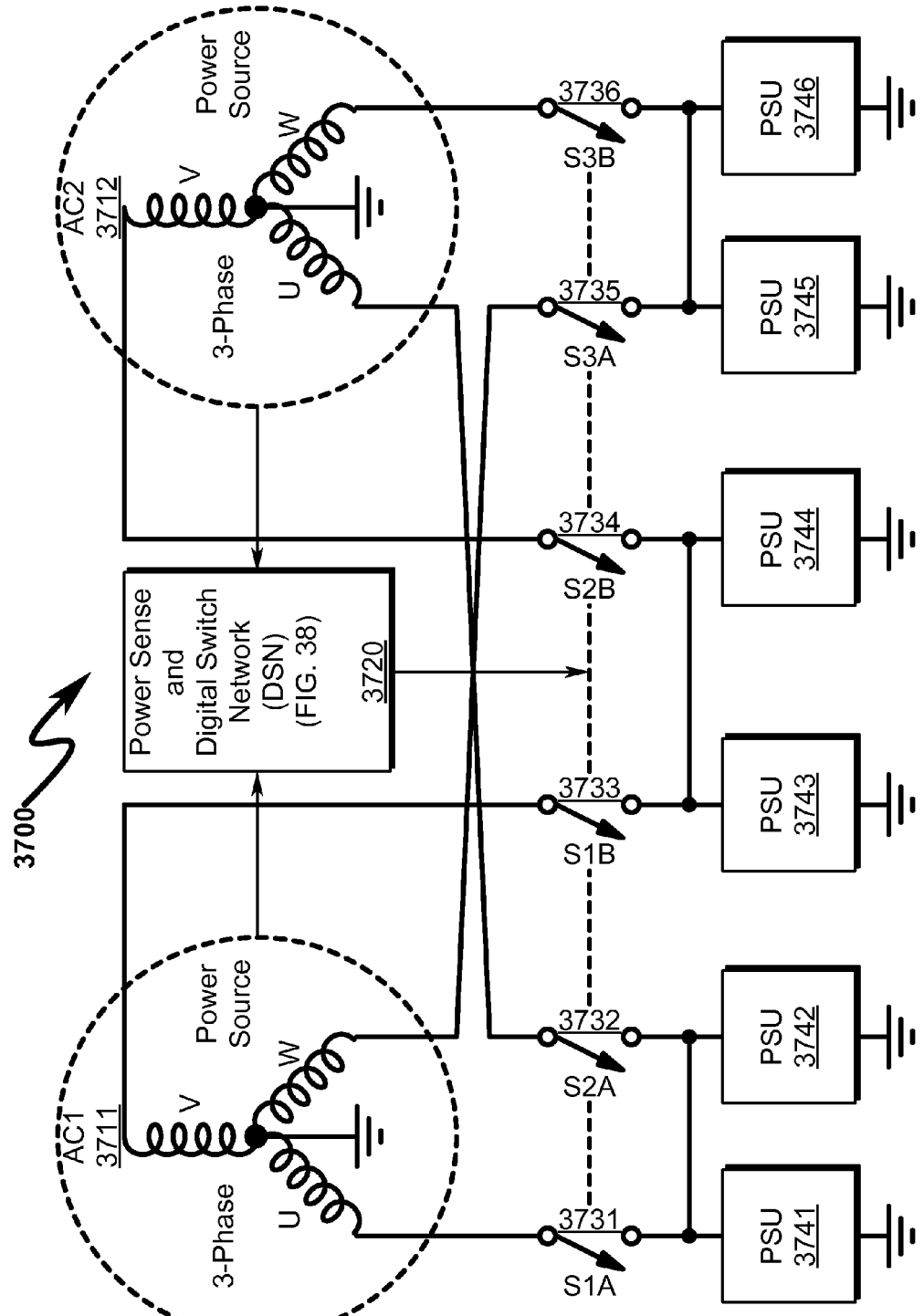
FIG. 37 illustrates an exemplary schematic diagram depicting a preferred system embodiment implementing a Dual 3-Phase AC Input System.
Figure 38:
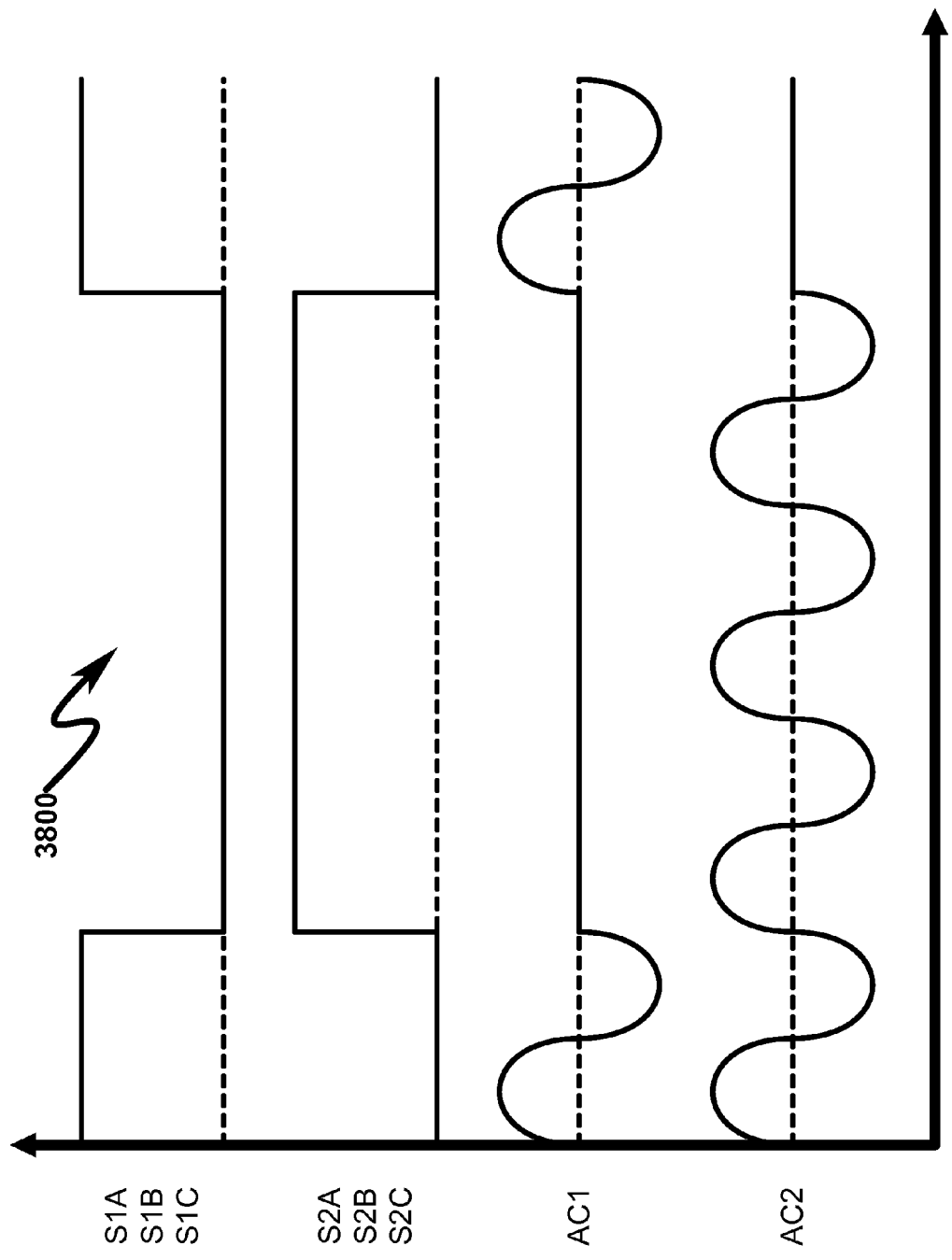
FIG. 38 illustrates exemplary power condition sensing and control waveforms associated with the schematic of FIG. 37.

FIG. 37 (3700)-FIG. 38 (3800) depict a power supply configuration backup mechanism with two 3-phase AC sources (3711, 3712) that supply power to six PSUs (3741, 3742, 3743, 3744, 3745, 3746) with full source protection for the PSUs (3741, 3742, 3743, 3744, 3745, 3746). The power condition sense and digital switch network (DSN) (3720) functionality is depicted in FIG. 38 (3800) and ensures that the PSUs (3741, 3742, 3743, 3744, 3745, 3746) are fully source protected and that selection of the AC source (3711, 3712) is realized through on/off control of complementary 3-phase switches S1 (3731, 3733, 3735) and S2 (3732, 3734, 3736).

3-Phase AC+Battery Input System (3900)-(4000)

Figure 39:
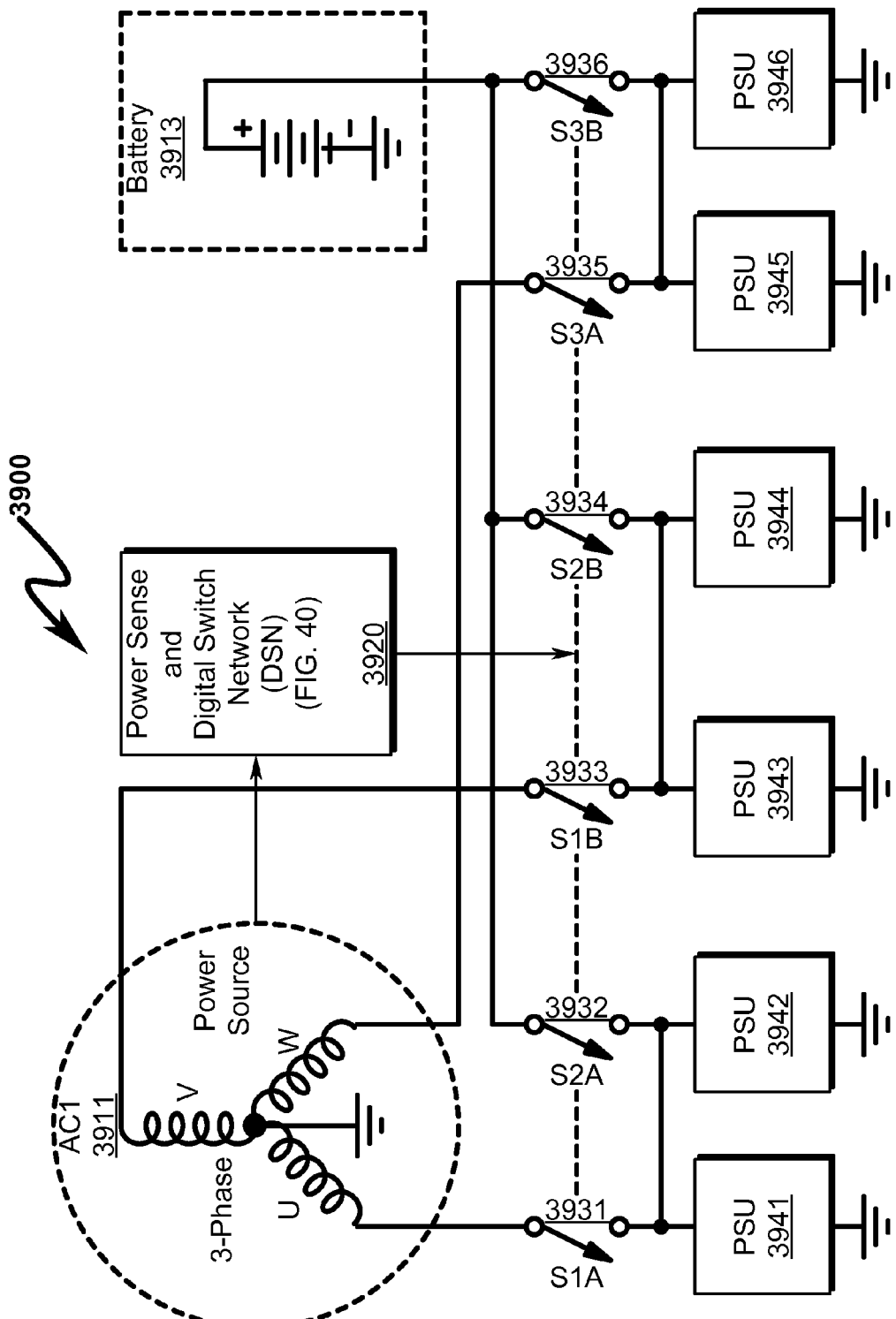
FIG. 39 illustrates an exemplary schematic diagram depicting a preferred system embodiment implementing a 3-Phase AC+Battery Input System.
Figure 40:
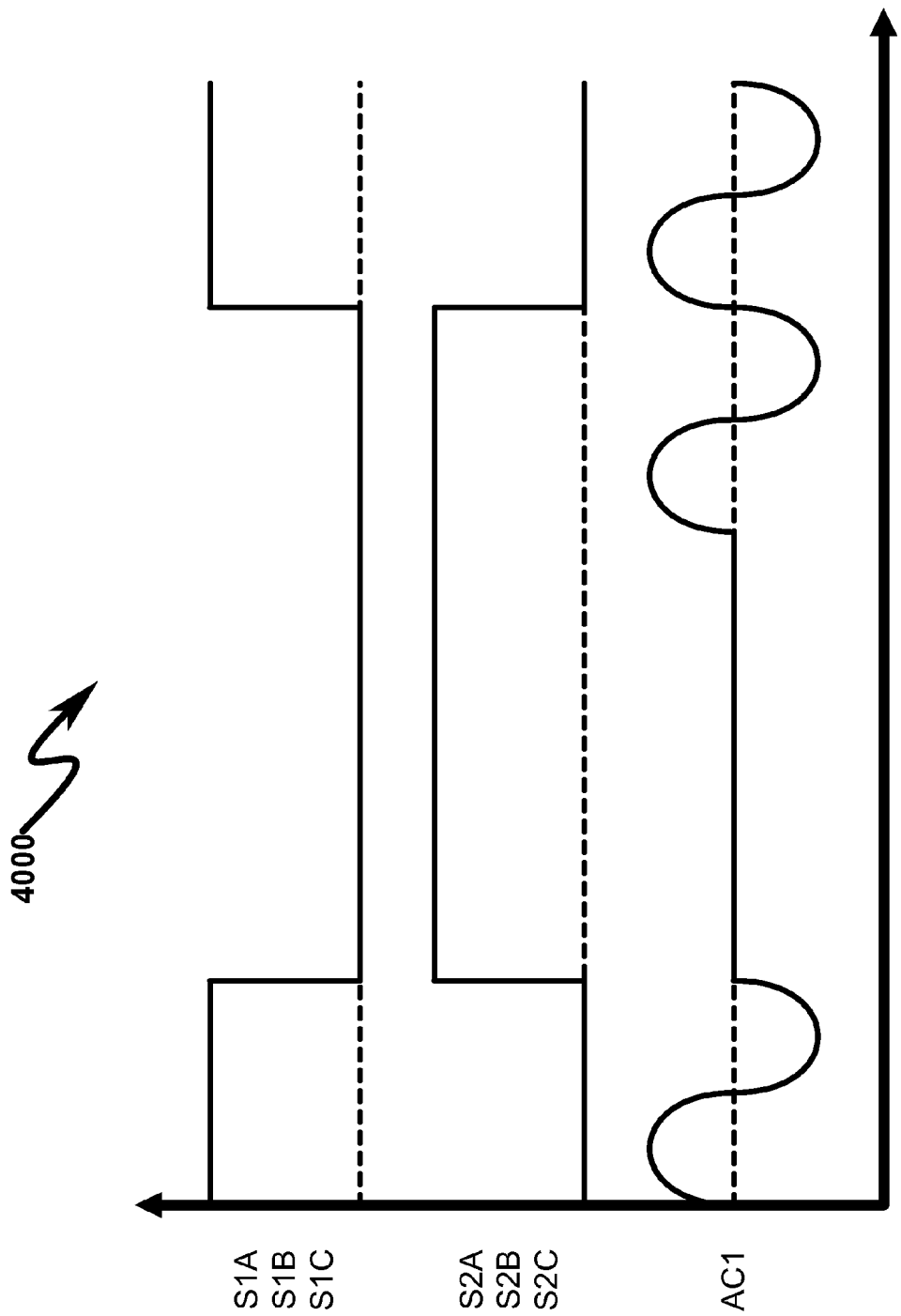
FIG. 40 illustrates exemplary power condition sensing and control waveforms associated with the schematic of FIG. 39.

FIG. 39 (3900)-FIG. 40 (4000) depict a power supply configuration backup mechanism with a 3-phase AC source (3911) and an auxiliary battery (3913) that supply power to six PSUs (3941, 3942, 3943, 3944, 3945, 3946) with full source protection for the PSUs (3941, 3942, 3943, 3944, 3945, 3946). The power condition sense and digital switch network (DSN) (3920) functionality is depicted in FIG. 40 (4000) and ensures that the PSUs (3941, 3942, 3943, 3944, 3945, 3946) are fully source protected and that selection of the AC source (3911) or DC battery source (3913) is realized through on/off control of complementary 3-phase switches S1 (3931, 3933, 3935) and S2 (3932, 3934, 3936).

3-Phase AC+Battery+Rectifier Input System (4100)-(4200)

Figure 41:
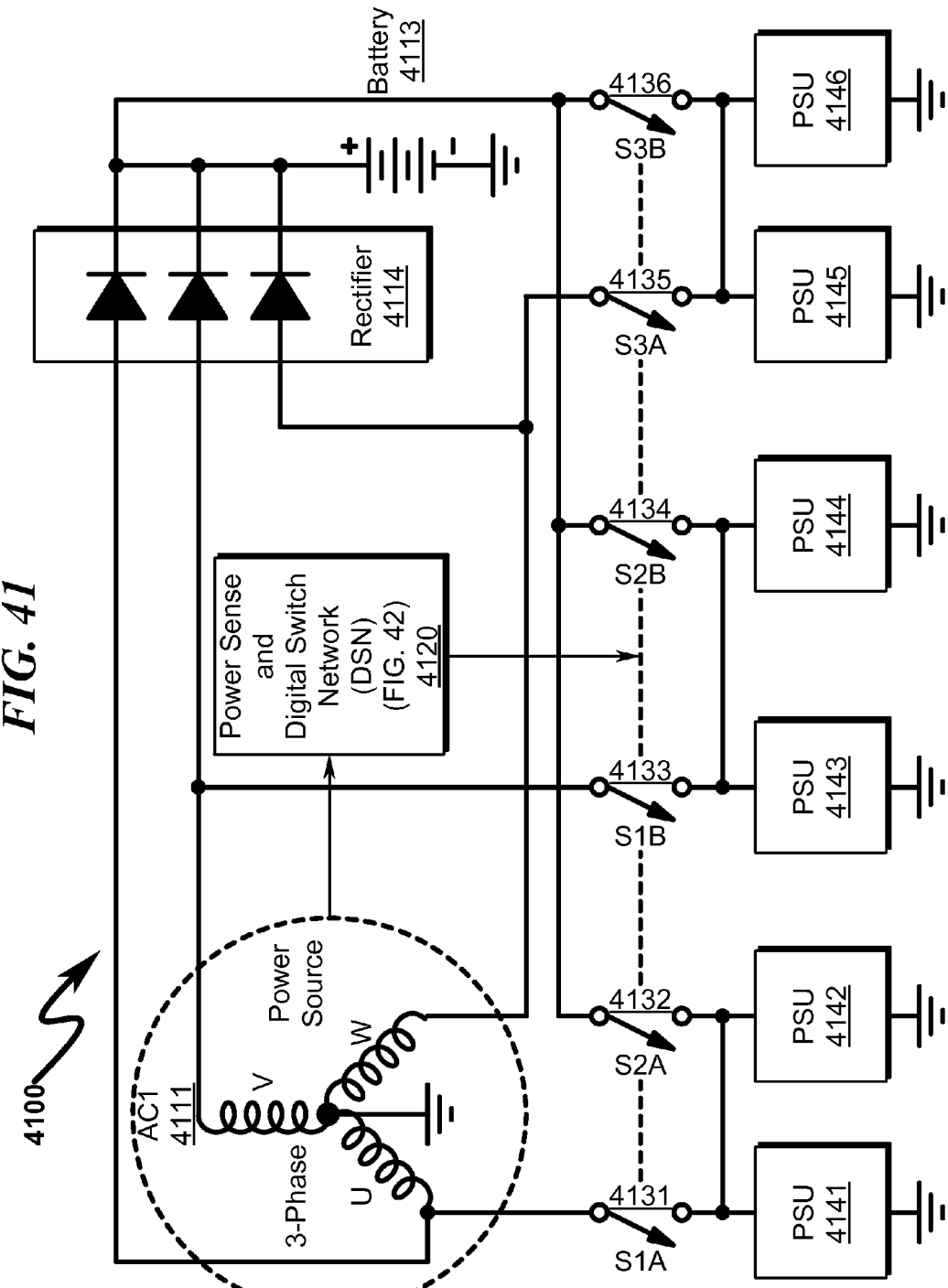
FIG. 41 illustrates an exemplary schematic diagram depicting a preferred system embodiment implementing a 3-Phase AC+Battery+Rectifier Input System.
Figure 42:
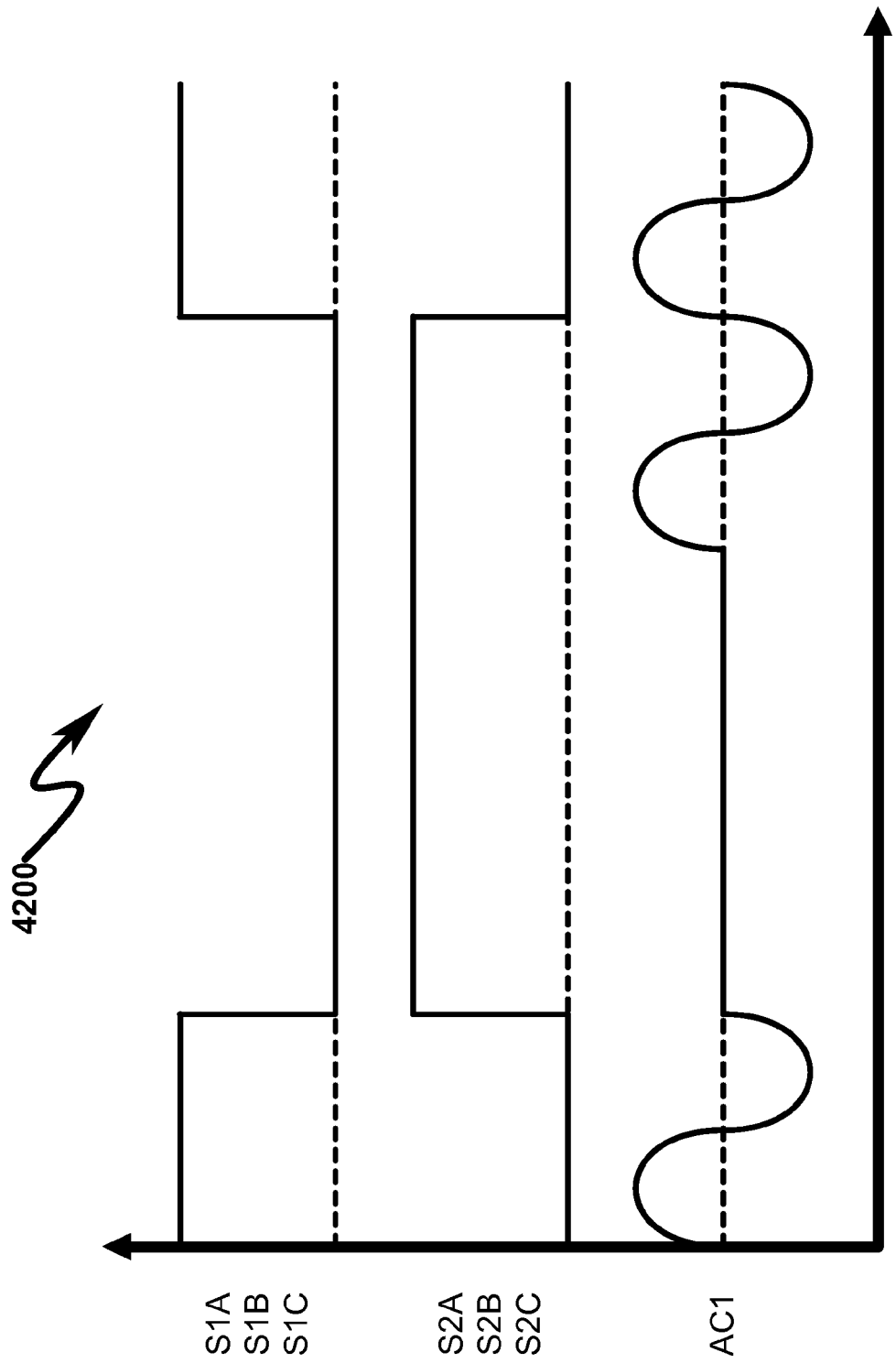
FIG. 42 illustrates exemplary power condition sensing and control waveforms associated with the schematic of FIG. 41.

FIG. 41 (4100)-FIG. 42 (4200) depict a power supply configuration backup mechanism with a 3-phase AC source (4111) and an auxiliary battery (4113) that supply power to six PSUs (4141, 4142, 4143, 4144, 4145, 4146) with full source protection for the PSUs (4141, 4142, 4143, 4144, 4145, 4146). The power condition sense and digital switch network (DSN) (4120) functionality is depicted in FIG. 42 (4200) and ensures that the PSUs (4141, 4142, 4143, 4144, 4145, 4146) are fully source protected and that selection of the AC source (4111) or DC battery source (4113) is realized through on/off control of complementary 3-phase switches S1 (4131, 4133, 4135) and S2 (4132, 4134, 4136). In this configuration a rectifier (4114) is used to keep the DC battery (4113) fully charged using the 3-phase AC source (4111).

3-Phase AC+Battery+Rectifier Input System (4300)-(4400)

Figure 43:
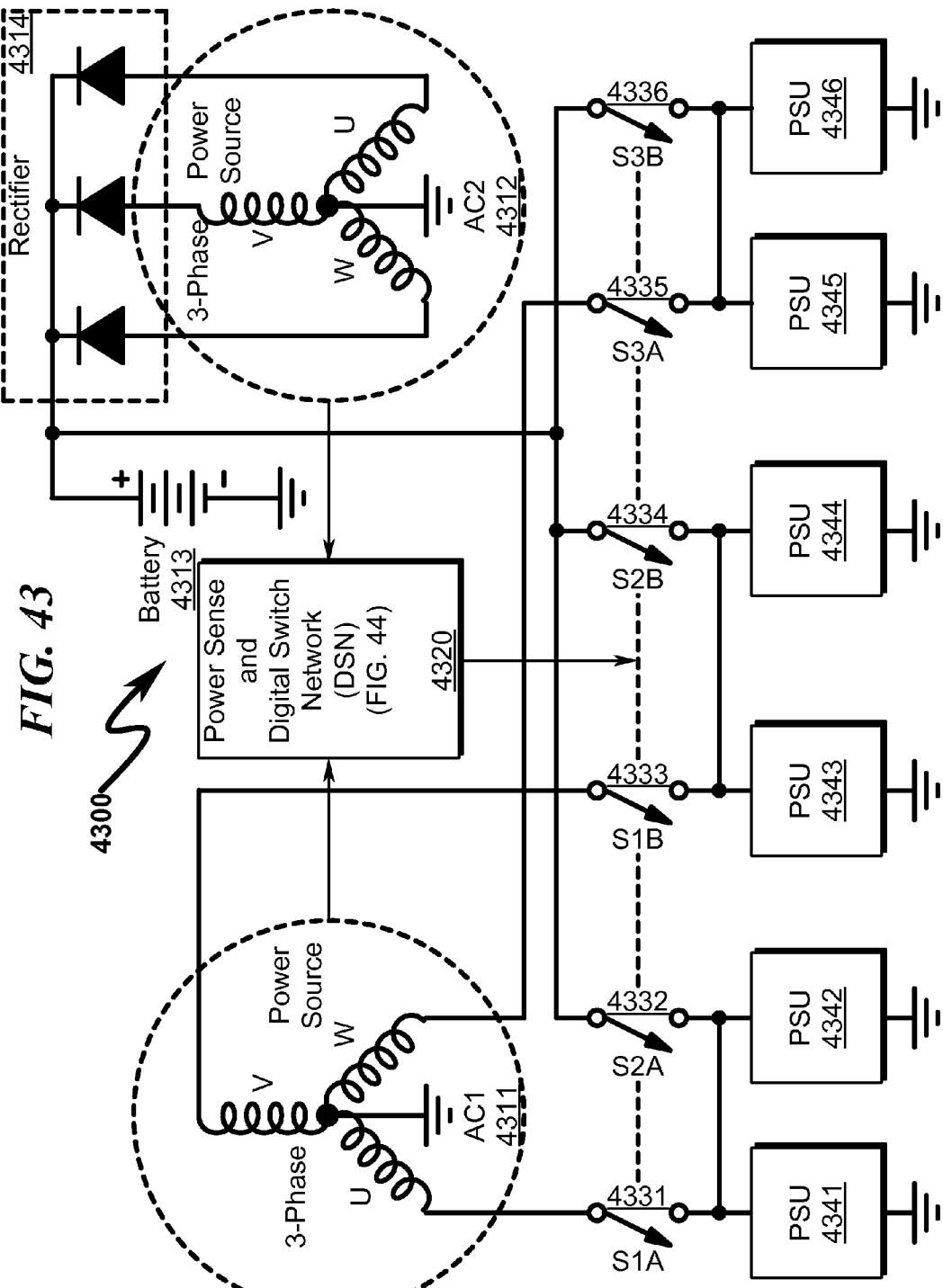
FIG. 43 illustrates an exemplary schematic diagram depicting a preferred system embodiment implementing a 3-Phase AC+Battery+Rectifier Input System.
Figure 44:
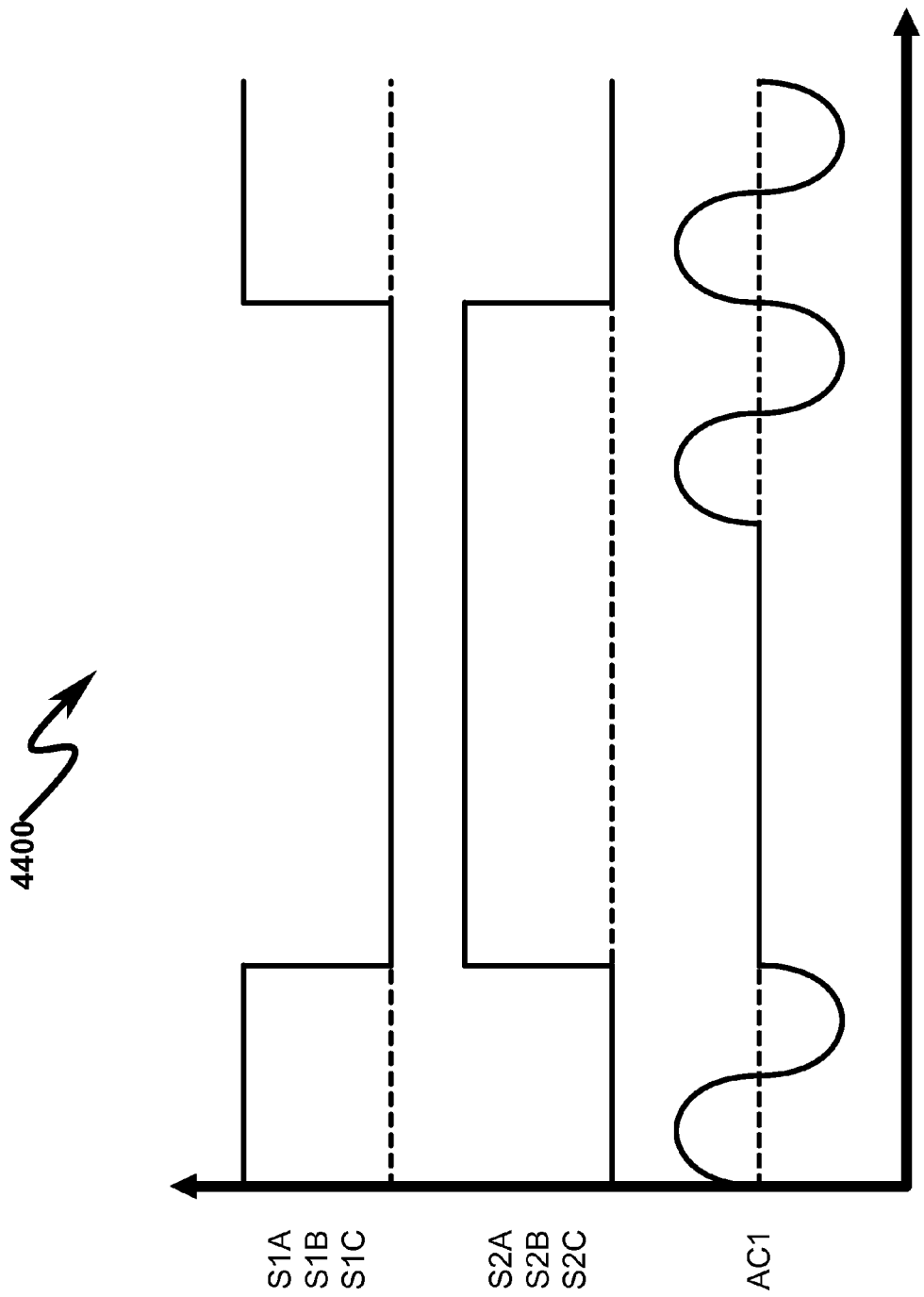
FIG. 44 illustrates exemplary power condition sensing and control waveforms associated with the schematic of FIG. 43.

FIG. 43 (4300)-FIG. 44 (4400) depict a power supply configuration backup mechanism with a 3-phase AC source (4311) and an auxiliary battery (4313) that supply power to six PSUs (4341, 4342, 4343, 4344, 4345, 4346) with full source protection for the PSUs (4341, 4342, 4343, 4344, 4345, 4346). The power condition sense and digital switch network (DSN) (4320) functionality is depicted in FIG. 44 (4400) and ensures that the PSUs (4341, 4342, 4343, 4344, 4345, 4346) are fully source protected and that selection of the AC source (4311) or DC battery source (4313) is realized through on/off control of complementary 3-phase switches S1 (4331, 4333, 4335) and S2 (4332, 4334, 4336). In this configuration a rectifier (4314) is used to keep the DC battery (4313) fully charged using an alternate 3-phase AC source (4312).

3-Phase AC+Battery+Rectifier Input System (4500)-(4600)

Figure 45:
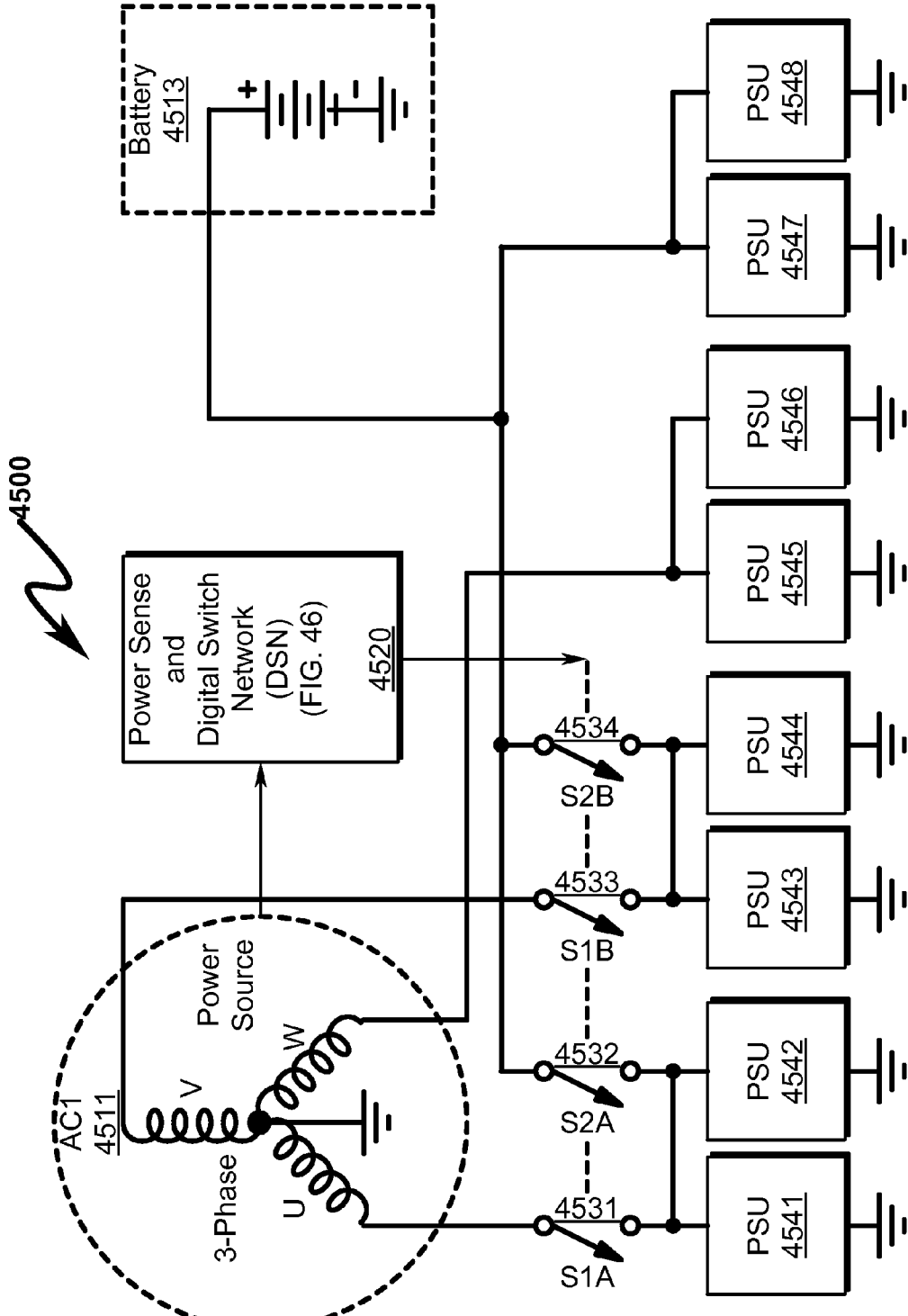
FIG. 45 illustrates an exemplary schematic diagram depicting a preferred system embodiment implementing a 3-Phase AC+Battery+Rectifier Input System.
Figure 46:
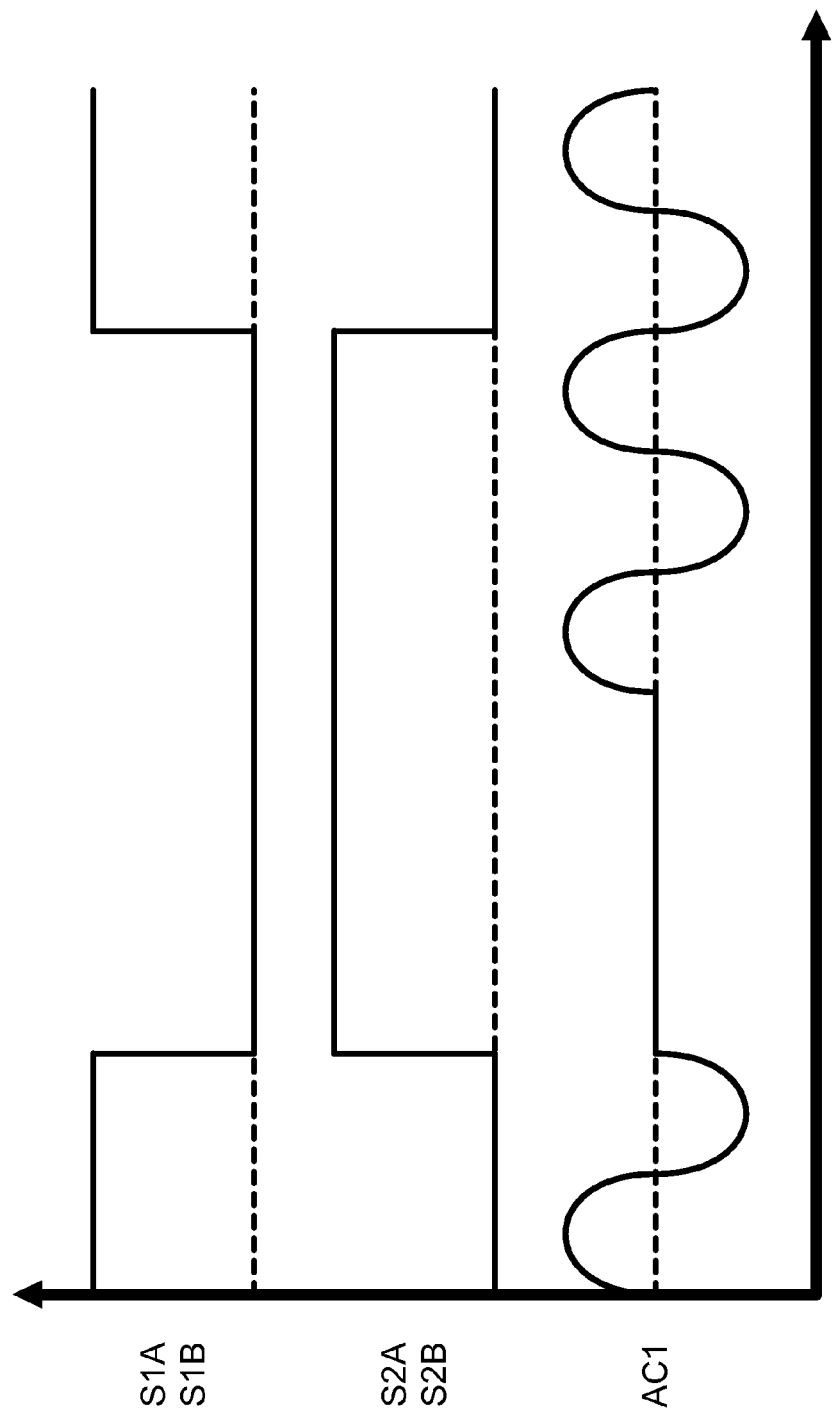
FIG. 46 illustrates exemplary power condition sensing and control waveforms associated with the schematic of FIG. 45.

FIG. 45 (4500)-FIG. 46 (4600) depict a power supply configuration backup mechanism with a 3-phase AC source (4511) and an auxiliary battery (4513) that supply power to eight PSUs (4541, 4542, 4543, 4544, 4545, 4546, 4547, 4548) with full source protection for four PSUs (4541, 4542, 4543, 4544) and no input protection for the remaining four PSUs (4545, 4546, 4547, 4548). The power condition sense and digital switch network (DSN) (4520) functionality is depicted in FIG. 46 (4600) and ensures that four PSUs (4541, 4542, 4543, 4544) are fully source protected and that selection of the AC source (4511) or DC battery source (4513) is realized through on/off control of complementary 3-phase switches S1 (4531, 4533) and S2 (4532, 4534). In this configuration the DC battery (4513) is maintained using an external charging source.

3-Phase AC+Battery+Rectifier Input System (4700)-(4800)

Figure 47:
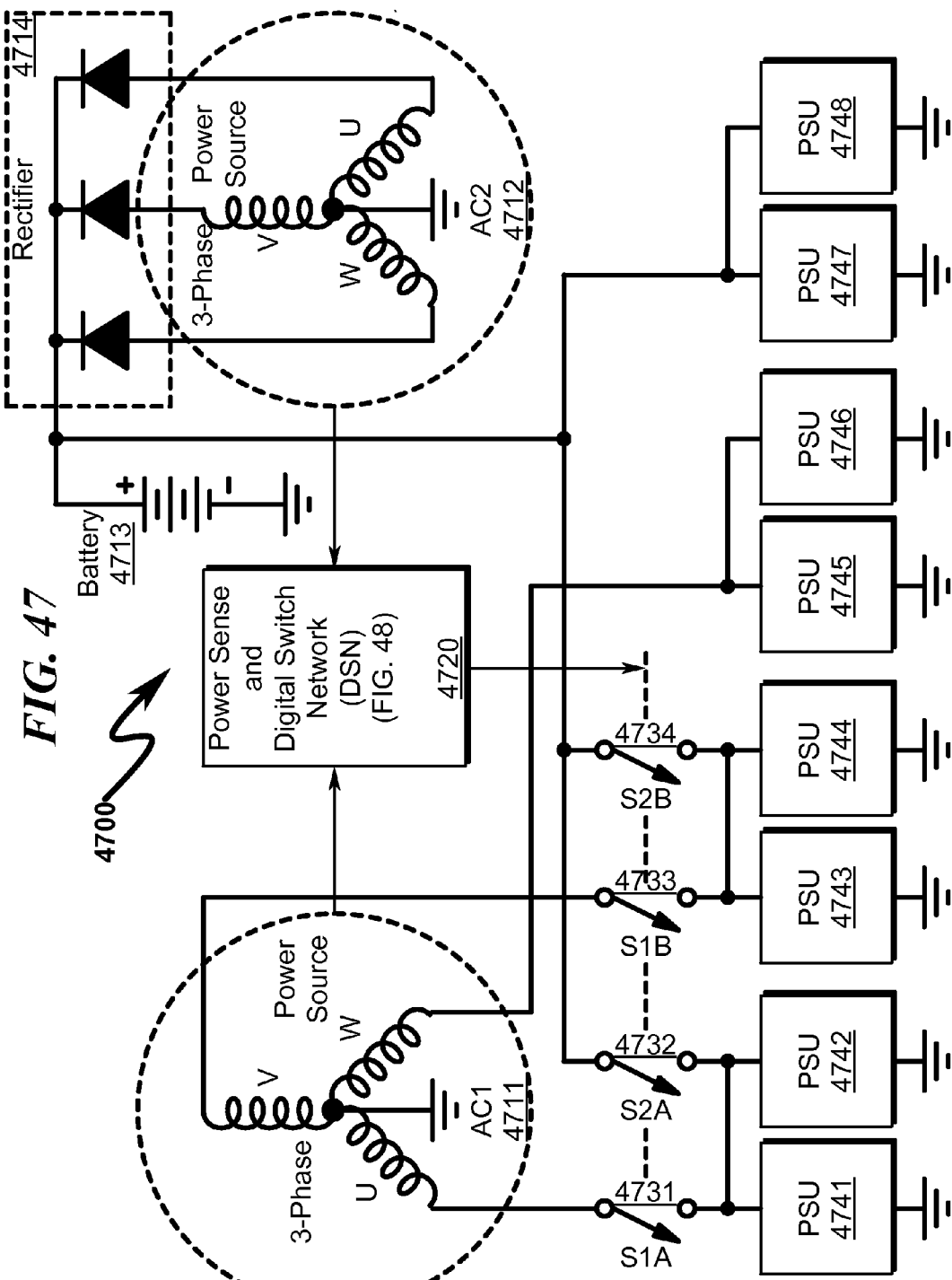
FIG. 47 illustrates an exemplary schematic diagram depicting a preferred system embodiment implementing a 3-Phase AC+Battery+Rectifier Input System.

FIG. 47 (4700)-FIG. 48 (4800) depict a power supply configuration backup mechanism with two 3-phase AC sources (4711, 4712) and an auxiliary battery (4713) that supply power to eight PSUs (4741, 4742, 4743, 4744, 4745, 4746, 4747, 4748) with full source protection for six PSUs (4741, 4742, 4743, 4744, 4747, 4748) and no input protection for the remaining two PSUs (4745, 4746). The power condition sense and digital switch network (DSN) (4720) functionality is depicted in FIG. 48 (4800) and ensures that six PSUs (4741, 4742, 4743, 4744, 4747, 4748) are fully source protected and that selection of the AC source (4711) or DC battery source (4713) is realized through on/off control of complementary 3-phase switches S1 (4731, 4733) and S2 (4732, 4734). In this configuration the DC battery (4713) is maintained using a separate 3-phase AC source (4712).

Preferred Embodiment System Summary

The present invention preferred exemplary system embodiment anticipates a wide variety of variations in the basic theme of construction, but can be generalized as a power supply configuration system comprising:
(a) primary power source (PPS) means;
(b) secondary power source (SPS) means;
(c) power condition sensing (PCS) means;
(d) digitally controlled switching network (DSN) means;
(e) power supply unit (PSU) means;
(f) protected device load (PDL) means; and
(g) AC+DC power supply (ADP);
wherein
the PCS means is configured to sense the power state condition (PSC) of the PPS means and generate a phase power condition (PPC) status that is electrically coupled to the DSN means;
the DSN means is configured to electrically couple the PPS means or the SPS means to the ADP based on the state of the PPC status;
the PSU means comprises an AC+DC power supply (ADP);
the ADP comprises a boost converter (BCV) further comprising: a BCV input port and BCV output port;
the BCV is configured to accept AC or DC voltage input at the BCV input port;
the ADP comprises a DC-DC converter (DDC) further comprising: a DDC input port and DDC output port;
the BCV output port is electrically coupled to the DDC input port;
the PDL means comprises a DC-DC power supply (DDP) electrically coupled to a protected load device (PLD); and
the DDC output port is electrically coupled to and supplies power to the DDP.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a power supply configuration method, the method operating in conjunction with a power supply configuration system comprising:
(a) primary power source (PPS) means;
(b) secondary power source (SPS) means;
(c) power condition sensing (PCS) means;
(d) digitally controlled switching network (DSN) means;
(e) power supply unit (PSU) means;
(f) protected device load (PDL) means; and
(g) AC+DC power supply (ADP);
wherein
the PCS means is configured to sense the power state condition (PSC) of the PPS means and generate a phase power condition (PPC) status that is electrically coupled to the DSN means;
the DSN means is configured to electrically couple the PPS means or the SPS means to the ADP based on the state of the PPC status;
the PSU means comprises an AC+DC power supply (ADP);
the ADP comprises a boost converter (BCV) further comprising: a BCV input port and BCV output port;
the BCV is configured to accept AC or DC voltage input at the BCV input port;
the ADP comprises a DC-DC converter (DDC) further comprising: a DDC input port and DDC output port;
the BCV output port is electrically coupled to the DDC input port;
the PDL means comprises a DC-DC power supply (DDP) electrically coupled to a protected load device (PLD); and
the DDC output port is electrically coupled to and supplies power to the DDP;
wherein the method comprises the steps of:
(1) with the PCS means, monitoring the status of line voltage from the PPS means;
(2) with the PCS means, monitoring the status of line voltage from the SPS means;
(3) determining if the PPS line voltage is within predetermined limits, and if not, proceeding to step (8);
(4) waiting for the PPS line voltage to stabilize;
(5) configuring the DSN means to disconnect the SPS means from the PSU means;
(6) waiting for a phase transition to occur in the PSS means;
(7) configuring the DSN means to connect the PPS means to the PSU means and proceeding to step (1);
(8) configuring the DSN means to disconnect the PPS means from the PSU means;
(9) waiting for a phase transition to occur in the SPS means if the SPS means is an AC source; and
(10) configuring the DSN means to connect the SPS means to the PSU means and proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

The method steps depicted in this preferred embodiment are derived from FIG. 2 (0200). However, these steps can be augmented using alternative methodologies as depicted herein with no loss in the teachings of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PPS means comprises a three-phase DELTA power source.

An embodiment wherein the PPS means comprises a three-phase WYE power source.

An embodiment wherein the PLD comprises a computing device.

An embodiment wherein the PLD comprises a networked computing server.

An embodiment wherein the PPS means comprises a single-phase line to phase voltage derived from a three-phase power system.

An embodiment wherein the SPS means comprises an energy source selected from a group consisting of: solar panel; fuel cell; flywheel; and alternative energy source.

An embodiment wherein the SPS means comprises a battery.

An embodiment wherein the SPS means comprises a battery with battery chemistry selected from a chemical group consisting of: lead acid; lithium iron; nickel cadmium; sodium sulfur; vanadium redox; nickel cadmium; and alkaline.

An embodiment wherein the system further comprises an unprotected PSU means electrically coupled to the PPS means.

An embodiment wherein the DSN further comprises a manual bypass switch.

An embodiment wherein the DSN further comprises an automatic bypass switch.

An embodiment wherein the DSN further comprises redundant bypass switches.

An embodiment wherein the SPS means further comprises battery and charging rectifier.

An embodiment wherein the SPS means further comprises an AC power source supplying a battery charger/battery combination.

An embodiment wherein the SPS means further comprises: an AC power source supplying a battery charger/battery combination; and an unprotected PSU electrically coupled to the battery.

An embodiment wherein the SPS means further comprises: an AC power source supplying a battery charger/battery combination; and an unprotected PSU electrically coupled to the PPS means.

An embodiment further comprising: a battery configured to act as a tertiary supply of power to the PSU means.

An embodiment further comprising: a battery configured to act as a tertiary supply of power to the PSU means and incorporating an unprotected PSU electrically coupled to the PPS means.

An embodiment further comprising: a battery configured to be charged with an energy source selected from a group consisting of: solar panel; fuel cell; flywheel; and alternative energy source.

An embodiment wherein the SPS means further comprises: an AC power source supplying a battery charger/battery combination; and an unprotected PSU electrically coupled to the SPS means and bypass switch coupling the PSU means and the AC power source.

An embodiment wherein the SPS means further comprises: an AC power source supplying a battery charger/battery combination; incorporating an unprotected PSU electrically coupled to the SPS means; a bypass switch coupling the PSU means and the AC power source; and an unprotected PSU electrically coupled to the AC power source.

An embodiment wherein the PPS means and the SPS means comprise 3-phase power sources.

An embodiment wherein the PPS means comprises a 3-phase power source and the SPS means comprises a battery.

An embodiment wherein the PPS means comprises a 3-phase power source and the SPS means comprises a battery and 3-phase charging rectifier electrically coupled to the PPS means 3-phase power source.

An embodiment wherein the PPS means comprises a 3-phase power source and the SPS means comprises a battery and 3-phase charging rectifier electrically coupled to an alternate 3-phase power source.

An embodiment wherein the PPS means comprises a 3-phase power source and the SPS means comprises a battery and incorporating an unprotected PSU electrically coupled to a single phase of the 3-phase power source.

An embodiment wherein the PPS means comprises a 3-phase power source and the SPS means comprises a battery and 3-phase charging rectifier electrically coupled to an alternate 3-phase power source and incorporating an unprotected PSU electrically coupled to a single phase of the 3-phase power source.

An embodiment wherein the PPS means comprises a 3-phase power source and the SPS means comprises a battery and 3-phase charging rectifier electrically coupled to an alternate 3-phase power source and incorporating an unprotected PSU electrically coupled to a single phase of the battery.

An embodiment wherein the PPS means comprises a 3-phase power source and the SPS means comprises a battery and 3-phase charging rectifier electrically coupled to an alternate 3-phase power source and incorporating a protected PSU electrically coupled to the battery.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710, 578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A power supply configuration system/method providing a digitally controlled uninterruptable power supply (UPS) to protected load devices (PLD) configured as power supply units (PSU) serviced by one or more power supply sources (PSS) has been disclosed. The system generally includes a number of power supply sources (PSS) that are monitored by power condition sensing (PCS) circuitry that determines individual power source states within the PSS. This physical state information is used by a digitally controlled switching network (DSN) that reconfigures the electrical connections between the PSS and the individual PLD elements to properly route power from the PSS to the PLD in the event of individual PSS failures. The DSN receives phase/voltage state information from the PSS to ensure that current between the PSS and PLD is transferred in a synchronized manner and that PSS resources are properly protected during the switching transition.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A power supply configuration system comprising:
(a) primary power source (PPS) means;
(b) secondary power source (SPS) means;
(c) power condition sensing (PCS) means;
(d) digitally controlled switching network (DSN) means;
(e) power supply unit (PSU) means;
(f) protected device load (PDL) means; and
(g) AC+DC power supply (ADP);
wherein
said PCS means is configured to sense the power state condition (PSC) of said PPS means and generate a phase power condition (PPC) status that is electrically coupled to said DSN means;
said DSN means is configured to electrically couple said PPS means or said SPS means to said ADP based on the state of said PPC status;
said PSU means comprises an AC+DC power supply (ADP);
said ADP comprises a boost converter (BCV) further comprising: a BCV input port and BCV output port;
said BCV is configured to accept AC or DC voltage input at said BCV input port;
said ADP comprises a DC-DC converter (DDC) further comprising: a DDC input port and DDC output port;
said BCV output port is electrically coupled to said DDC input port;
said PDL means comprises a DC-DC power supply (DDP) electrically coupled to a protected load device (PLD); and
said DDC output port is electrically coupled to and supplies power to said DDP.

2. The power supply configuration system of claim 1 wherein said PPS means comprises a three-phase DELTA power source.

3. The power supply configuration system of claim 1 wherein said PPS means comprises a three-phase WYE power source.

4. The power supply configuration system of claim 1 wherein said PLD comprises a computing device.

5. The power supply configuration system of claim 1 wherein said PLD comprises a networked computing server.

6. The power supply configuration system of claim 1 wherein said PPS means comprises a single-phase line to phase voltage derived from a three-phase power system.

7. The power supply configuration system of claim 1 wherein said SPS means comprises an energy source selected from a group consisting of: solar panel; fuel cell; flywheel; and alternative energy source.

8. The power supply configuration system of claim 1 wherein said SPS means comprises a battery.

9. The power supply configuration system of claim 1 wherein said SPS means comprises a battery with battery chemistry selected from a chemical group consisting of: lead acid; lithium iron; nickel cadmium; sodium sulfur; vanadium redox; nickel cadmium; and alkaline.

10. The power supply configuration system of claim 1 wherein said system further comprises an unprotected PSU means electrically coupled to said PPS means.

11. The power supply configuration system of claim 1 wherein said DSN means further comprises a manual bypass switch.

12. The power supply configuration system of claim 1 wherein said DSN means further comprises an automatic bypass switch.

13. The power supply configuration system of claim 1 wherein said DSN means further comprises redundant bypass switches.

14. The power supply configuration system of claim 1 wherein said SPS means further comprises battery and charging rectifier.

15. The power supply configuration system of claim 1 wherein said SPS means further comprises an AC power source supplying a battery charger/battery combination.

16. The power supply configuration system of claim 1 wherein said SPS means further comprises: an AC power source supplying a battery charger/battery combination; and an unprotected PSU electrically coupled to said battery.

17. The power supply configuration system of claim 1 wherein said SPS means further comprises: an AC power source supplying a battery charger/battery combination; and an unprotected PSU electrically coupled to said PPS means.

18. The power supply configuration system of claim 1 further comprising: a battery configured to act as a tertiary supply of power to said PSU means.

19. The power supply configuration system of claim 1 further comprising: a battery configured to act as a tertiary supply of power to said PSU means and an unprotected PSU electrically coupled to said PPS means.

20. The power supply configuration system of claim 1 further comprising: a battery configured to be charged with an energy source selected from a group consisting of: solar panel; fuel cell; flywheel; and alternative energy source.

21. The power supply configuration system of claim 1 wherein said SPS means further comprises: an AC power source supplying a battery charger/battery combination; and an unprotected PSU electrically coupled to said SPS means and bypass switch coupling said PSU means and said AC power source.

22. The power supply configuration system of claim 1 wherein said SPS means further comprises: an AC power source supplying a battery charger/battery combination; an unprotected PSU electrically coupled to said SPS means; a bypass switch coupling said PSU means and said AC power source; and an unprotected PSU electrically coupled to said AC power source.

23. The power supply configuration system of claim 1 wherein said PPS means and said SPS means comprise 3-phase power sources.

24. The power supply configuration system of claim 1 wherein said PPS means comprises a 3-phase power source and said SPS means comprises a battery.

25. The power supply configuration system of claim 1 wherein said PPS means comprises a 3-phase power source and said SPS means comprises a battery and 3-phase charging rectifier electrically coupled to said PPS means 3-phase power source.

26. The power supply configuration system of claim 1 wherein said PPS means comprises a 3-phase power source and said SPS means comprises a battery and 3-phase charging rectifier electrically coupled to an alternate 3-phase power source.

27. The power supply configuration system of claim 1 wherein said PPS means comprises a 3-phase power source and said SPS means comprises a battery and an unprotected PSU electrically coupled to a single phase of said 3-phase power source.

28. The power supply configuration system of claim 1 wherein said PPS means comprises a 3-phase power source and said SPS means comprises a battery and 3-phase charging rectifier electrically coupled to an alternate 3-phase power source and an unprotected PSU electrically coupled to a single phase of said 3-phase power source.

29. The power supply configuration system of claim 1 wherein said PPS means comprises a 3-phase power source and said SPS means comprises a battery and 3-phase charging rectifier electrically coupled to an alternate 3-phase power source and an unprotected PSU electrically coupled to a single phase of said battery.

30. The power supply configuration system of claim 1 wherein said PPS means comprises a 3-phase power source and said SPS means comprises a battery and 3-phase charging rectifier electrically coupled to an alternate 3-phase power source and a protected PSU electrically coupled to said battery.

31. A power supply configuration method, said method operating in conjunction with a power supply configuration system, said system comprising:
    (a) primary power source (PPS) means;
    (b) secondary power source (SPS) means;
    (c) power condition sensing (PCS) means;
    (d) digitally controlled switching network (DSN) means;
    (e) power supply unit (PSU) means;
    (f) protected device load (PDL) means; and
    (g) AC+DC power supply (ADP);
wherein
    said PCS means is configured to sense the power state condition (PSC) of said PPS means and generate a phase power condition (PPC) status that is electrically coupled to said DSN means;
    said DSN means is configured to electrically couple said PPS means or said SPS means to said ADP based on the state of said PPC status;
    said PSU means comprises an AC+DC power supply (ADP);
    said ADP comprises a boost converter (BCV) further comprising: a BCV input port and BCV output port;
    said BCV is configured to accept AC or DC voltage input at said BCV input port;
    said ADP comprises a DC-DC converter (DDC) further comprising: a DDC input port and DDC output port;
    said BCV output port is electrically coupled to said DDC input port;
    said PDL means comprises a DC-DC power supply (DDP) electrically coupled to a protected load device (PLD); and
    said DDC output port is electrically coupled to and supplies power to said DDP;

wherein said method comprises the steps of:
(1) with said PCS means, monitoring the status of line voltage from said PPS means;
(2) with said PCS means, monitoring the status of line voltage from said SPS means;
(3) determining if said PPS line voltage is within predetermined limits, and if not, proceeding to step (8);
(4) waiting for said PPS line voltage to stabilize;
(5) configuring said DSN means to disconnect said SPS means from said PSU means;
(6) waiting for a phase transition to occur in said PPS means;
(7) configuring said DSN means to connect said PPS means to said PSU means and proceeding to step (1);
(8) configuring said DSN means to disconnect said PPS means from said PSU means;
(9) waiting for a phase transition to occur in said SPS means if said SPS means is an AC source; and
(10) configuring said DSN means to connect said SPS means to said PSU means and proceeding to step (1).

32. The power supply configuration method of claim 31 wherein said PPS means comprises a three-phase DELTA power source.

33. The power supply configuration method of claim 31 wherein said PPS means comprises a three-phase WYE power source.

34. The power supply configuration method of claim 31 wherein said PLD comprises a computing device.

35. The power supply configuration method of claim 31 wherein said PLD comprises a networked computing server.

36. The power supply configuration method of claim 31 wherein said PPS means comprises a single-phase line to phase voltage derived from a three-phase power system.

37. The power supply configuration method of claim 31 wherein said SPS means comprises an energy source selected from a group consisting of: solar panel; fuel cell; flywheel; and alternative energy source.

38. The power supply configuration method of claim 31 wherein said SPS means comprises a battery.

39. The power supply configuration method of claim 31 wherein said SPS means comprises a battery with battery chemistry selected from a chemical group consisting of: lead acid; lithium iron; nickel cadmium; sodium sulfur; vanadium redox; nickel cadmium; and alkaline.

40. The power supply configuration method of claim 31 wherein said system further comprises an unprotected PSU means electrically coupled to said PPS means.

41. The power supply configuration method of claim 31 wherein said DSN means further comprises a manual bypass switch.

42. The power supply configuration method of claim 31 wherein said DSN means further comprises an automatic bypass switch.

43. The power supply configuration method of claim 31 wherein said DSN means further comprises redundant bypass switches.

44. The power supply configuration method of claim 31 wherein said SPS means further comprises battery and charging rectifier.

45. The power supply configuration method of claim 31 wherein said SPS means further comprises an AC power source supplying a battery charger/battery combination.

46. The power supply configuration method of claim 31 wherein said SPS means further comprises: an AC power source supplying a battery charger/battery combination; and an unprotected PSU electrically coupled to said battery.

47. The power supply configuration method of claim 31 wherein said SPS means further comprises: an AC power source supplying a battery charger/battery combination; and an unprotected PSU electrically coupled to said PPS means.

48. The power supply configuration method of claim 31 further comprising: a battery configured to act as a tertiary supply of power to said PSU means.

49. The power supply configuration method of claim 31 further comprising: a battery configured to act as a tertiary supply of power to said PSU means and an unprotected PSU electrically coupled to said PPS means.

50. The power supply configuration method of claim 31 further comprising: a battery configured to be charged with an energy source selected from a group consisting of: solar panel; fuel cell; flywheel; and alternative energy source.

51. The power supply configuration method of claim 31 wherein said SPS means further comprises: an AC power source supplying a battery charger/battery combination; and an unprotected PSU electrically coupled to said SPS means and bypass switch coupling said PSU means and said AC power source.

52. The power supply configuration method of claim 31 wherein said SPS means further comprises: an AC power source supplying a battery charger/battery combination; an unprotected PSU electrically coupled to said SPS means; a bypass switch coupling said PSU means and said AC power source; and an unprotected PSU electrically coupled to said AC power source.

53. The power supply configuration method of claim 31 wherein said PPS means and said SPS means comprise 3-phase power sources.

54. The power supply configuration method of claim 31 wherein said PPS means comprises a 3-phase power source and said SPS means comprises a battery.

55. The power supply configuration method of claim 31 wherein said PPS means comprises a 3-phase power source and said SPS means comprises a battery and 3-phase charging rectifier electrically coupled to said PPS means 3-phase power source.

56. The power supply configuration method of claim 31 wherein said PPS means comprises a 3-phase power source and said SPS means comprises a battery and 3-phase charging rectifier electrically coupled to an alternate 3-phase power source.

57. The power supply configuration method of claim 31 wherein said PPS means comprises a 3-phase power source and said SPS means comprises a battery and an unprotected PSU electrically coupled to a single phase of said 3-phase power source.

58. The power supply configuration method of claim 31 wherein said PPS means comprises a 3-phase power source and said SPS means comprises a battery and 3-phase charging rectifier electrically coupled to an alternate 3-phase power source and an unprotected PSU electrically coupled to a single phase of said 3-phase power source.

59. The power supply configuration method of claim 31 wherein said PPS means comprises a 3-phase power source and said SPS means comprises a battery and 3-phase charging rectifier electrically coupled to an alternate 3-phase power source and an unprotected PSU electrically coupled to a single phase of said battery.

60. The power supply configuration method of claim 31 wherein said PPS means comprises a 3-phase power source and said SPS means comprises a battery and 3-phase charging rectifier electrically coupled to an alternate 3-phase power source and a protected PSU electrically coupled to said battery.

61. A tangible non-transitory computer usable medium having computer-readable program code for performing a power supply configuration (UPS) method, said method operating in conjunction with a power supply configuration system, said system comprising:
- (a) primary power source (PPS) means;
- (b) secondary power source (SPS) means;
- (c) power condition sensing (PCS) means;
- (d) digitally controlled switching network (DSN) means;
- (e) power supply unit (PSU) means;
- (f) protected device load (PDL) means; and
- (g) AC+DC power supply (ADP);

wherein
said PCS means is configured to sense the power state condition (PSC) of said PPS means and generate a phase power condition (PPC) status that is electrically coupled to said DSN means;
said DSN means is configured to electrically couple said PPS means or said SPS means to said ADP based on the state of said PPC status;
said PSU means comprises an AC+DC power supply (ADP);
said ADP comprises a boost converter (BCV) further comprising: a BCV input port and BCV output port;
said BCV is configured to accept AC or DC voltage input at said BCV input port;
said ADP comprises a DC-DC converter (DDC) further comprising: a DDC input port and DDC output port;
said BCV output port is electrically coupled to said DDC input port;
said PDL means comprises a DC-DC power supply (DDP) electrically coupled to a protected load device (PLD); and
said DDC output port is electrically coupled to and supplies power to said DDP;

wherein said method comprises the steps of:
- (1) with said PCS means, monitoring the status of line voltage from said PPS means;
- (2) with said PCS means, monitoring the status of line voltage from said SPS means;
- (3) determining if said PPS line voltage is within predetermined limits, and if not, proceeding to step (8);
- (4) waiting for said PPS line voltage to stabilize;
- (5) configuring said DSN means to disconnect said SPS means from said PSU means;
- (6) waiting for a phase transition to occur in said PPS means;
- (7) configuring said DSN means to connect said PPS means to said PSU means and proceeding to step (1);
- (8) configuring said DSN means to disconnect said PPS means from said PSU means;
- (9) waiting for a phase transition to occur in said SPS means if said SPS means is an AC source; and
- (10) configuring said DSN means to connect said SPS means to said PSU means and proceeding to step (1).

62. The non-transitory computer usable medium of claim 61 wherein said PPS means comprises a three-phase DELTA power source.

63. The non-transitory computer usable medium of claim 61 wherein said PPS means comprises a three-phase WYE power source.

64. The non-transitory computer usable medium of claim 61 wherein said PLD comprises a computing device.

65. The non-transitory computer usable medium of claim 61 wherein said PLD comprises a networked computing server.

66. The non-transitory computer usable medium of claim 61 wherein said PPS means comprises a single-phase line to phase voltage derived from a three-phase power system.

67. The non-transitory computer usable medium of claim 61 wherein said SPS means comprises an energy source selected from a group consisting of: solar panel; fuel cell; flywheel; and alternative energy source.

68. The non-transitory computer usable medium of claim 61 wherein said SPS means comprises a battery.

69. The non-transitory computer usable medium of claim 61 wherein said SPS means comprises a battery with battery chemistry selected from a chemical group consisting of: lead acid; lithium iron; nickel cadmium; sodium sulfur; vanadium redox; nickel cadmium; and alkaline.

70. The non-transitory computer usable medium of claim 61 wherein said system further comprises an unprotected PSU means electrically coupled to said PPS means.

71. The non-transitory computer usable medium of claim 61 wherein said DSN means further comprises a manual bypass switch.

72. The non-transitory computer usable medium of claim 61 wherein said DSN means further comprises an automatic bypass switch.

73. The non-transitory computer usable medium of claim 61 wherein said DSN means further comprises redundant bypass switches.

74. The non-transitory computer usable medium of claim 61 wherein said SPS means further comprises battery and charging rectifier.

75. The non-transitory computer usable medium of claim 61 wherein said SPS means further comprises an AC power source supplying a battery charger/battery combination.

76. The non-transitory computer usable medium of claim 61 wherein said SPS means further comprises: an AC power source supplying a battery charger/battery combination; and an unprotected PSU electrically coupled to said battery.

77. The non-transitory computer usable medium of claim 61 wherein said SPS means further comprises: an AC power source supplying a battery charger/battery combination; and an unprotected PSU electrically coupled to said PPS means.

78. The non-transitory computer usable medium of claim 61 further comprising: a battery configured to act as a tertiary supply of power to said PSU means.

79. The non-transitory computer usable medium of claim 61 further comprising: a battery configured to act as a tertiary supply of power to said PSU means and an unprotected PSU electrically coupled to said PPS means.

80. The non-transitory computer usable medium of claim 61 further comprising: a battery configured to be charged with an energy source selected from a group consisting of: solar panel; fuel cell; flywheel; and alternative energy source.

81. The non-transitory computer usable medium of claim 61 wherein said SPS means further comprises: an AC power source supplying a battery charger/battery combination; and an unprotected PSU electrically coupled to said SPS means and bypass switch coupling said PSU means and said AC power source.

82. The non-transitory computer usable medium of claim 61 wherein said SPS means further comprises: an AC power source supplying a battery charger/battery combination; an unprotected PSU electrically coupled to said SPS means; a bypass switch coupling said PSU means and said AC power source; and an unprotected PSU electrically coupled to said AC power source.

83. The non-transitory computer usable medium of claim 61 wherein said PPS means and said SPS means comprise 3-phase power sources.

84. The non-transitory computer usable medium of claim 61 wherein said PPS means comprises a 3-phase power source and said SPS means comprises a battery.

85. The non-transitory computer usable medium of claim 61 wherein said PPS means comprises a 3-phase power source and said SPS means comprises a battery and 3-phase charging rectifier electrically coupled to said PPS means 3-phase power source.

86. The non-transitory computer usable medium of claim 61 wherein said PPS means comprises a 3-phase power source and said SPS means comprises a battery and 3-phase charging rectifier electrically coupled to an alternate 3-phase power source.

87. The non-transitory computer usable medium of claim 61 wherein said PPS means comprises a 3-phase power source and said SPS means comprises a battery and an unprotected PSU electrically coupled to a single phase of said 3-phase power source.

88. The non-transitory computer usable medium of claim 61 wherein said PPS means comprises a 3-phase power source and said SPS means comprises a battery and 3-phase charging rectifier electrically coupled to an alternate 3-phase power source and an unprotected PSU electrically coupled to a single phase of said 3-phase power source.

89. The non-transitory computer usable medium of claim 61 wherein said PPS means comprises a 3-phase power source and said SPS means comprises a battery and 3-phase charging rectifier electrically coupled to an alternate 3-phase power source and an unprotected PSU electrically coupled to a single phase of said battery.

90. The non-transitory computer usable medium of claim 61 wherein said PPS means comprises a 3-phase power source and said SPS means comprises a battery and 3-phase charging rectifier electrically coupled to an alternate 3-phase power source and a protected PSU electrically coupled to said battery.

* * * * *